United States Patent
Collen

(10) Patent No.: US 12,425,220 B2
(45) Date of Patent: Sep. 23, 2025

(54) PHYSICAL ASSET CORRESPONDING TO A DIGITAL ASSET

(71) Applicant: ghostwarp co., West Roxbury, MA (US)

(72) Inventor: Bennett Collen, West Roxbury, MA (US)

(73) Assignee: GHOSTWARP CO., West Roxbury, MA (US)

( * ) Notice: Subject to any disclaimer, the term of this patent is extended or adjusted under 35 U.S.C. 154(b) by 165 days.

(21) Appl. No.: 17/693,242

(22) Filed: Mar. 11, 2022

(65) Prior Publication Data

US 2022/0294630 A1 Sep. 15, 2022

Related U.S. Application Data

(60) Provisional application No. 63/159,763, filed on Mar. 11, 2021.

(51) Int. Cl.
*H04L 29/00* (2006.01)
*G06F 16/16* (2019.01)
(Continued)

(52) U.S. Cl.
CPC .......... *H04L 9/3213* (2013.01); *G06F 16/168* (2019.01); *G06F 16/955* (2019.01);
(Continued)

(58) Field of Classification Search
CPC ... H04L 9/3213; H04L 9/0643; H04L 9/0825; H04L 9/3236; H04L 9/3239;
(Continued)

(56) References Cited

U.S. PATENT DOCUMENTS 10,217,185 B1   2/2019  Cabanero et al.
10,505,726 B1 * 12/2019  Andon ................. H04L 9/3297
(Continued)

FOREIGN PATENT DOCUMENTS

| CN | 105956923 A | 9/2016 |
| WO | 2019219982 A1 | 11/2019 |
| WO | 2020092900 A2 | 5/2020 |

OTHER PUBLICATIONS

International Search Report and the Written Opinion of the International Searching Authority, issued in corresponding International Application No. PCT/US2022/19983, dated Oct. 5, 2022, 17 pages.
(Continued)

*Primary Examiner* — Ghazal B Shehni
(74) *Attorney, Agent, or Firm* — Rothwell, Figg, Ernst & Manbeck, P.C.

(57) ABSTRACT

A physical asset corresponding to a digital asset is provided. The physical asset includes one or more components manufactured in accordance with one or more parameters for customizing the physical asset based on information associated with the digital asset. The physical asset also includes a tag associated with the physical asset, wherein the tag includes information comprising a uniform resource locater (URL) and encrypted information, wherein the encrypted information corresponds to a cryptographic token on a distributed ledger and information about the physical asset.

7 Claims, 40 Drawing Sheets

(51) Int. Cl.
*G06F 16/955* (2019.01)
*G06Q 20/06* (2012.01)
*G06Q 20/36* (2012.01)
*G06Q 20/40* (2012.01)
*G06Q 30/0601* (2023.01)
*G06Q 50/18* (2012.01)
*H04L 9/08* (2006.01)
*H04L 9/32* (2006.01)
*H04L 9/00* (2022.01)

(52) U.S. Cl.
CPC ........... *G06Q 20/065* (2013.01); *G06Q 20/36* (2013.01); *G06Q 20/3672* (2013.01); *G06Q 20/401* (2013.01); *G06Q 30/0643* (2013.01); *G06Q 50/184* (2013.01); *H04L 9/0825* (2013.01); *H04L 9/3236* (2013.01); *H04L 9/3239* (2013.01); *H04L 9/3247* (2013.01); *G06Q 2220/00* (2013.01); *H04L 9/50* (2022.05); *H04L 2209/56* (2013.01); *H04L 2209/60* (2013.01)

(58) Field of Classification Search
CPC ..... H04L 9/3247; H04L 9/50; H04L 2209/56; H04L 2209/60; H04L 9/0894; G06F 16/168; G06F 16/955; G06Q 20/065; G06Q 20/36; G06Q 20/3672; G06Q 20/401; G06Q 30/0643; G06Q 2220/00; G06Q 10/101; G06Q 20/3276; G06Q 20/3278; G06Q 20/363; G06Q 20/38215; G06Q 20/3823; G06Q 20/3827; G06Q 20/405; G06Q 20/123; G06Q 20/389; G06Q 30/06
See application file for complete search history.

(56) References Cited

U.S. PATENT DOCUMENTS

| | | | |
|---|---|---|---|
| 10,540,654 B1 | 1/2020 | James et al. | |
| 10,564,820 B1* | 2/2020 | Cabanero | H04L 41/22 |
| 10,810,388 B2 | 10/2020 | Kawaguchi et al. | |
| 10,819,367 B2 | 10/2020 | Fenney et al. | |
| 10,850,202 B1 | 12/2020 | Koch et al. | |
| 10,896,412 B2* | 1/2021 | Robertson | H04L 63/12 |
| 10,915,716 B2 | 2/2021 | Levy et al. | |
| 10,946,283 B1 | 3/2021 | Meilich et al. | |
| 11,004,176 B1 | 5/2021 | Newman et al. | |
| 11,308,487 B1* | 4/2022 | Foster | G06Q 20/3829 |
| 2003/0047602 A1 | 3/2003 | Iida et al. | |
| 2003/0110126 A1 | 6/2003 | Dunkeld et al. | |
| 2006/0259386 A1 | 11/2006 | Knowlton et al. | |
| 2007/0178968 A1 | 8/2007 | Cote-Charpentier et al. | |
| 2012/0236201 A1 | 9/2012 | Larsen et al. | |
| 2013/0120368 A1 | 5/2013 | Miller et al. | |
| 2015/0024852 A1 | 1/2015 | Pacey et al. | |
| 2016/0373804 A1 | 12/2016 | Iyer | |
| 2019/0299105 A1 | 10/2019 | Knight et al. | |
| 2019/0384842 A1 | 12/2019 | Rao | |
| 2019/0386817 A1* | 12/2019 | Carson | H04L 9/0643 |
| 2019/0394052 A1* | 12/2019 | Li | H04L 9/3247 |
| 2020/0084045 A1 | 3/2020 | Cohen et al. | |
| 2020/0273048 A1 | 8/2020 | Andon et al. | |
| 2021/0248653 A1* | 8/2021 | McKenzie | H04L 9/3247 |
| 2022/0058636 A1 | 2/2022 | Yantis et al. | |
| 2023/0031817 A1* | 2/2023 | Mulas | G06Q 20/208 |
| 2023/0327866 A1 | 10/2023 | Andon et al. | |

OTHER PUBLICATIONS

Non-Final Office Action mailed Jun. 12, 2024 in corresponding U.S. Appl. No. 17/693,232, First Named Inventor: Bennett Collen (19 pages).
Final Office Action mailed May 21, 2024 in corresponding U.S. Appl. No. 17/693,237, First Named Inventor: Bennett Collen (13 pages).
Non-Final Office Action mailed Jul. 23, 2024 in corresponding U.S. Appl. No. 17/693,228, First Named Inventor: Bennett Collen (18 pages).
Non-Final Office Action mailed Jan. 25, 2024 in corresponding U.S. Appl. No. 17/693,237, First Named Inventor: Bennett Collen (17 pages).
Notice of Allowance mailed Nov. 27, 2024 in corresponding U.S. Appl. No. 17/693,232, First Named Inventor: Bennett Collen (12 pages).
Non-Final Office Action mailed Oct. 18, 2024 in corresponding U.S. Appl. No. 17/693,237, First Named Inventor: Bennett Collen (19 pages).
Non-Final Office Action mailed Apr. 7, 2025 in co-pending U.S. Appl. No. 17/693,232, First Names Inventor: Bennett Collen (28 pages).
The partial supplementary European search report mailed Jan. 17, 2025 in corresponding European Patent Application No. 22768102.0 (16 pages).
Final Office Action mailed Feb. 13, 2025 in corresponding U.S. Appl. No. 17/693,228, First Named Inventor: Bennett Collen (22 pages).

* cited by examiner

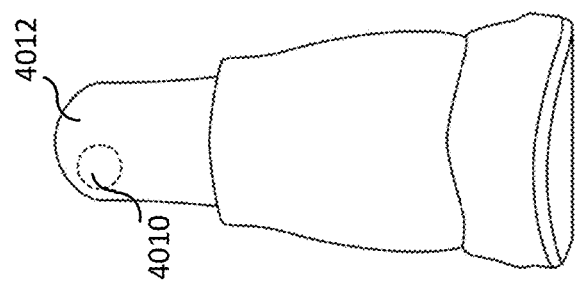
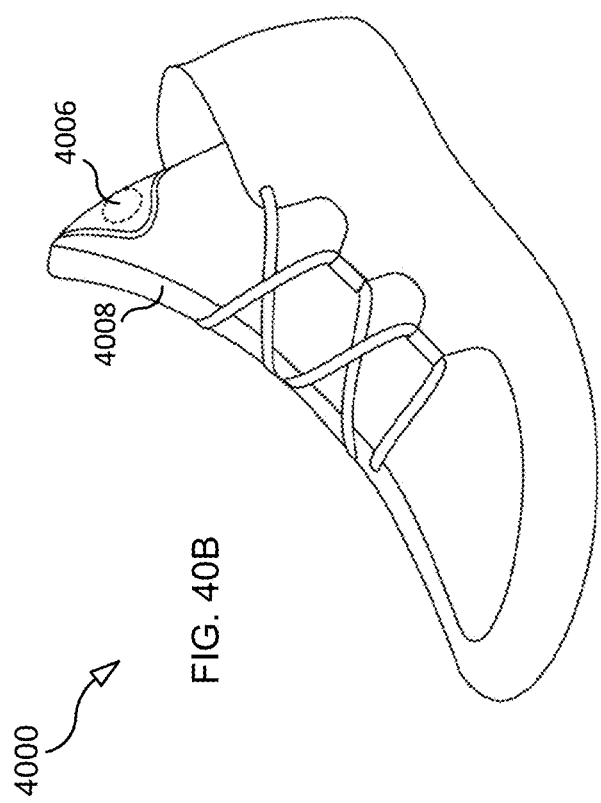
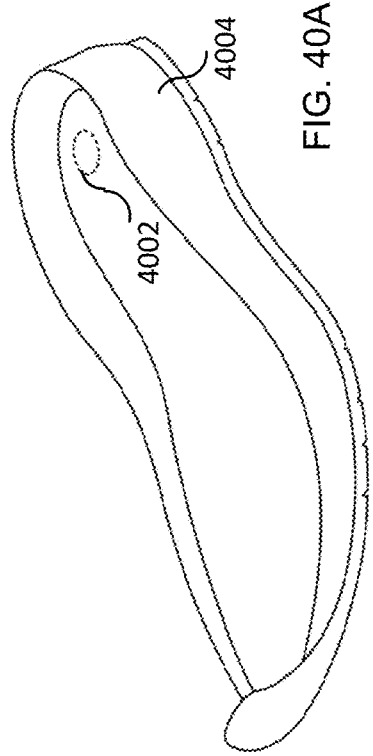

PHYSICAL ASSET CORRESPONDING TO A DIGITAL ASSET

CROSS REFERENCE TO RELATED APPLICATIONS

This application claims priority to U.S. provisional application Ser. No. 63/159,763, filed on Mar. 11, 2021. The entire contents of the above identified application is incorporated herein by reference as if fully set forth herein.

TECHNICAL FIELD

Disclosed are embodiments related to digital assets, physical assets, and methods and apparatuses for generating, purchasing, redeeming, rendering, and authenticating such assets. More particularly, this disclosure relates to methods and apparatuses for redeeming a digital asset for a physical asset, for generating a digital asset for purchase by a user, for purchasing a digital asset in a digital environment by a user, for rendering a digital asset and for authenticating a physical asset, and to a physical asset corresponding to a digital asset.

BACKGROUND

A new breed of entrepreneur has emerged. Creators of all persuasions—entertainers, athletes, artists, gamers—have massive audiences who crave authentic interaction and engagement with the creators they adore. Historically, these creators have had limited options for engaging and monetizing their fanbases, and their fans have had limited options to support and signal their affiliation with the creators.

Cryptographic ("Crypto") tokens, such as non-fungible tokens ("NFTs"), have emerged to help fill the gap. Crypto assets help align incentives amongst creators and their fans. Through NFTs, creators can sell goods, experiences, creations, moments, and artwork directly to fans. Creators can also earn royalties on secondary sales of their work, taking away the sting of selling their work "early" only to see it appreciate significantly in subsequent sales.

For example, if an artist sold a particular piece for $250, and two years later the piece sold for $2,500,000 the artist typically would not realize any of the price appreciation. Through the enforcement of royalties on a resold NFT, creators can lock in permanent participation in the appreciation of their work like never before in history.

Fans who are early supporters of a particular project or creative work get to participate in the upside as the project, product, or artwork gains in popularity, and as a result, gains in value. The "true fans" will see the most upside as they are most likely to have supported early.

One industry that, like many others, that is not immune from this phenomenon is the footwear industry and, more specifically, the sneaker industry. Sneaker collaborations experience this phenomenon, and only a handful of the most prominent creators can fully participate in the upside of a collaboration if the sneaker is a big success. Even then, for the most part, a creator will only benefit from the primary sale of the sneaker. If a sneaker collaboration starts selling for a premium the second it hits the market, the collaborator typically does not realize any of the upside of the secondary sale.

Sneakers have evolved from a purely utilitarian tool to help athletes perform better into a cultural phenomenon. Sneakers are at once a dominant fashion sector, an increasingly valuable collectors' asset class, and most importantly, a medium for self-expression.

Meanwhile, more components of the human experience are shifting to digital, with online environments allowing people to expand their circles and connect with others around the globe who share their interests. Over time, these online worlds become increasingly intertwined resulting in a "world" of connected digital environments. This interconnected digital world is often referred to as the "metaverse," and is only possible if its underlying digital assets can be provably scarce, have knowledge of each other, can interact with each other, have a shared history, and the "citizens" of the global world have a shared source of truth which serializes ownership of said assets. NFTs and the blockchains on which they exist represent the ideal infrastructure for the metaverse, unlocking a whole new world of possibilities.

SUMMARY

NFTs represent an exciting evolution in asset ownership in digital environments, but equally exciting is their potential to bridge the digital and the physical. Moreover, NFTs transform the value proposition for creators. Instead of enlisting a publisher, gallery, or record label to monetize creative works, artists can carve out a larger slice of the total pie. This paradigm shift also breaks down the traditional stratification between consumers and creators.

Some embodiments disclosed herein allow users to own the "same" asset in both digital and physical environments. In some embodiments, blockchain-based smart contracts will record ownership of both the digital and physical asset and create a "bridge" for use in both the digital and physical worlds. In an exemplary embodiment, a user purchases a digital pair of sneakers. The user receives a 3D file depicting the sneakers and is able to use the sneakers in digital environments, such as, for example, the Sims. In some embodiments, owning the digital asset may entitle the user to a physical pair of sneakers that the user can wear in real life. In this way, the user would have a seamless experience "wearing" their sneakers in real life as well as in the digital environment. In some embodiments, both the digital and physical assets may be unified and represented by blockchain-based smart contracts.

Advantageously, in some embodiments, each blockchain-based token/asset may contain identifying information about the asset (for example, a digital sneaker), such as when it was created, the designer, prior owners, prior sale prices, current sale price, the digital design file, digital integrations, ownership structure, existence of an associated physical asset, unique attributes, and other information.

In some embodiments, a digital design file is inextricably tied to a blockchain address. A digital design is created. A blockchain based token is created to represent ownership of the digital design. The digital design may be represented by a unique digital fingerprint or cryptographic hash. The blockchain token is now representative of the digital design. The blockchain token cannot be transferred without also transferring ownership of the digital design file.

In some embodiments, the digital design file may be uploaded to a decentralized file storage system, such as InterPlanetary File System (IPFS), Sia, or Arweave. The design file is given a unique fingerprint/cryptographic hash by the decentralized file storage protocol. The file is then stored on multiple decentralized computing nodes and servers. The cryptographic token representing ownership of the design file contains a reference to the unique fingerprint created by IPFS/Sia/Arweave. Ownership of the decentralized file is tied inextricably to ownership of the cryptographic token.

In some embodiments, users are required to have their own blockchain wallet address in order to receive the digital design, represented by a cryptographic token. In some embodiments, users can sign up for a blockchain wallet using a service such as, for example, MetaMask, My Ether Wallet (MEW), or Phantom. Users would then be assigned a wallet address from a decentralized server, and when a digital asset is purchased, the user receives the asset in their digital wallet.

In some embodiments, the compensation for creation of a digital asset and/or physical asset is dictated by smart contracts. The royalties for the creator(s) and/or collaborator(s) for the digital and physical asset(s) may be built into the smart contract architecture. All proceeds from sales of the digital asset/NFT and any related physical assets would accrue to that NFT/smart contract, and the underlying computer code would pay the royalties according to the pre-defined proportions in the smart contract. In some embodiments, the royalties would be paid less the cost of goods for the physical asset.

In some embodiments, each subsequent sale of the digital and/or physical asset(s) may yield a royalty to the original creator(s) and collaborator(s). For example, the owner of the asset would keep a certain pre-defined portion of the proceeds from the sale, and the original creators would receive a pre-defined portion of the proceeds from the sale, divided according to the original proportions for the original sale, or a new ratio specific to the resale.

In some embodiments, a collaboration may be established between a company (e.g., Endstate) and up-and-coming designers. Under this collaboration—e.g., a design fellowship program—the company (e.g., Endstate) may work with up-and-coming artists and designers to create their digital and physical assets. Partner designers will design sneakers or other digital and/or physical assets. The company's (e.g., Endstate) technology will turn each asset into a digital collectible, and by virtue of being a NFT, each asset will be certified and authenticated using the blockchain architecture. Due to their authenticity and scarcity, these assets will accrue value as the artist's popularity increases. This will allow and encourage consumers to speculate on up-and-coming artists. This collaboration benefits designers since, for example, they get to collaborate with a sneaker/design company and promote their own work, get compensated for a portion of original sales, still get to participate in the upside of any potential future appreciate of their work, create more opportunities for up-and-coming artists to achieve career and commercial success, and get to work with/be mentored by a famous/successful designer.

In some embodiments, each digital asset has its own associated, unique domain name. The digital design file/associated asset and associated NFT would own another NFT which represents ownership of a domain name. In some embodiments, this NFT/domain name would resolve to a decentralized naming system. In some embodiments, the domain name would resolve to a website that contains identifying information about the digital asset, such as a sneaker, when it was created, the designer, prior owners, prior sale prices, current sale price, the digital design file, possible digital integrations, etc.

Advantageously, a potential buyer could visit some-shoe-001.dshoe to find content and history around the NFT as well as potentially make an offer to the owner. A integration partner could visit some-shoe-001.dshoe to determine if a user in question is the owner and has activated access before deciding to grant anything to the user.

In some embodiments, owning a digital asset/NFT entitles the user to experiences "In Real Life" (IRL). For example, owners of a particular NFT or series of NFT may receive concert tickets, or tickets to sporting event. In some embodiments, a particular series of digital asset/NFT would entitle the user to unique experiences, such as backstage passes for a concert or field passes for a sporting event. In some embodiments, these experiences would be tied to the collaborator who designed, sponsored, or otherwise inspired the creation of the digital asset/NFT or physical asset.

In some embodiments, the digital assets/NFTs will be usable in digital environments, such as video games, virtual worlds, online conferencing, virtual reality, and augmented reality.

In some embodiments, users are able to authenticate the validity of their physical goods by using NFC chips to scan their goods. In some embodiments, users are able to authenticate the validity of their physical goods by using QR codes to scan their goods. Advantageously, the resulting scan will authenticate the physical goods by referencing the corresponding digital asset in the blockchain.

In some embodiments, the upper of a sneaker may be embedded with electrical wiring and/or fibers that are able to process an electrical signal to create a sensible/tactile sensation on the wearer's foot. Advantageously, this would create a "haptic" response which could be tied to certain actions taken by the wearer or external events happening in the vicinity of the user, or completely remotely from the user.

In some embodiments, in order to lessen the carbon footprint, recycled materials may be used in the creation of physical assets, such as sneakers. For example, the use of recycled materials in the soles and/or uppers by using old chopped up sneaker soles as the base material to create new soles, joining by melting, melding, or otherwise reforming pieces of recycled materials to one contiguous sole, using recycled yarns and threads as filament in the process of 3D printing soles and/or uppers for the sneakers, physically embedding Carbon Dioxide gas (CO2) into the sole of the sneaker by, for example, pumping CO2 into an air-tight sac in the sole of the sneaker, locking the carbon away for the duration of the sneaker's life.

According to a first aspect, a physical asset corresponding to a digital asset is provided. The physical asset comprises one or more components manufactured in accordance with one or more parameters for customizing the physical asset based on information associated with the digital asset. The physical asset comprises a tag associated with the physical asset, wherein the tag includes information comprising a uniform resource locater (URL) and encrypted information, wherein the encrypted information corresponds to a cryptographic token on a distributed ledger and information about the physical asset.

In some embodiments, the tag is at least one of:
(i) a near-field communication (NFC) chip;
(ii) a quick response (QR) code;
(iii) a serial number;
(iv) a blockchain address; or
(v) a non-fungible token (NFT) public key.

In some embodiments, the physical asset is footwear including a sole and an upper, and wherein the tag associated with the physical asset is physically linked with the physical asset by at least one of:
(i) embedding the tag in the sole;
(ii) embedding the tag in the upper;

(iii) adhering the tag on to the sole;
(iv) adhering the tag on to the upper; or
(v) adhering the tag on packaging for the footwear.

In some embodiments, the physical asset is footwear including at least one or more of:
(i) an interchangeable sole;
(ii) an interchangeable upper;
(iii) electrical fibers capable of creating a haptic response resulting in a sensation felt by a wearer of the footwear; and
(iv) electrical fibers configured to communicate with an application.

In some embodiments, the distributed ledger is a blockchain ledger. In some embodiments, the cryptographic token is a non-fungible token (NFT).

BRIEF DESCRIPTION OF THE DRAWINGS

The accompanying drawings, which are incorporated herein and form part of the specification, illustrate various embodiments.

FIG. 40A illustrates a physical asset according to some embodiments.

FIG. 40B illustrates a physical asset according to some embodiments.

FIG. 40C illustrates a physical asset according to some embodiments.

DETAILED DESCRIPTION

Figure 1:
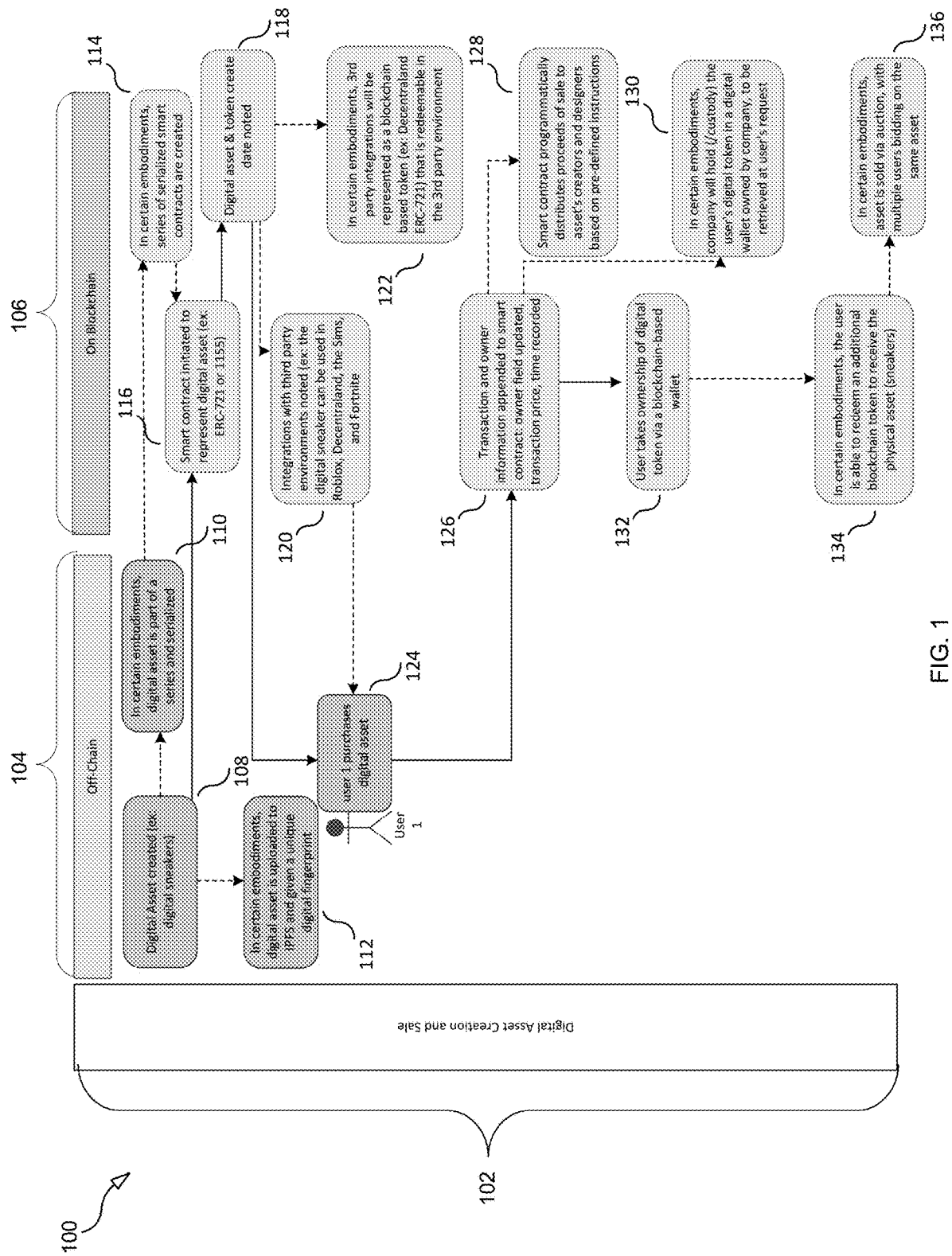
FIG. 1 is a block diagram illustrating a method for digital asset creation and sale according to some embodiments.

FIG. 1 is a block diagram 100 illustrating a method for digital asset creation and sale 102 according to some embodiments. Some steps or transactions that are part of the method illustrated are performed "Off-Chain" 104—that is, outside of a distributed ledger itself, such as the blockchain ledger—and other steps or transactions that are part of the method illustrated are performed "On Blockchain" 106 —that is, on a distributed ledger, such as the blockchain ledger, and which may be reflected on the distributed, public ledger.

At 108, which is off-chain, a digital asset, such as a digital sneaker, is created. In some embodiments, optionally, at 110, the digital asset created is part of a series and serialized. In some embodiments, optionally, at 112, the digital asset is uploaded to a decentralized file storage system, such as InterPlanetary File System (IPFS), Sia or Arweave, and given a unique digital fingerprint. For those embodiments, at 114, which is on blockchain, a series of serialized smart contracts are created.

At 116, which is on blockchain, a smart contract is initiated to represent the digital asset, for example ERC-721 or 1155. At 118, the digital asset and token create date is noted. In some embodiments, optionally, at 120, integrations with third party environments are noted, for example, the digital sneaker can be used in Roblox, Decentraland, the Sims, and Fortnite. In some embodiments, optionally, at 122, third party integrations can be represented as a blockchain based token, for example, Decentraland ERC-721, that is redeemable in the third party environment.

At 124, which is off-chain, a user 1 purchases the digital asset. At 126, which is on blockchain, transaction and owner information is appended to the smart contract by, for example, owner field updated, transaction price, and time recorded. In some embodiments, optionally, at 128, the smart contract programmatically distributes proceeds of the sale to the digital asset's creators and designers based on pre-defined instructions. In some embodiments, optionally, at 130, the company will hold, or maintain custody of, the user's digital token in a digital wallet owned by the company, to be retrieved at the user's request.

At 132, the user takes ownership of the digital token via a blockchain-based wallet. In some embodiments, optionally, at 134, the user is able to redeem an additional blockchain token to receive the physical asset (e.g., sneakers). In some embodiments, optionally, at 136, the asset is sold via auction, with multiple users bidding on the same asset.

In some embodiments, users are required to have their own blockchain wallet address in order to receive a digital asset, such as a digital shoe design, represented by a cryptographic token. Users can, for example, sign up for a blockchain wallet using a service, such as MetaMask, MyEtherWallet (MEW) or Phantom. Users are assigned a wallet address from a decentralized server. When a digital asset is purchased, the user receives the asset in their digital wallet, such as their MetaMask wallet, MEW, or Phantom wallet.

In some embodiments, an application, such as a company's software application, for example, Endstate's application, may instruct a user in how to create a blockchain wallet using a third-party application, such as MetaMask, and how to connect the blockchain wallet to the present application, for example, Endstate's application, as follows:
  (i) Download third-party wallet software;
  (ii) install browser extension;
  (iii) initiate/launch the browser extension once in the application; and
  (iv) link the wallet to the application in order to receive the digital and/or physical asset.

In some embodiments, the application, for example Endstate's application, may open a blockchain wallet on behalf of the user. The application may utilize a third party application, such as MetaMask, via an application programming interface (API) or embedded frame, allowing the user to sign up for a third party wallet, such as a blockchain wallet, without leaving the application. In some embodiments, third-party wallet software is linked to the application without using a browser extension. In some embodiments, the user may also enter the information required by the third-party wallet in order to create a new account and, in that case, the application may not store this data.

In some embodiments, the application, for example, Endstate's application, may create a blockchain wallet on behalf of the user. The application acts as a hosted wallet provider, as follows:
  (i) creates user's wallet;
  (ii) user logs into the application and uses these credentials to access their digital wallet, such as a blockchain wallet; and
  (iii) the application stores the user's public and private keys to the digital (e.g., blockchain) wallet.

This type of setup allows users access to their assets without the responsibility of full custody of their blockchain-based assets, which are bearer instruments. This also decreases the amount of friction/onboarding time required of a new user to use the application. A third party wallet provider may be used to create these wallets or, alternatively, users' wallet addresses may be created directly on the underlying blockchain protocol.

Figure 2:
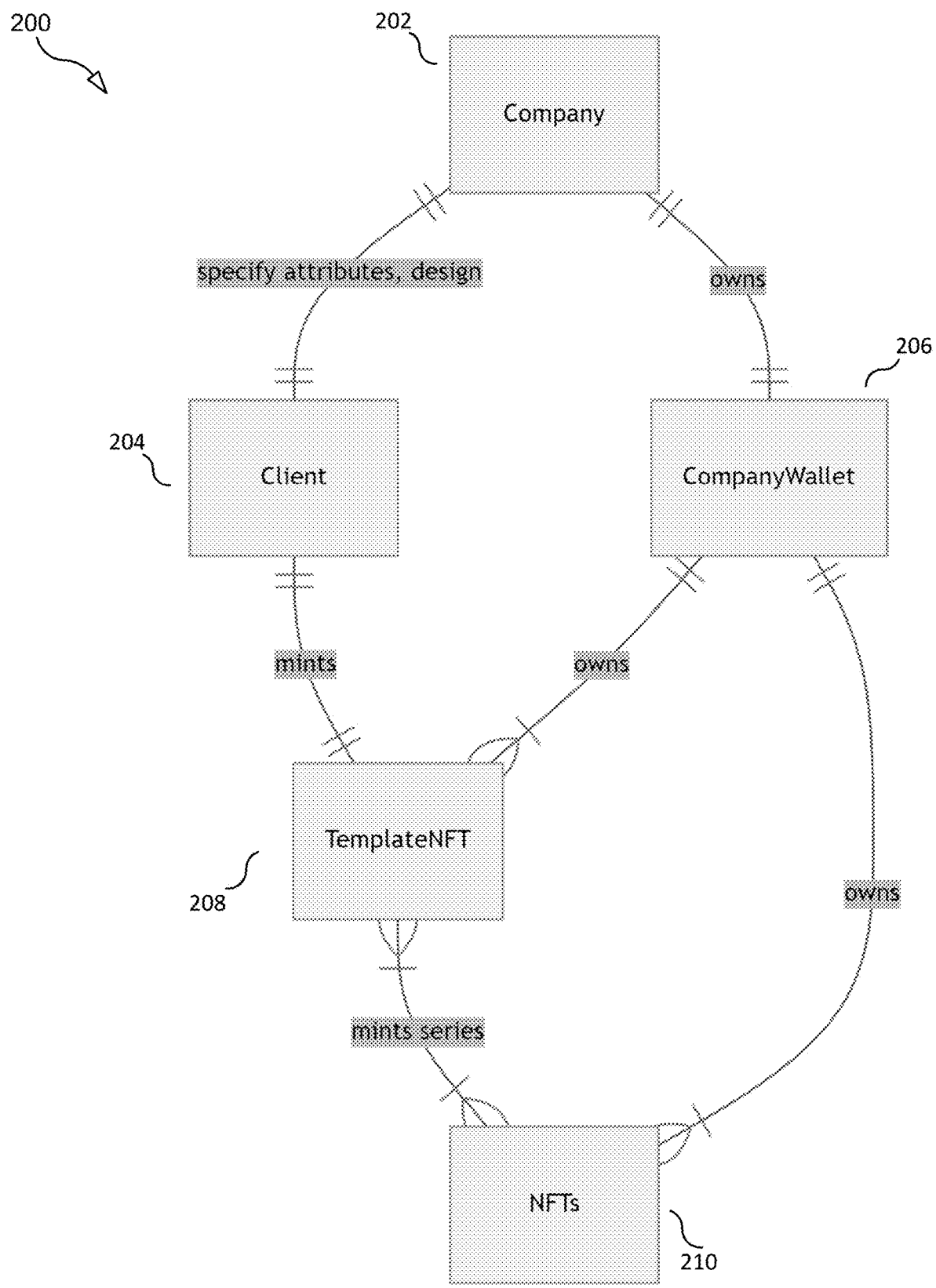
FIG. 2 is a block diagram illustrating a method for digital asset creation according to some embodiments.

FIG. 2 is a block diagram illustrating a method 200 for digital asset creation according to some embodiments. A company 202 specifies attributes and a design for a digital asset or a series of digital assets for a client 204. The company 202 also owns a company wallet 206, which owns a NFT template 208 (TemplateNFT) used to generate, e.g. "mint" one or more NFTs in a series. The client 204, using the template 208, mints a series of NFTs 210 that are owned by the company wallet 206.

Figure 3:
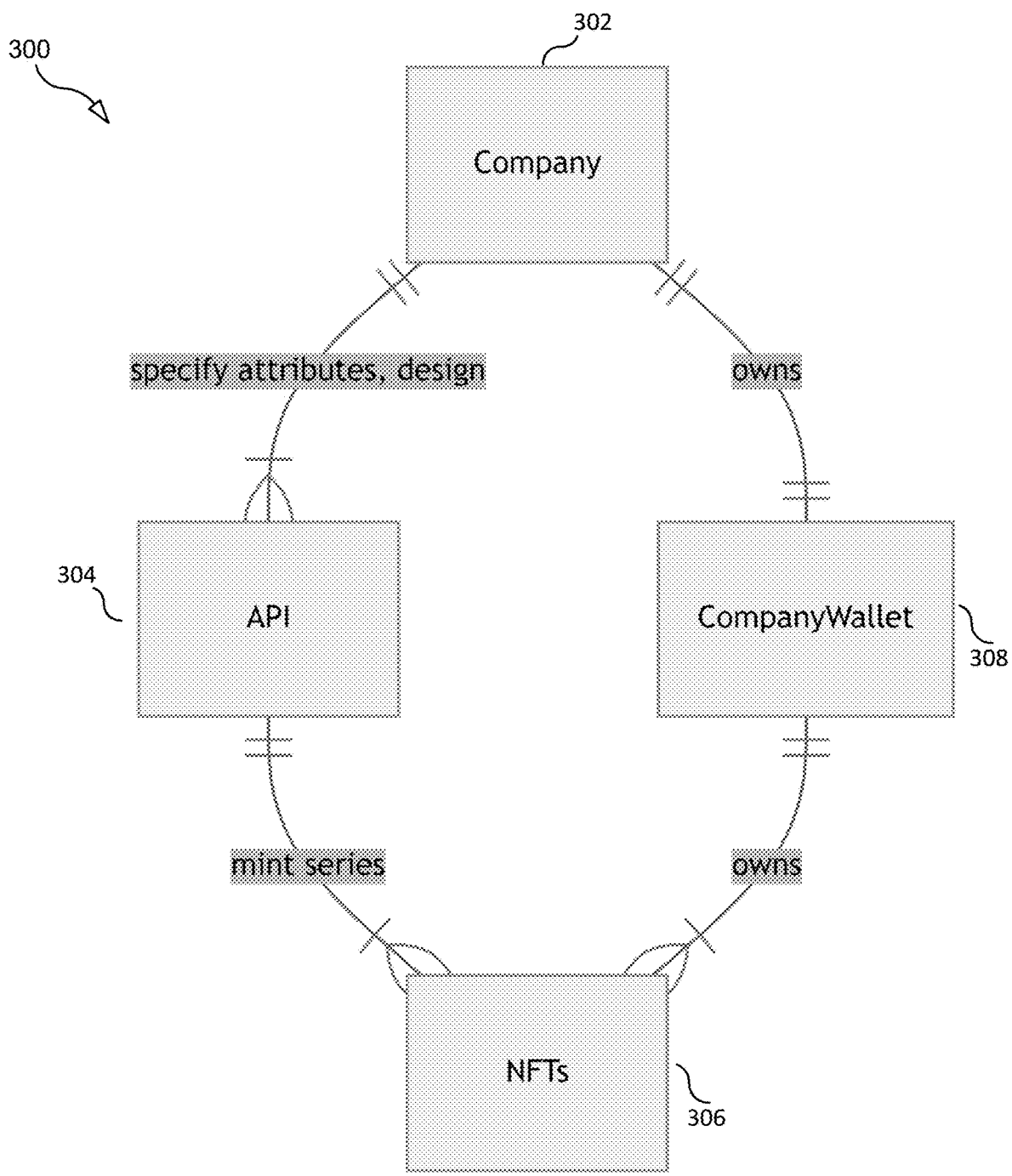
FIG. 3 is a block diagram illustrating a method for digital asset creation according to some embodiments.

FIG. 3 is a block diagram illustrating a method 300 for digital asset creation according to some embodiments. A company 302 specifies attributes and a design for a digital asset or a series of digital assets, and provides those attributes and design to an application programming interface (API) 304. The API 304 is used to mint a NFT or a series of NFTs 306 in accordance with the attributes and designs. The NFTs 306 are stored, e.g., "owned" by a wallet 308 owned by the company 302.

Figure 4:
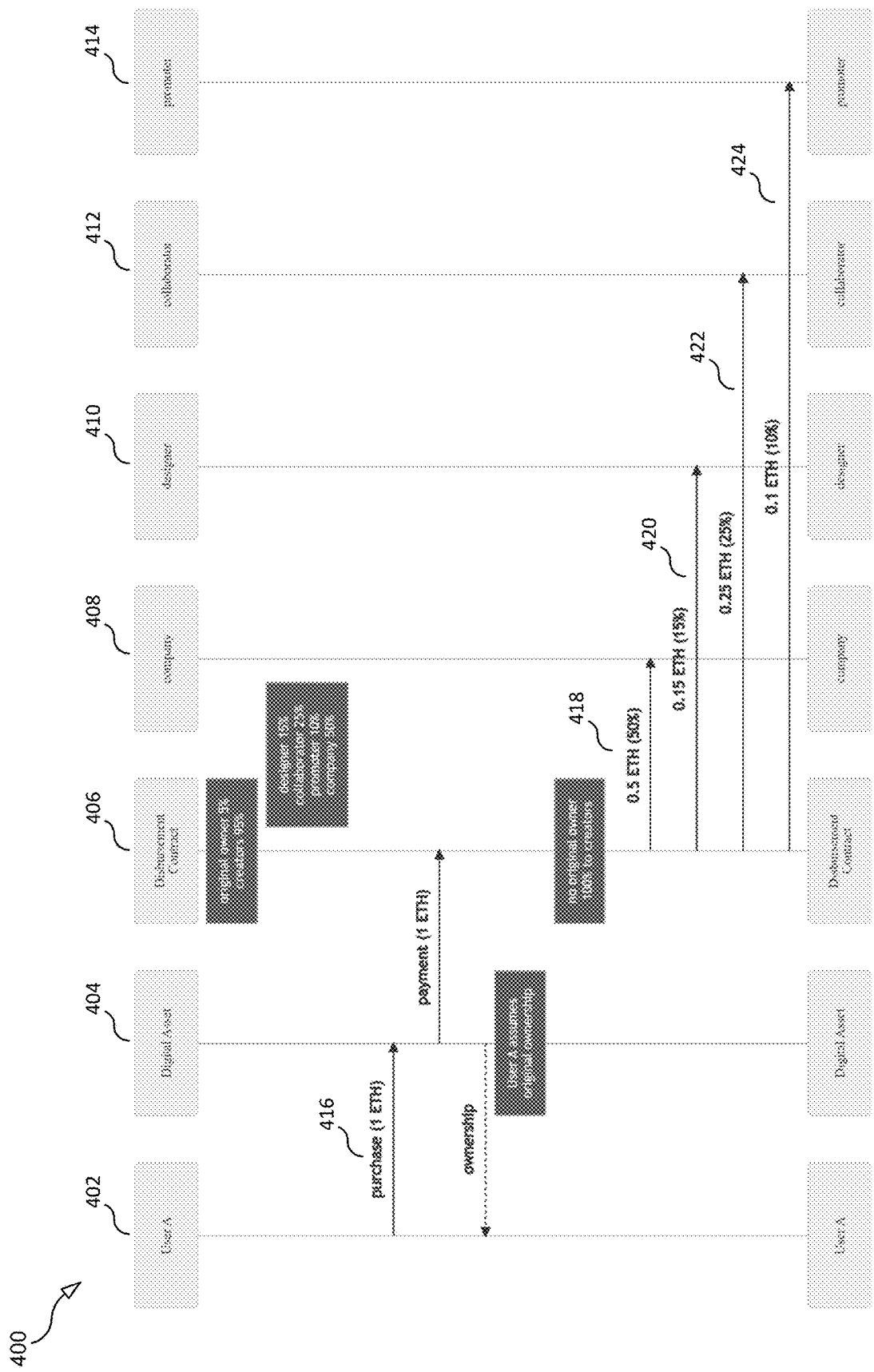
FIG. 4 is a sequence diagram illustrating a method for digital asset sale according to some embodiments.

FIG. 4 is a sequence diagram 400 illustrating a method for digital asset sale according to some embodiments. In some embodiments, the price of each cryptographic token, such as a non-fungible token (NFT), and/or associated asset may be governed by a "token bonding curve." The price of the token is pre-determined according to a fixed function, where the price of the token is a function of the supply. For example, if the price of the NFT were to follow a linear relationship ($y=x$), the price of the token would match the total supply as shown in Table 1 below.

TABLE 1

| Linear Token Bonding Curve | |
|---|---|
| Token | Price |
| Token 1 | 1 ETH |
| Token 2 | 2 ETH |

TABLE 1-continued

Linear Token Bonding Curve

| Token | Price |
|---|---|
| Token 3 | 3 ETH |
| Token 4 | 4 ETH |
| Token 5 | 5 ETH |

The first token sold would cost 1 ETH, the second token sold would cost 2 ETH, etc. If a new user desired the token (e.g., NFT) and/or associated asset, the user must be willing to pay the incremental price to have a new token (e.g., NFT) minted. If a user desired to sell the token (e.g., NFT), the user would move one step down the function to sell at the price one step below. This structure creates automatic liquidity and prevents rampant speculation. It helps the market determine the price of the asset.

In some embodiments, the token (e.g., NFT) may be sold via auction. There are many iterations of auctions, any of which may be used. For example:
  (i) Standard Auction: a minimum starting bid is set. Users place escalating bids, increasing by a pre-defined minimum price increment. Auction ends after a new high bid has not been offered for a pre-defined period of time.
  (ii) Dutch Auction: A starting maximum bid is set. The price decreases in regular intervals at pre-set time intervals. For example, the starting price is 2 ETH, and decreases by 0.01 ETH every minute. A winning bidder places a bid to "stop" the descent and purchases the asset at that price.

In some embodiments, the compensation for creation of the digital and/or physical asset(s) will be dictated by smart contracts. Royalties for the creator(s) and/or collaborator(s) for the digital and/or physical asset(s) may be built into the smart contract architecture. All proceeds from sales of the digital asset/NFT and any related physical items would accrue to that NFT/smart contract, and the underlying computer code would pay the royalties according to the pre-defined proportions in the smart contract. In some embodiments, the royalties would be paid less the cost of goods for the physical asset.

In some embodiments, each subsequent sale of the digital and/or physical asset(s) may yield a royalty to the original creator(s) and collaborator(s). For example, the owner of the asset would keep a certain pre-defined portion of the proceeds from the sale, and the original creators would receive a pre-defined portion of the proceeds from the sale, divided according to the original proportions for the original sale, or a new ratio specific to the resale.

For example, a digital and physical sneaker is designed by a third party, endorsed by a third party athlete, and promoted by an additional third party. In this example, the profits of the shoe (sale price, less expenses for creating the goods) are divided in the following proportion:
  (i) 15% to designer
  (ii) 25% to collaborating athlete
  (iii) 10% to third party promoter
  (iv) 50% to company Referring now to the sequence diagram 400 of FIG. 4, a purchase with disbursement transactions are illustrated that involve:
  (i) User A 402
  (ii) Digital Asset 404
  (iii) Disbursement Contract 406
  (iv) Company 408
  (v) Designer 410
  (vi) Collaborator 412
  (vii) Promoter 414

At 416, the digital asset (e.g., digital/physical sneaker combination) 404 is purchased by User A 402 for 1.0 ETH. When the digital asset, for example an NFT, is purchased:
  (i) at 418, 0.50 ETH would go to company 408;
  (ii) at 420, 0.15 ETH would go to the designer 410;
  (iii) at 422, 0.25 ETH would go to the collaborator 412, for example, a collaborating athlete; and
  (iv) at 424, 0.10 ETH would go to the promoter 414, for example a third-party promoter.

Each designer, collaborator, and promoter, for example, automatically receives the payment to a blockchain-based wallet that is able to receive ETH.

Figure 5:
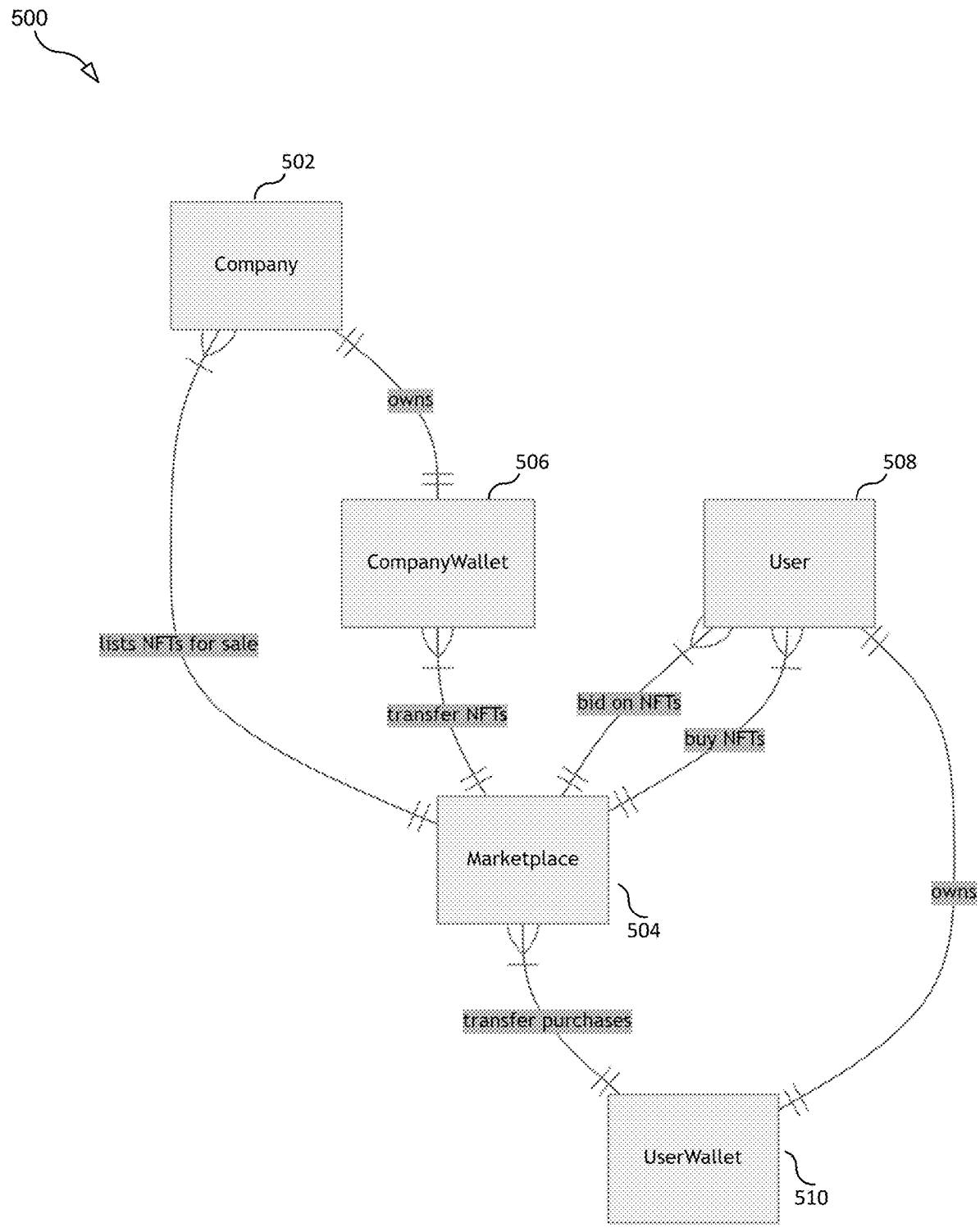
FIG. 5 is a block diagram illustrating a method for digital asset sale according to some embodiments.

FIG. 5 is a block diagram illustrating a method 500 for digital asset sale according to some embodiments. A company 502 lists one or more NFTs for sale in a Marketplace 504 (e.g., OpenSea or another NFT marketplace). In some embodiments, the Company's NFTs may be transferred from the Company's wallet 506 to the Marketplace 504 as part of the listing. A User 508 may bid on one or more NFTs listed in the Marketplace 504. Upon successful purchase (e.g., a winning bid), the User 508 buys the NFTs. As part of the purchase, the purchased NFTs (e.g., private keys associated with the NFTs) will be transferred to a UserWallet 510 owned by the User 508.

Figure 6:
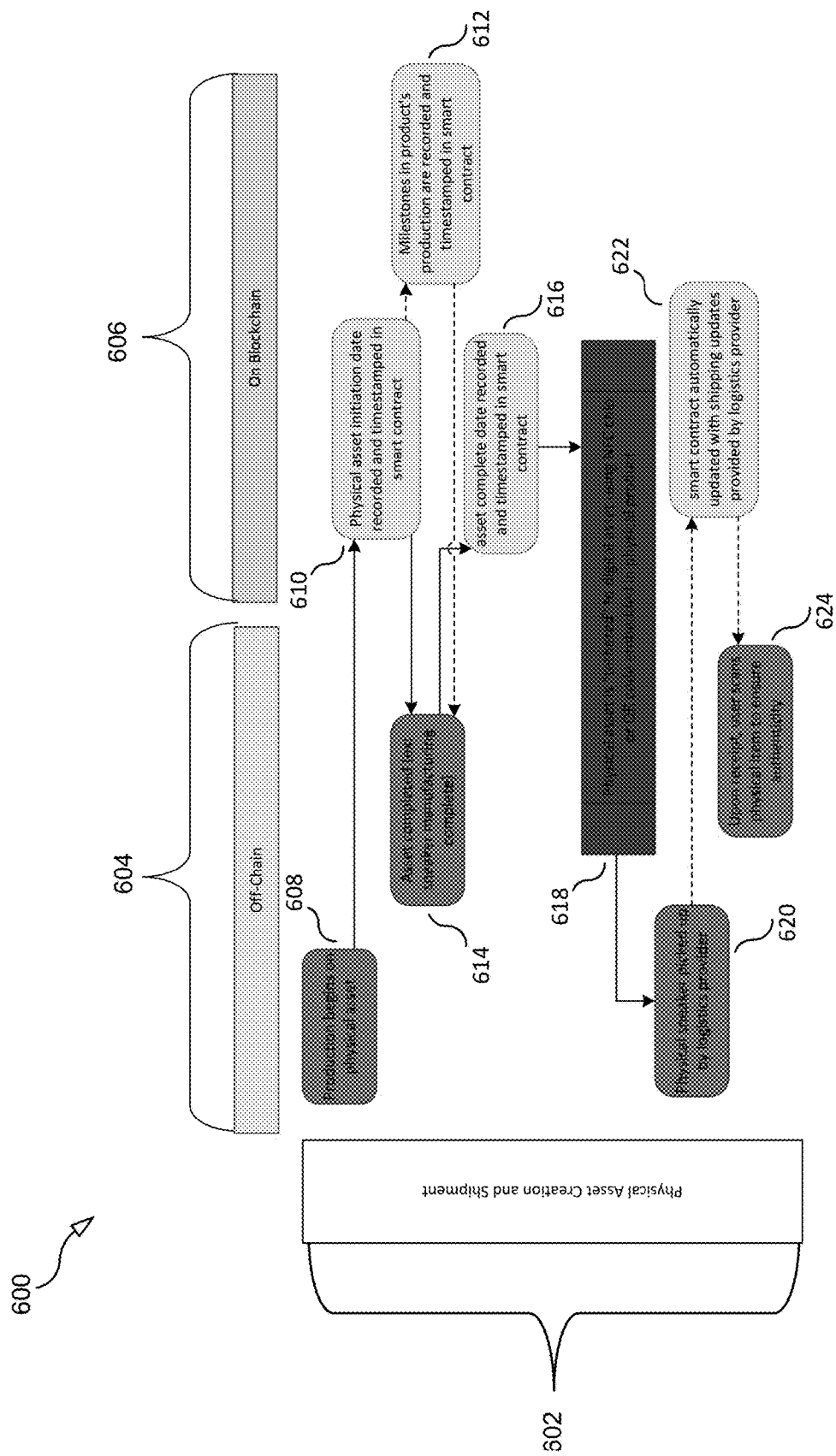
FIG. 6 is a block diagram illustrating a method for physical asset creation and shipment according to some embodiments.

FIG. 6 is a block diagram 600 illustrating a method for physical asset creation and shipment 602 according to some embodiments. Some steps or transactions that are part of the method illustrated are performed "Off-Chain" 604—that is, outside of a distributed ledger itself, such as the blockchain ledger—and other steps or transactions that are part of the method illustrated are performed "On Blockchain" 606—that is, on a distributed ledger, such as the blockchain ledger, and which may be reflected on the distributed, public ledger.

At 608, which is off-chain, production begins on a physical asset. At 610, which is on blockchain, the physical asset initiation date is recorded and timestamped in a smart contract. In some embodiments, optionally, at 612, milestones in the product's production—that is, for example, the physical asset—are recorded and timestamped in a smart contract.

At 614, which is off chain, the manufacturing of the physical asset, for example, sneakers, is completed. At 616, which is on blockchain, the asset complete date is recorded and timestamped in a smart contract.

At 618, the physical asset produced is "tethered" to the digital asset using, for example, an NFC chip or QR code embedded in or placed on the physical asset. At 620, the physical asset, for example, sneakers, is picked up by a logistics provider. In some embodiments, optionally, at 622, a smart contract is automatically updated with shipping updates provided by the logistics provider. In some embodiments, optionally, at 624, upon receipt of the physical asset by the user, the user scans the physical asset to ensure authenticity.

Figure 7:
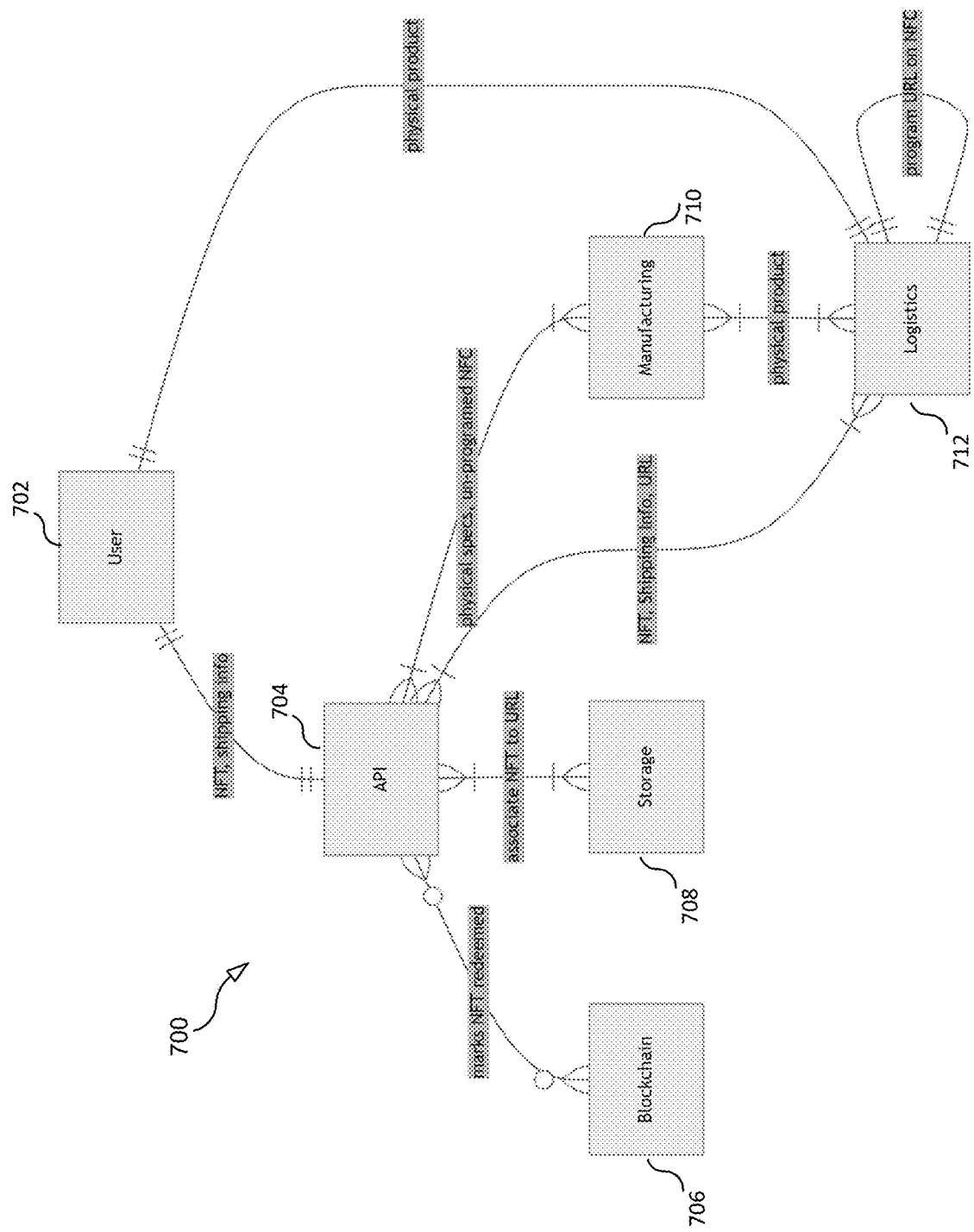
FIG. 7 is a block diagram illustrating a method for physical asset creation and shipment according to some embodiments.

FIG. 7 is a block diagram 700 illustrating a method for physical asset creation and shipment according to some embodiments. A user 702 transmits information to, for example, an application programming interface (API) 704, including information identifying an NFT and the user's shipping information. The API 704 marks the NFT as redeemed and transmits that information to a distributed ledger, such as the blockchain ledger 706. The API 704 also associates the NFT to a Uniform Resource Locator (URL) and transmits that information to storage 708. The API 704 also transmits the physical specifications for the physical asset redeemed along with an un-programmed NFC chip to manufacturing 710. Manufacturing 710 will manufacture the physical product according to the specifications and, for the NFC chip, for example, embedding it in the physical product (e.g., in the sole of a sneaker). The completed physical product is provided to logistics 712.

The API 704 also transmits to logistics 712 information including the NFT, shipping information, and the URL. Logistics 712 will program the NFC chip with the URL. In the final step of the process, the physical product is shipped to the user 702.

For manufacturing of a physical product, in some embodiments, a shoe of specified size is created. During the manufacturing process, an unprogrammed NFC chip is inserted into the shoe, such as a sneaker. Once complete, the sneaker is prepared for shipping. This may involve associating the sneaker with a given individual per normal means. At this time, the NFC chip may also be programmed with the URL that was generated for the specific user+NFT. The shoe is then shipped to the user with the programmed chip which allows the user to scan it and validate the authenticity, as well as understand the relationship with the entangled NFT. In some embodiments, the same URL could be turned into a QR code and attached to the product box.

As described with reference to FIG. 7, the NFC chip is programmed at the end of the manufacturing process, and this allows us to place any chip inside of any sneaker, then associate the chip with a particular NFT at the end of the mfg/logistics process: 1) we send a list of data (shipping address, nft, url); 2) the sneaker is made with an empty chip; 3) when packaged for shipping the chip is programmed with the nft, url; and 4) the unique sneaker with associated nft, url is shipped to the user.

Figure 8:
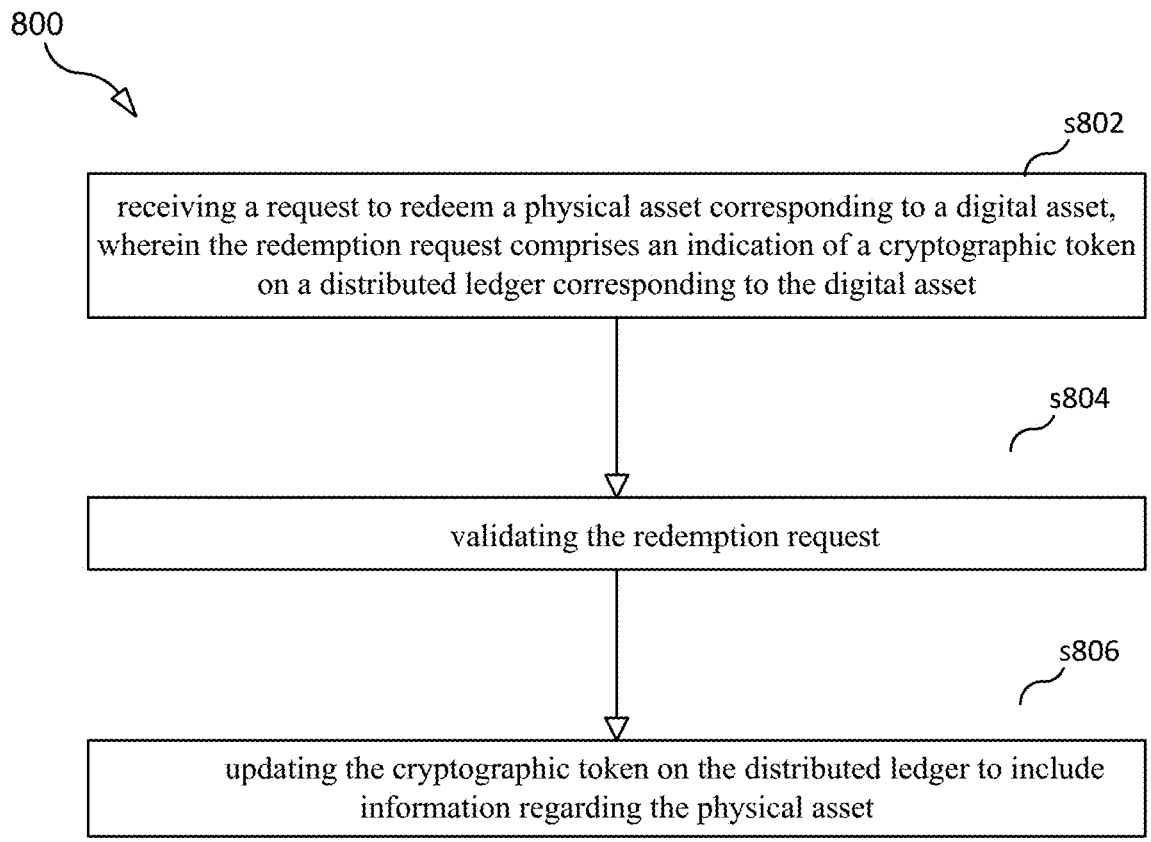
FIG. 8 is a block diagram illustrating a method for redeeming a digital asset for a physical asset according to some embodiments.

FIG. 8 is a block diagram illustrating a method 800 for redeeming a digital asset for a physical asset according to some embodiments. Method 800 may begin with step s802.

Step s802 comprises receiving a request to redeem a physical asset corresponding to a digital asset, wherein the redemption request comprises an indication of a cryptographic token on a distributed ledger corresponding to the digital asset.

Step s804 comprises validating the redemption request. Step s806 comprises updating the cryptographic token on the distributed ledger to include information regarding the physical asset.

In some embodiments, the method includes manufacturing the physical asset. In some embodiments, the method includes transmitting a first message comprising a prompt, wherein the prompt includes one or more parameters to customize the physical asset, transmitting the first message towards a user device, and receiving a second message comprising one or more values for the one or more parameters for manufacturing the physical asset according to the one or more values for the one or more parameters.

In some embodiments, the information comprises an indication that the physical asset has been redeemed. In some embodiments, the method includes generating the digital asset, wherein the digital asset comprises one or more digital files and each of the one or more digital files includes a digital representation of the digital asset, and recording information related to the digital asset as the cryptographic token on the distributed ledger, said information including at least a first cryptographic hash representing the digital asset and ownership information associated with the digital asset.

In some embodiments, the method includes receiving a request to purchase the digital asset, wherein the purchase request comprises transaction information identifying at least the cryptographic token and a digital wallet associated with a user, transmitting, upon validation of the purchase request, cryptographic information to the digital wallet associated with the user, wherein the cryptographic information links the user with the cryptographic token, updating the digital ledger to record the transaction, and updating the cryptographic token with information related to the transaction, said information including at least new ownership information based on the transaction.

In some embodiments, the method includes storing a digital file of the one or more digital files on a decentralized file storage system, and obtaining a second cryptographic hash representing the stored digital file. In some embodiments, the cryptographic token further includes information referencing the second cryptographic hash.

In some embodiments, the method includes uploading the one or more digital files to a remote server. In some embodiments, the cryptographic token further includes metadata identifying a location of the one or more digital files. In some embodiments, the digital wallet is provided by a third-party service.

In some embodiments, the digital wallet is created by the user. In some embodiments, the validation of the purchase request includes determining the user associated with the purchase request and determining that the user placed a winning bid for the digital asset at an auction. In some embodiments, the method further includes updating the cryptographic token to include information relating to one or more of a price of the digital asset and a price of the physical asset.

In some embodiments, the method includes determining, using the pricing information, royalty payments reflecting predetermined ratios. In some embodiments, the digital asset is one of a limited amount of identical digital assets. In some embodiments, the digital asset is unique. In some embodiments, the physical asset is one of many identical physical assets. In some embodiments, the physical asset is one of a limited amount of identical physical assets. In some embodiments, the physical asset is a unique physical asset.

In some embodiments, the method further includes creating a unique domain name associated with the digital asset, wherein the unique domain name is recorded on the distributed ledger as a second cryptographic token, and wherein there is an association between the first cryptographic token and the second cryptographic token.

In some embodiments, the unique domain name resolves to a webpage that includes information about the digital asset. In some embodiments, the physical asset is one or more of: footwear, apparel, equipment, an event ticket, and a functional asset. In some embodiments, the distributed ledger is a blockchain ledger. In some embodiments, the digital wallet is a blockchain-based wallet.

In some embodiments, the cryptographic token is a non-fungible token (NFT). In some embodiments, the cryptographic token is one or more of: an Ethereum Request for Comments (ERC) standard token or a Solana (SOL) token. In some embodiments, the cryptographic token is a governance token that includes the ability to vote on and/or to participate in certain actions. In some embodiments, the one or more digital files includes two-dimensional design files and/or three-dimensional design files.

Given the properties of certain 3D design files, some are static and some are dynamic. Some 3D files may not generate the exact same hash each time. In order to create a consistent hash for validating the authenticity of the digital file and/or integrating the digital asset into a digital environment (such as a video game, a virtual reality application, or an augmented reality application), the nature of the 3D file should be considered. If a 3D design file is static, then the application hashes the 3D file. The application checks the hash of 3D file before rendering in the application.

Third parties are able to integrate with the API (e.g., the Endstate API) to check/validate the hash before rendering the asset in their environment (e.g., a Fortnite player wants to put Endstate sneakers on their Fortnite avatar. The player enters their token/credentials showing ownership of the sneakers, and Fortnite calls our API to validate the hash).

If a 3D design file is dynamic, then the application (e.g., the Endstate application) hashes a 2D rendering of the 3D design file. Our application hashes the 2D design file that is used to build the 3D artifact. Each time the asset is loaded/rendered, the hash of the 2D file is checked against the blockchain (and/or Endstate servers), and the 3D artifact is built using the verified 2D file. Third parties may use our API to validate the 2D design file. If validated, the third party makes another API call to build the 3D asset based on the verified 2D design file.

Figure 9:
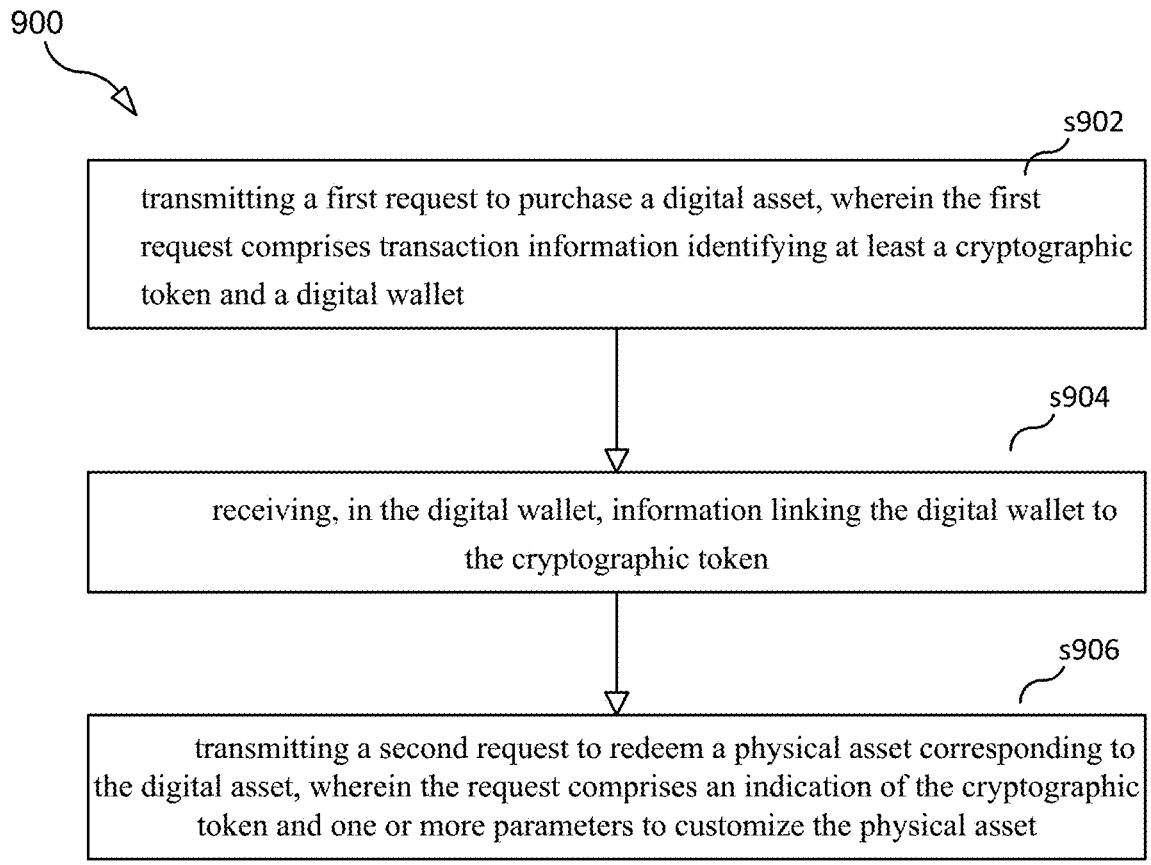
FIG. 9 is a block diagram illustrating a method for redeeming a digital asset for a physical asset according to some embodiments.

FIG. 9 is a block diagram illustrating a method 900 for redeeming a digital asset for a physical asset according to some embodiments. Method 900 may begin with step s902.

Step s902 comprises transmitting a request to purchase a digital asset, wherein the purchase request comprises transaction information identifying at least a cryptographic token and a digital wallet.

Step s904 comprises receiving, in the digital wallet, information linking the digital wallet to the cryptographic token. Step s906 comprises transmitting a request to redeem a physical asset corresponding to the digital asset, wherein the redemption request comprises an indication of the cryptographic token and one or more parameters to customize the physical asset.

In some embodiments, the method includes receiving the physical asset manufactured in accordance with the one or more parameters. In some embodiments, the digital asset is one of a limited amount of identical digital assets. In some embodiments, the digital asset is unique. In some embodiments, the physical asset is one of many identical physical assets. In some embodiments, the physical asset is one of a limited amount of identical physical assets. In some embodiments, the physical asset is a unique physical asset.

In some embodiments, the physical asset is one or more of: footwear, apparel, equipment, an event ticket, and a functional asset. In some embodiments, the digital wallet is a blockchain-based wallet. In some embodiments, the cryptographic token is a non-fungible token (NFT). In some embodiments, the cryptographic token is one or more of: an Ethereum Request for Comments (ERC) standard token or a Solana (SOL) token. In some embodiments, the cryptographic token is a governance token that includes the ability to vote on and/or to participate in certain actions.

In some embodiments, the physical asset is footwear made from materials that reduce the carbon footprint of the footwear, including one or more of:
 (i) a sole made from recycled materials;
 (ii) an upper made from recycled materials;
 (iii) a sole including chopped up pieces of used soles or other recycled materials as a base material joined by melting, melding, or reforming the pieces into one contiguous sole;
 (iv) a 3D printed sole made using recycled yarns and/or threads as filament;
 (v) a 3D printed upper made using recycled yarns and/or threads as filament;
 (vi) a sole with carbon dioxide gas ($CO_2$) physically embedded into the sole; or
 (vii) a sole with an air-tight bladder into which carbon dioxide gas ($CO_2$) is pumped, thereby locking the carbon away for the duration of the life of the footwear.

In some embodiments, the physical asset is footwear including at least one or more of:
 (i) an interchangeable sole;
 (ii) an interchangeable upper;
 (iii) electrical fibers capable of creating a haptic response resulting in a sensation felt by a wearer of the footwear; and
 (iv) electrical fibers configured to communicate with an application.

Figure 10:
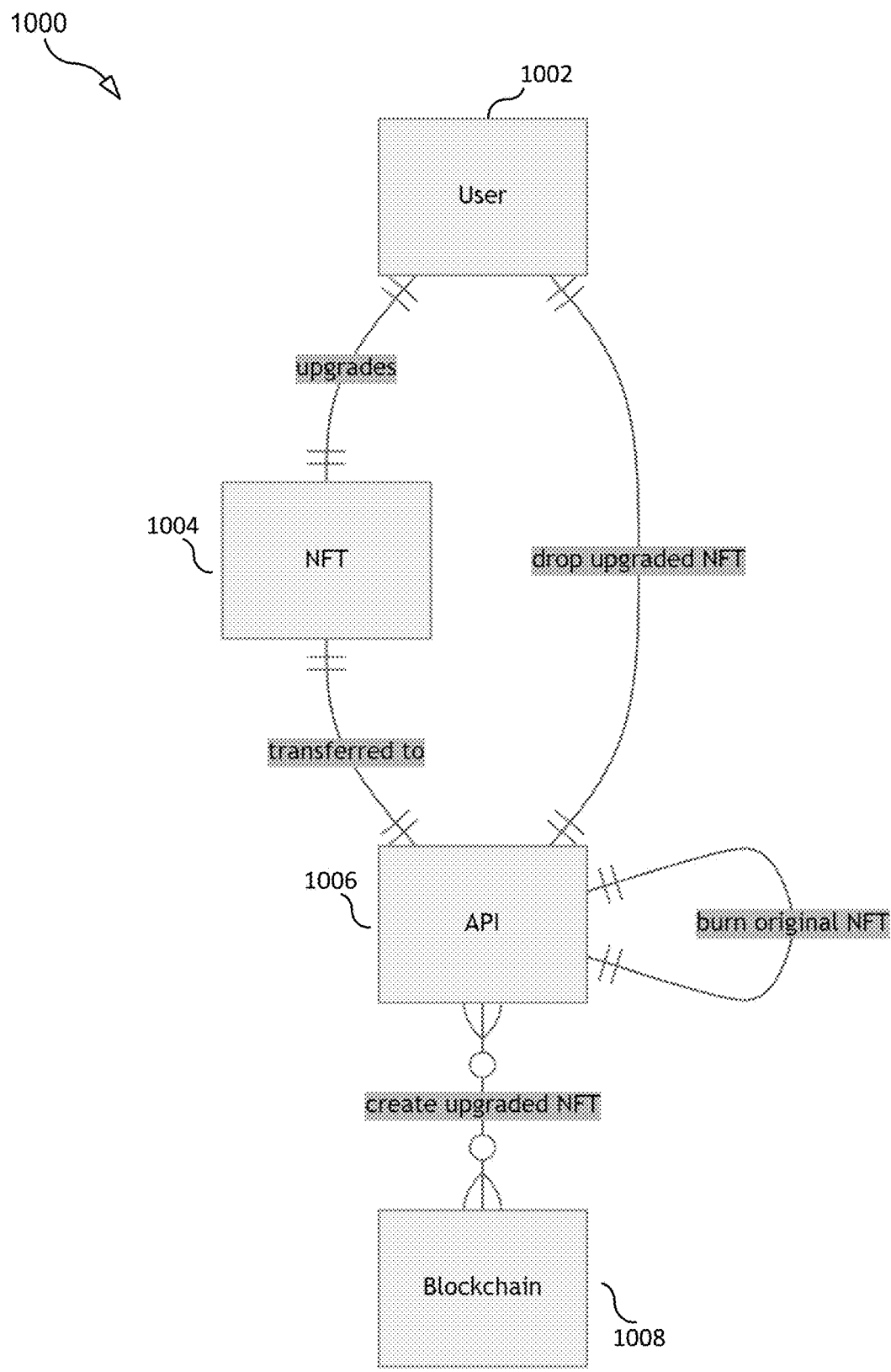
FIG. 10 is a block diagram illustrating a method for upgrading a cryptographic token according to some embodiments.

FIG. 10 is a block diagram illustrating a method for upgrading a cryptographic token according to some embodiments. In some embodiments, the user's current token (e.g., NFT) can be upgraded. In some cases the upgrade may be necessary, in order to, for example, provide additional data or further functionality to the asset, and in others cases it may be optional. In some embodiments, the upgrade may be accomplished by asking the user to connect their wallet. The application (e.g., API) can identify any NFTs that might need to be upgraded. The API may be utilized in this capacity as it can more easily maintain the list of NFTs (possibly in a data storage sub-system). The user can then select which NFT they might want to upgrade. They sign a transaction to transfer the NFT to a company (e.g., Endstate). The company can then mint a new (upgraded) NFT and drop it to the user's wallet. The edition information is preserved. The original NFT is burned. A reference to the prior NFT, for historic reasons, can be captured within the new NFT.

Referring now to FIG. 10, a user 1002 provides an NFT 1004 for upgrade. The NFT 1004 is transferred to API 1006. API 1006 creates the upgraded NFT and records the information on the blockchain 1008. The API 1006 burns the original NFT, and drops the upgraded NFT in, for example, a digital wallet of user 1002.

Figure 11:
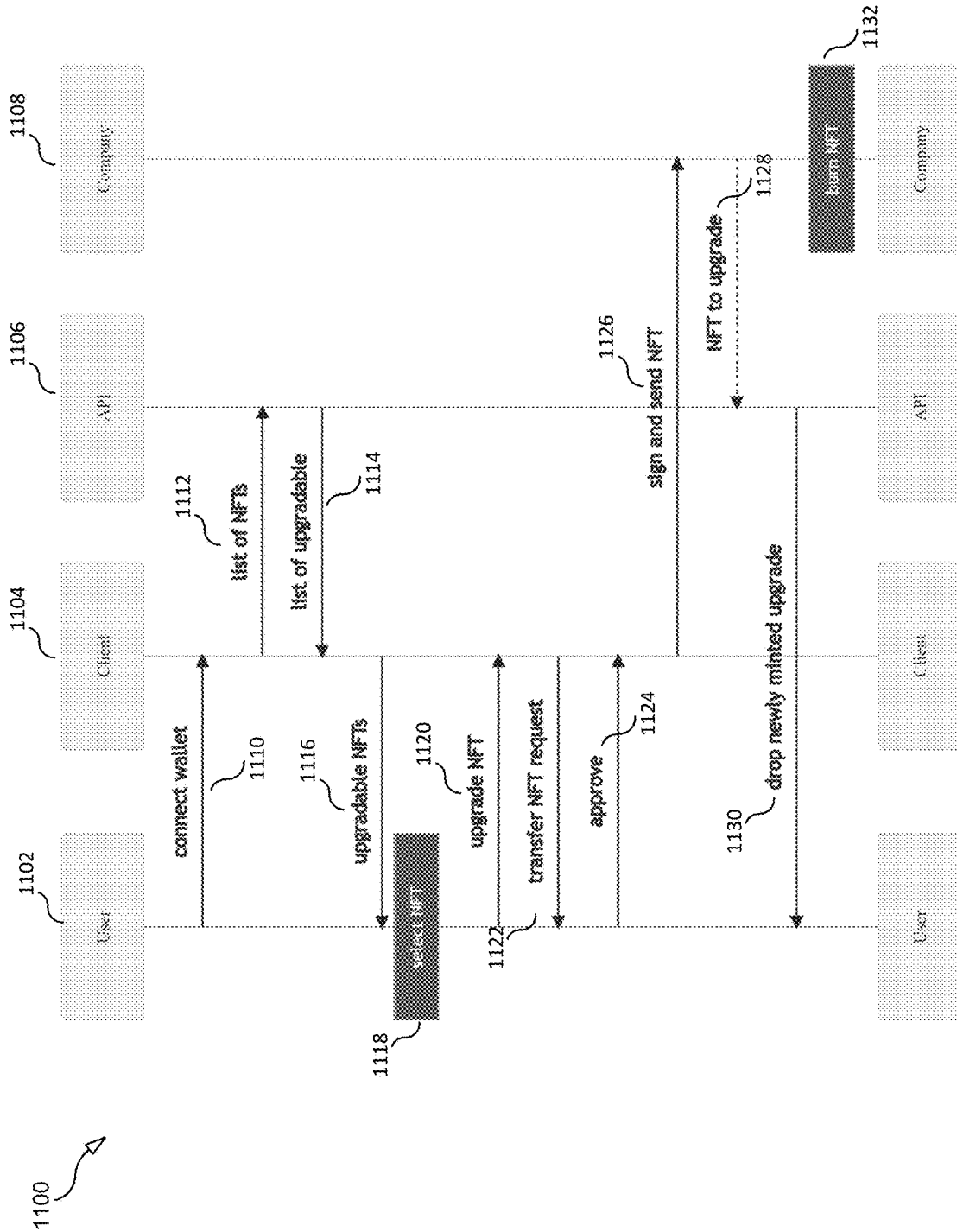
FIG. 11 is a sequence diagram illustrating a method for upgrading a cryptographic token according to some embodiments.

FIG. 11 is a sequence diagram 1100 illustrating a method for upgrading a cryptographic token according to some embodiments.

In order for a user to redeem their NFT to claim physical goods they would have to log in to their wallet and connect their wallet to the Endstate application potentially for the purposes of authenticating their identity. This will allow the Endstate system to give the user a list of NFTs that could be redeemed. The user then selects the NFT they want to redeem. The user is then required to enter information about the nature of the physical product they wish to redeem (e.g. shoe size), as well as their shipping and contact information, so that a physical product can be created according to their specifications and delivered accordingly. The Endstate system can then update the NFT as redeemed, store information about the nature of the physical item associated with the NFT (shoe size), and store the encrypted chip data associated with the NFT. This data is an encrypted hash of the NFT address as well as the redemption information (shoe size) along with a salt. The encrypted value is appended to a URL and programmed into the NFC chip embedded within the physical goods. It is possible that we would use a URL caching system (i.e. a tiny URL) that would allow us to use smaller URLs on the NFC chip. When called these URLs would redirect to the proper URL with encryption parameters The user is able to visit the Endstate site and authenticate their identity by use of their wallet. This is done by asking the user to sign a randomly generated text value. They do so with their private key locally. The signed value is submitted to the Endstate system. The system can then use the user's public key to ensure that they signed the correct value. If so then the Endstate system will authenticate and be able trust the identity of the user. This acts as a means to log the user into the Endstate services for non-blockchain based operations. The API could go so far as to issue a JSON Web Token (JWT) to the user for use until expired Referring now to the sequence diagram 1100 of FIG. 11, the steps in an exemplary process for upgrading a cryptographic token, such as an NFT, are illustrated and involve:
  (i) User 1102
  (ii) Client 1104
  (iii) API 1106
  (iv) Company 1108

At 1110, the digital wallet of user 1102 is connected to the client 1104. At 1112, the client 1104 transmits a list of NFTs to API 1106 and, at 1114, API 1106 transmits a list of NFTs that are upgradable back to the client 1104. At 1116, the upgradable NFTs are sent from the client 1104 to the user 1102. At 1118, the user 1102 makes a selection of the NFT the user wants to upgrade. At 1120, information identifying the NFT to upgrade is transmitted to the client 1104. At 1122, the client 1104 sends a transfer NFT request to the user 1102 for approval. At 1124, the user 1102 sends the approval to the client 1104 and, at 1126, the client 1104 sends the user's signature and the NFT to be upgraded to the company 1108. At 1128, the company send the NFT to upgrade to the API 1106. At 1130, the API 1106 drops the newly minted upgraded NFT in the digital wallet of user 1102. At 1132, the company 1108 burns the now old NFT that was upgraded.

Figure 12:
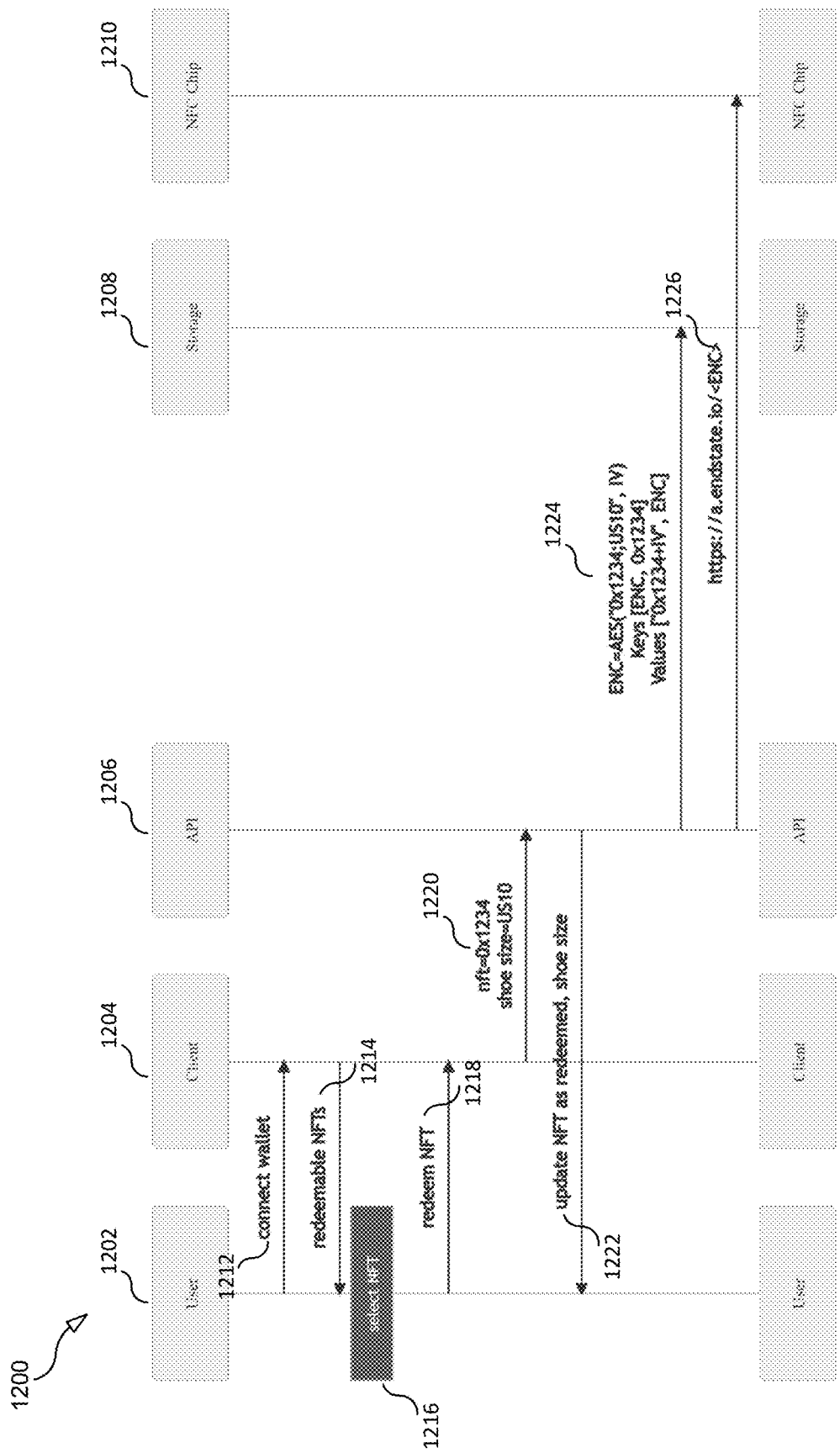
FIG. 12 is a sequence diagram illustrating a method for redeeming a digital asset for a physical asset according to some embodiments.

FIG. 12 is a sequence diagram 1200 illustrating a method for redeeming a digital asset for a physical asset according to some embodiments. In some embodiments, each digital asset has its own associated, unique domain name. The digital design file/associated asset and associated NFT may own another NFT which represents ownership of a domain name. In some embodiments, this NFT/domain name resolves to a decentralized naming system. For example, the design file NFT smart contract would own another NFT representing a domain name on the Ethereum Naming System (ENS), such as endstate.eth.

In some embodiments, the design file NFT smart contract owns another NFT representing a domain name on the Handshake decentralized naming infrastructure. In some embodiments, the company (e.g., Endstate) owns a namespace/domain extension, and each design asset would have its own domain within this namespace. For example, the company could buy and own the /digitalshoes namespace (dshoe).

In some embodiments, for example, each digital sneaker has a corresponding domain within the /dshoe namespace. In some embodiments, the domain names could be serial numbers. ex: 000001.dshoes. In some embodiments, the domain names could be the name of the shoe line +a unique identifier. ex: some-shoe-001.dshoes.

In some embodiments, the domain name resolves to a website that has identifying information about the digital sneaker, such as when it was created, the designer, prior owners, prior sale prices, current sale price, the digital design file, possible digital integrations, etc. A potential buyer could visit some-shoe-001.dshoe to find content and history around the NFT as well as potentially make an offer to the owner. A integration partner could visit some-shoe-001.dshoe to determine if a user in question is the owner and has activated access before deciding to grant anything to the user.

Referring now to the sequence diagram 1200 of FIG. 12, a process for redeeming a digital asset for a physical asset is illustrated that involves:
  (i) User A 1202
  (ii) Client 1204
  (iii) API 1206
  (iv) Storage 1208
  (v) NFC Chip 1210

At 1212, the user 1202 initiates the connection of his/her digital wallet to client 1204. At 1214, the client 1204 sends a list of redeemable NFTs to the user ###

Figure 13:
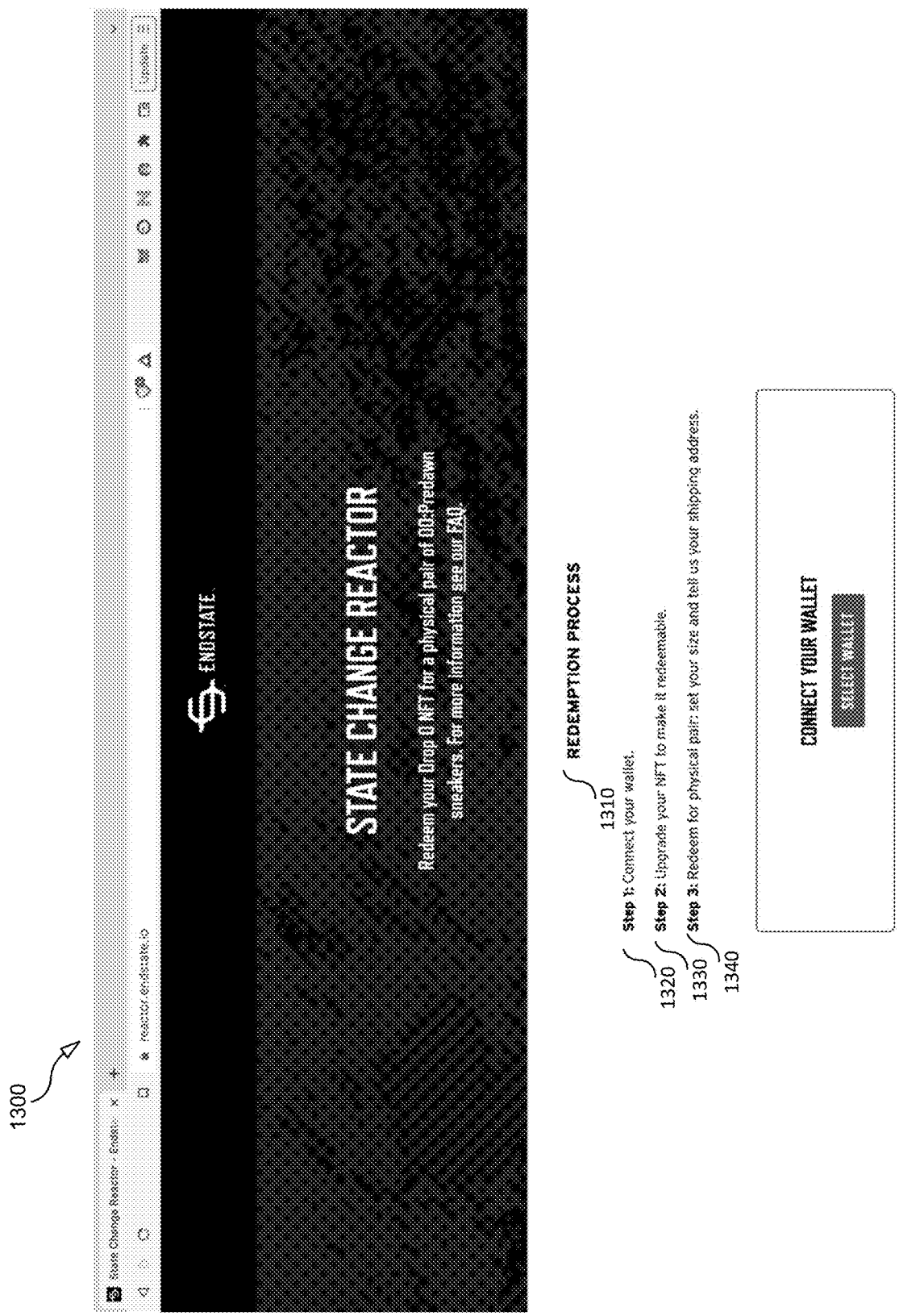
FIG. 13 is a screen shot illustrating an exemplary implementation of a method for redeeming a digital asset for a physical asset according to some embodiments.

FIG. 13 is a screen shot 1300 illustrating an exemplary implementation of a method for redeeming a digital asset for a physical asset according to some embodiments. Screen shot 1300 shows the steps in the redemption process 1310:
  (i) Step 1: Connect your wallet—1320
  (ii) Step 2: Upgrade your NFT to make it redeemable—1330
  (iii) Step 3: Redeem for physical pair: set your size and tell us your shipping address—1340.

Figure 14:
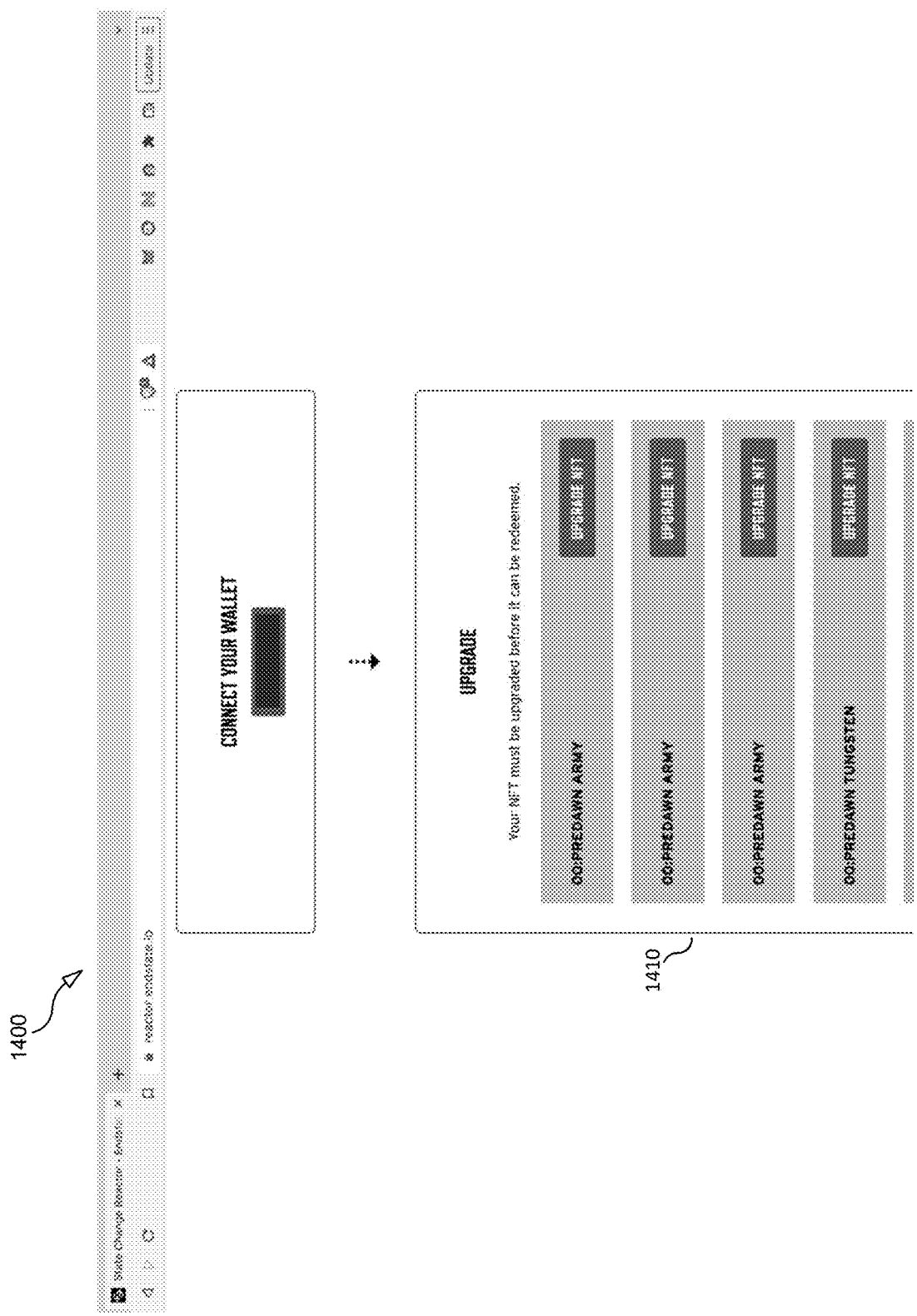
FIG. 14 is a screen shot illustrating an exemplary implementation of a method for redeeming a digital asset for a physical asset according to some embodiments.

FIG. 14 is a screen shot 1400 illustrating an exemplary implementation of a method for redeeming a digital asset for a physical asset according to some embodiments. Screen shot 1400 shows a list of upgradeable NFTs 1410. An NFT must be upgraded before it can be redeemed.

Figure 15:
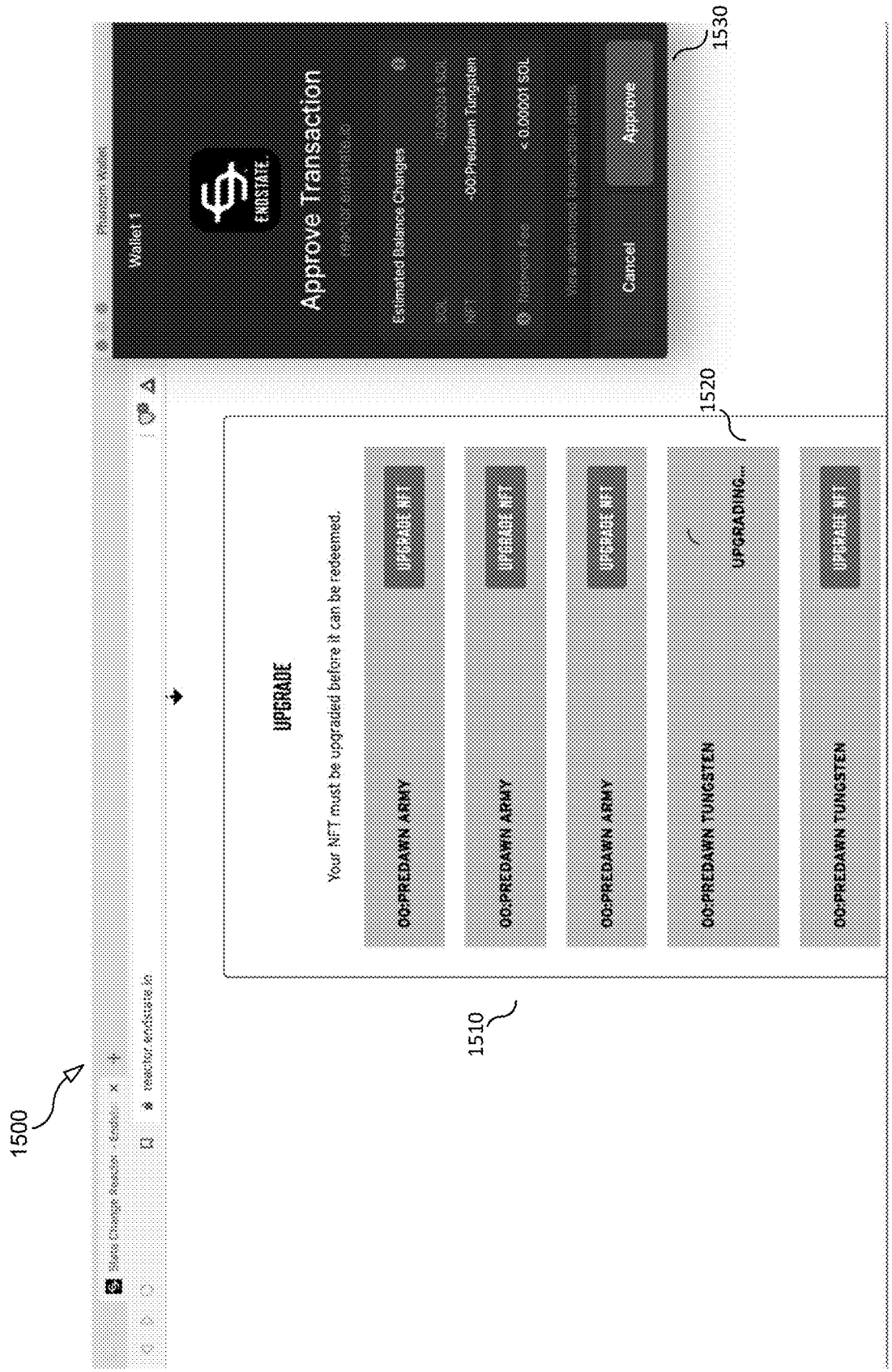
FIG. 15 is a screen shot illustrating an exemplary implementation of a method for redeeming a digital asset for a physical asset according to some embodiments.

FIG. 15 is a screen shot 1500 illustrating an exemplary implementation of a method for redeeming a digital asset for a physical asset according to some embodiments. Screen shot 1500 shows the list of upgradeable NFTs 1510. The 00:PREDAWN TUNGSTEN NFT 1520 is shown as upgrading. A user's digital wallet 1530 shows the transaction details and prompt chosen by the user to approve the upgrade.

Figure 16:
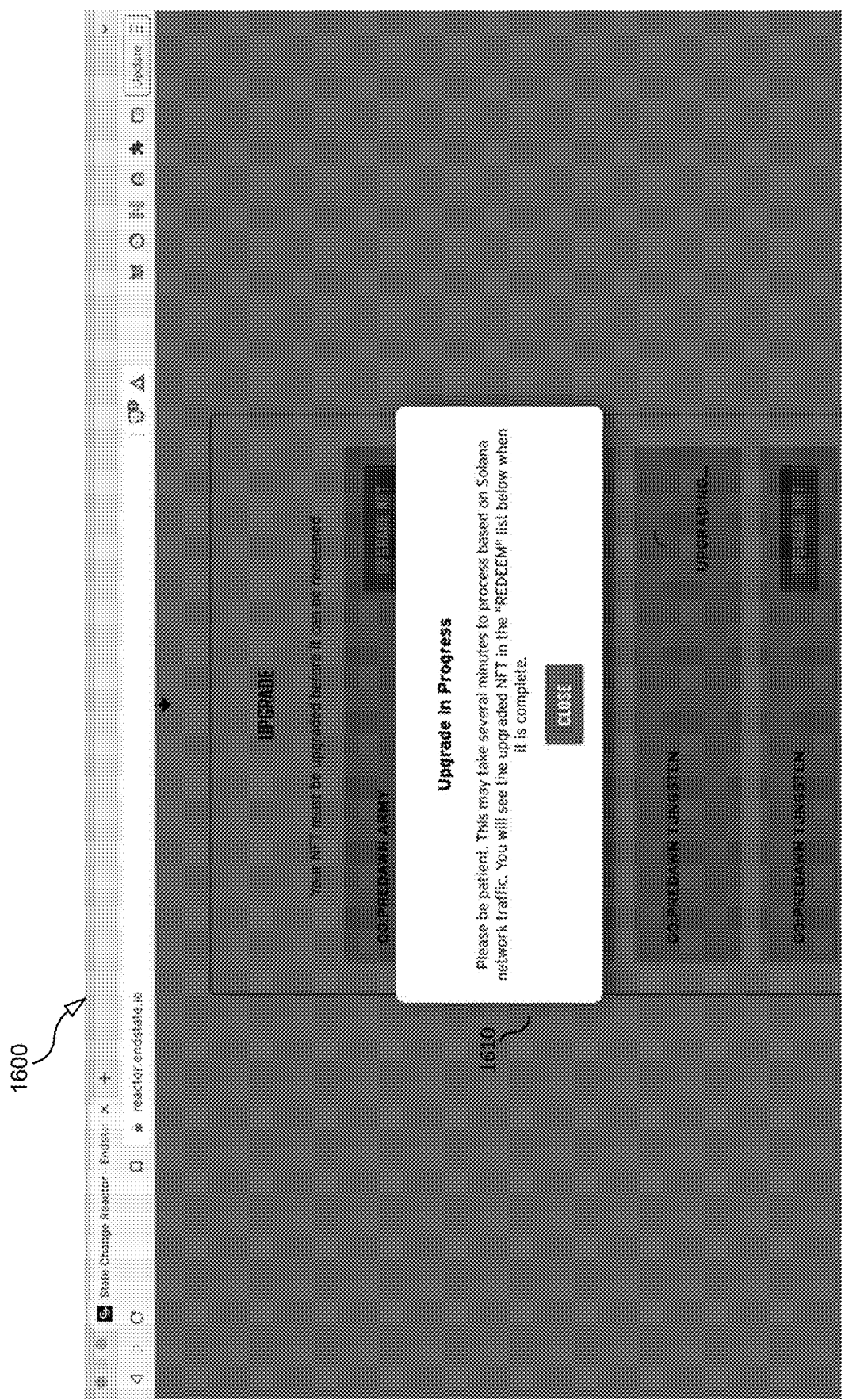
FIG. 16 is a screen shot illustrating an exemplary implementation of a method for redeeming a digital asset for a physical asset according to some embodiments.

FIG. 16 is a screen shot 1600 illustrating an exemplary implementation of a method for redeeming a digital asset for a physical asset according to some embodiments. Screen shot 1600 shows a popup box 1610 indicating that the upgrade is in progress and that the user will see the upgraded NFT in the "REDEEM" list when the upgrade is complete.

Figure 17:
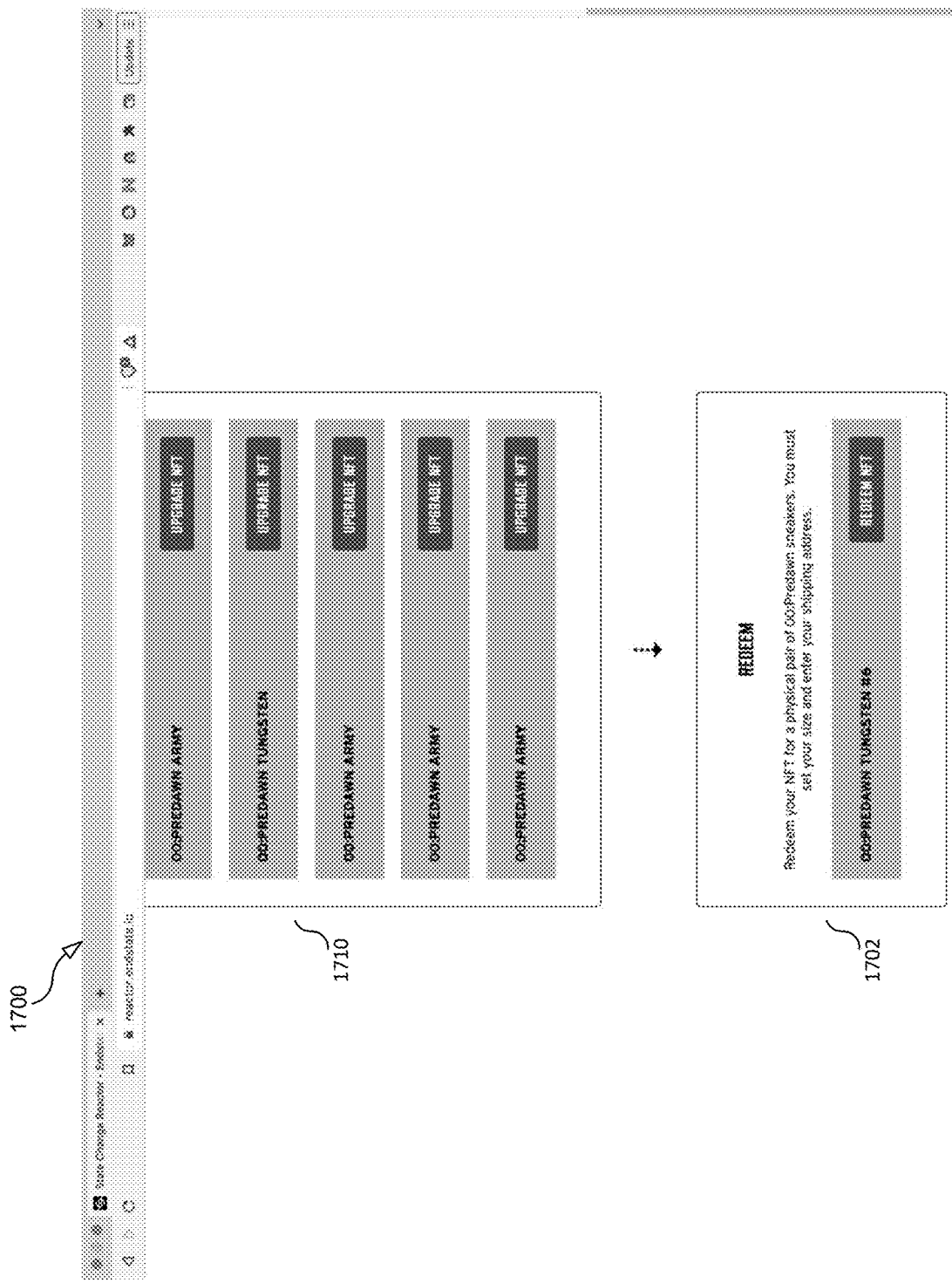
FIG. 17 is a screen shot illustrating an exemplary implementation of a method for redeeming a digital asset for a physical asset according to some embodiments.

FIG. 17 is a screen shot 1700 illustrating an exemplary implementation of a method for redeeming a digital asset for a physical asset according to some embodiments. Screen shot 1700 shows the "REDEEM" list 1710 indicating that the user can redeem the NFT for a physical pair of 00:Predawn sneakers, and that the user must set his or her size and enter the shipping address.

Figure 18:
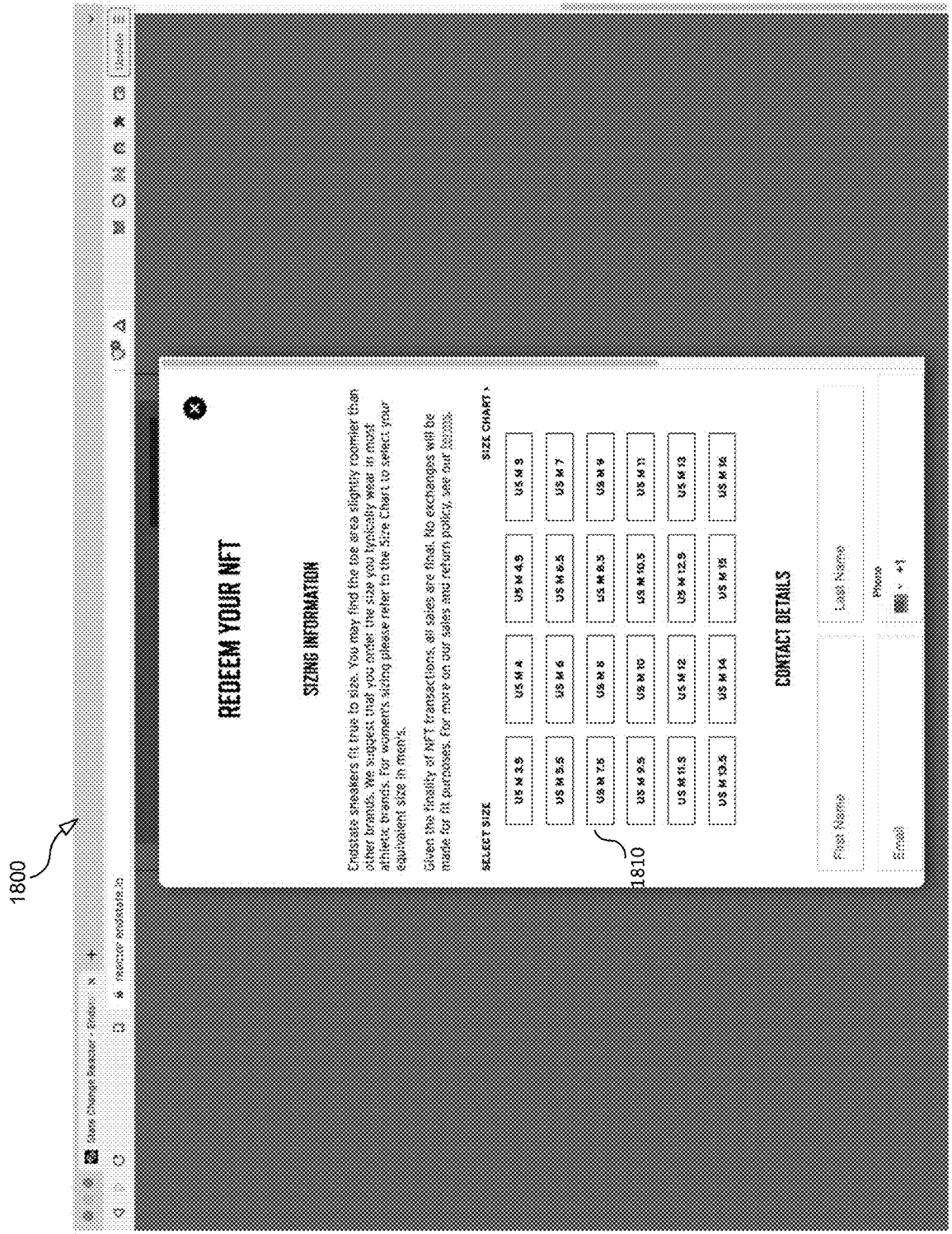
FIG. 18 is a screen shot illustrating an exemplary implementation of a method for redeeming a digital asset for a physical asset according to some embodiments.

FIG. 18 is a screen shot 1800 illustrating an exemplary implementation of a method for redeeming a digital asset for a physical asset according to some embodiments. Screen shot 1800 shows the sizing information 1810 for the company's (i.e., Endstate) sneakers, which must be selected as part of the process of the user redeeming his or her NFT.

Figure 19:
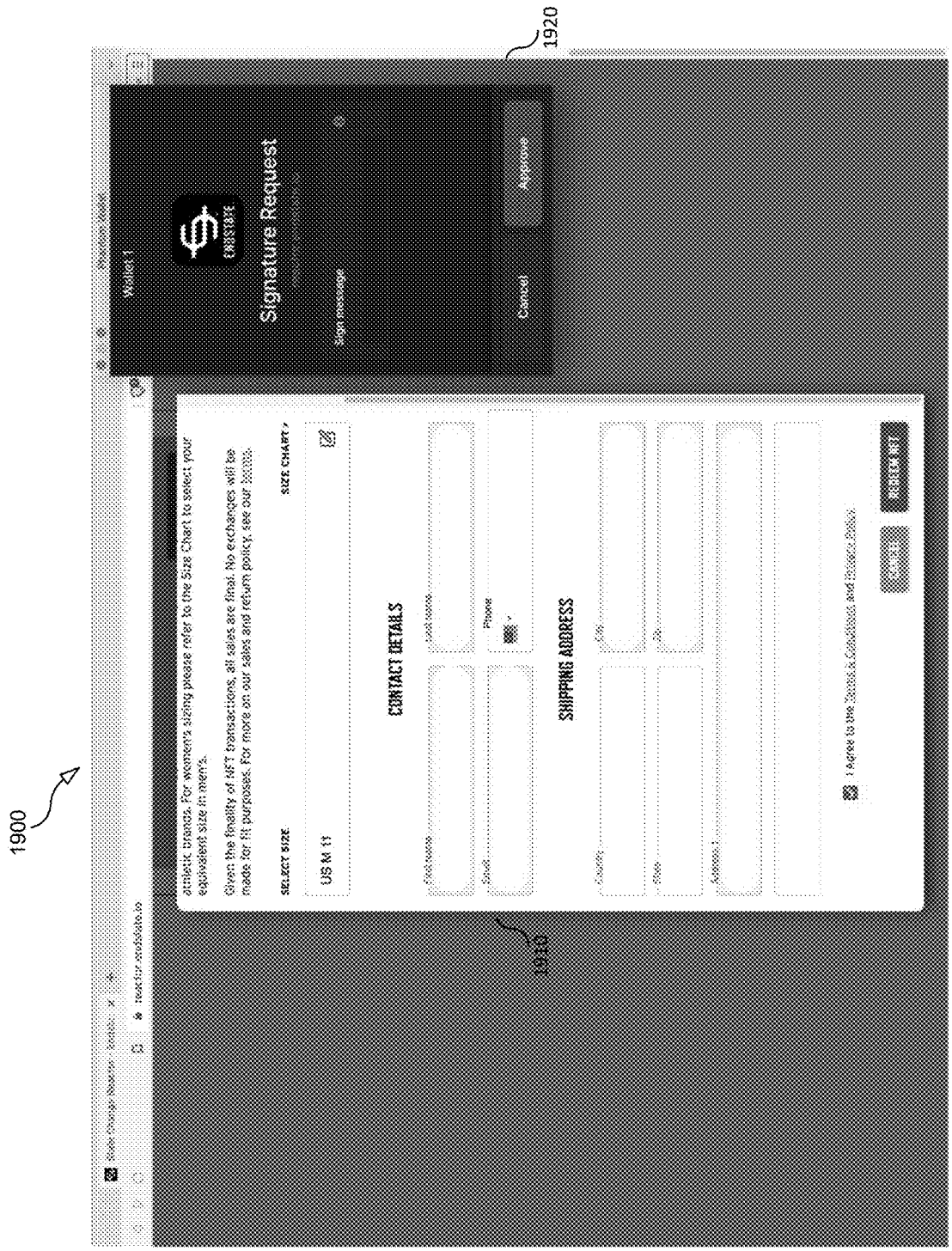
FIG. 19 is a screen shot illustrating an exemplary implementation of a method for redeeming a digital asset for a physical asset according to some embodiments.

FIG. 19 is a screen shot 1900 illustrating an exemplary implementation of a method for redeeming a digital asset for a physical asset according to some embodiments. Screen shot 1900 shows the size selected by the user and prompts 1910 for the user to enter contact details and shipping address. After this information is entered, the user must sign and approve the transaction in his or her digital wallet 1920.

Figure 20:
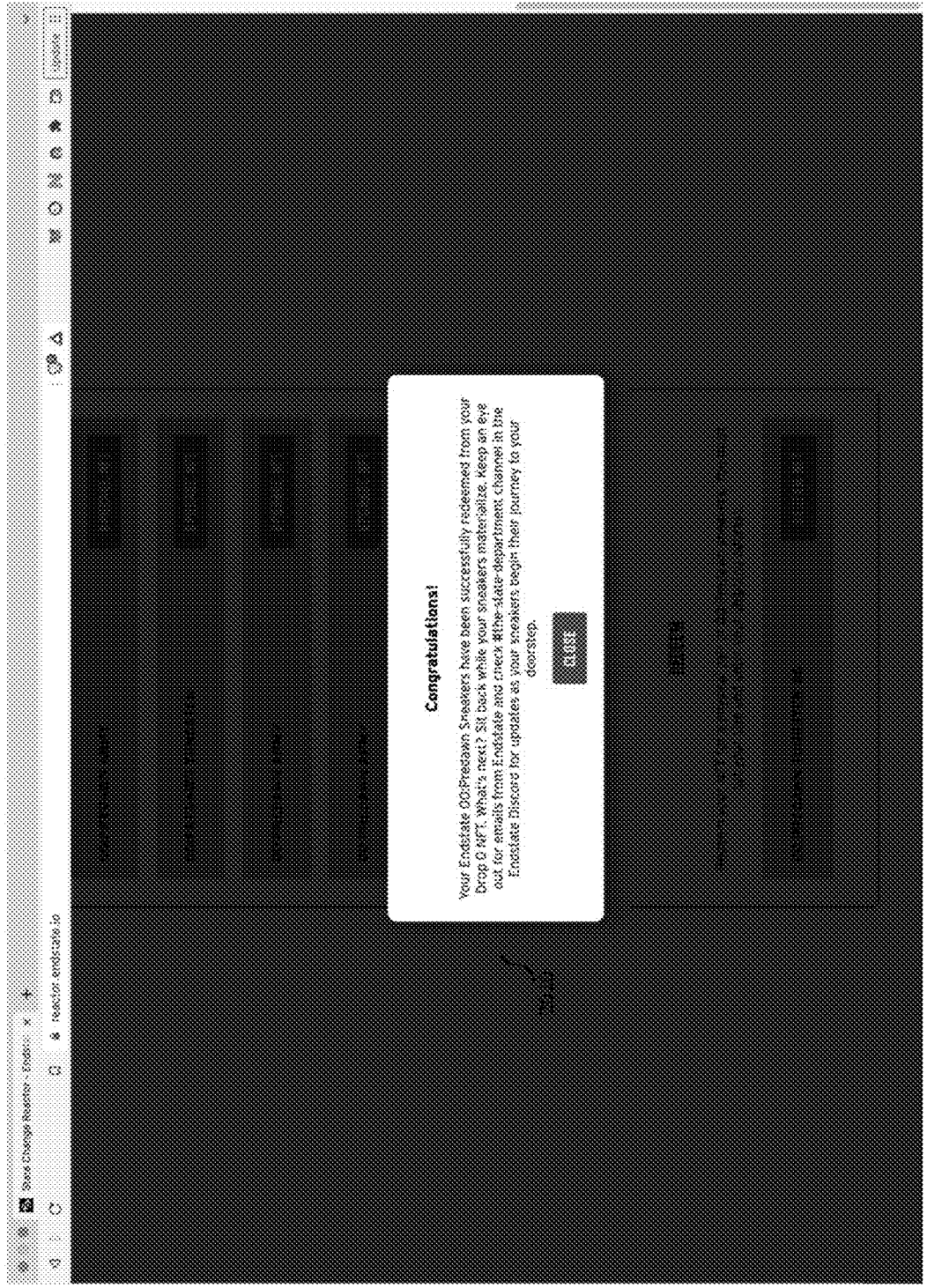
FIG. 20 is a screen shot illustrating an exemplary implementation of a method for redeeming a digital asset for a physical asset according to some embodiments.

FIG. 20 is a screen shot 2000 illustrating an exemplary implementation of a method for redeeming a digital asset for a physical asset according to some embodiments. Screen shot 2000 shows a popup box 2010 indicating "Congratulations!" to the user and that the user's Endstate 00:Predawn sneakers have been successfully redeemed from your Drop 0 NFT.

Figure 21:
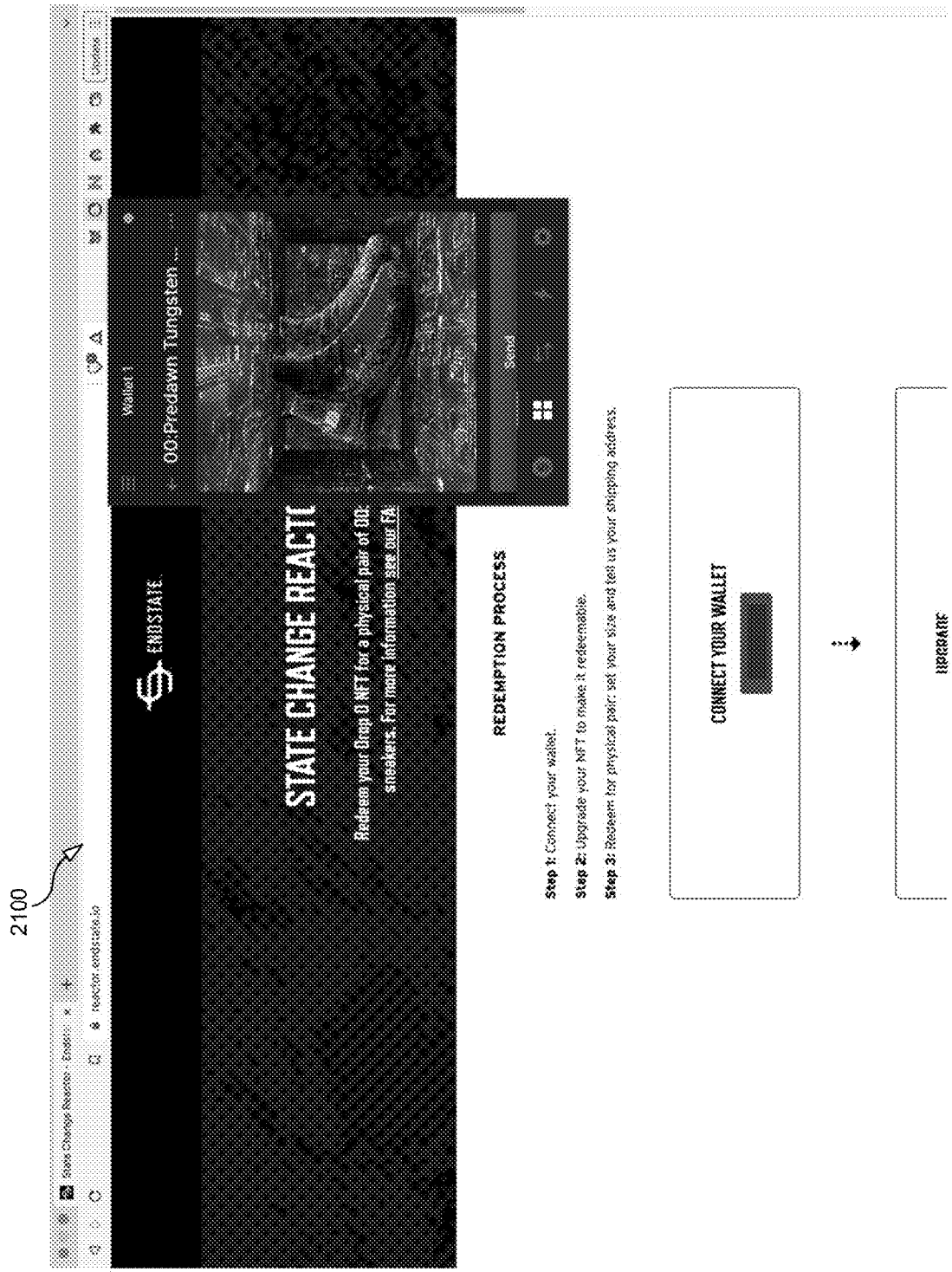
FIG. 21 is a screen shot illustrating an exemplary implementation of a method for redeeming a digital asset for a physical asset according to some embodiments.

FIG. 21 is a screen shot 2100 illustrating an exemplary implementation of a method for redeeming a digital asset for a physical asset according to some embodiments. Screen shot 2100 shows the user's Endstate 00:Predawn Tungsten sneakers, depicted in digital form, in the user's wallet.

Each digital sneaker/asset will be part of a series. In some embodiments, each sneaker that is a part of a certain series will be identical to each other sneaker in that series.

In other embodiments, each sneaker will have unique attributes. These unique attributes might be manifested through the digital asset/NFT or the physical asset/sneakers.

Each sneaker (both physical and digital) could have its own design.

In some embodiments the digital design may be different or unique to the user, while the physical asset is identical to the other sneakers in the series (or vice versa).

Each sneaker could have a serial number or the blockchain address/NFT public key printed on the upper or sole.

Each digital design/NFT could come with its own properties. For example, each digital design/NFT may have a unique design, serial number, characteristic, and/or message.

Example 1: if the digital design/NFT is part of a sneaker series honoring Satoshi Nakamoto (the creator of Bitcoin), each digital sneaker/NFT in the series could represent a different line or paragraph of the original bitcoin white paper. This way, even if the physical sneakers are identical (or nearly identical), the corresponding digital assets would still have their own unique properties. The particular line/paragraph of the white paper would be stored as metadata in the NFT.

Example 2: the digital design/NFT is part of a sneaker series designed by an artist, each NFT/digital asset could represent a different work of art created by that artist. The physical sneakers may be identical or nearly identical, but the digital design files for the digital asset/NFT could have two design files. 1. represents the physical sneaker 2. represents the unique work of art associated with that particular NFT.

Similar to the example listed above, if the collaborator is a musician, each digital sneaker/as set/NFT could be representative of a line in a song. The company (e.g., Endstate) would collaborate with the artist to release an entirely new song via the digital assets. For example, each digital asset represents one line/bar in the song; the sneaker/digital asset series is capped at the number of lines/bars in the song; users buying the digital assets/sneakers/NFTs would be able to listen to their line before the full song is released; the audio file with their line would be linked to the NFT representing the asset. the audio file may be represented as another digital token owned by the main NFT. In some embodiments, once all of the assets in the series were sold, the full song would be released. In some embodiments, digital assets representing lines that were sequential in the song would be more valuable than a random pairing of assets (or a single asset).

For example: a series of digital and/or physical assets represented by NFTs release "Hotel California" by the Eagles: Owning the asset representing "You can checkout any time you like" AND "But you can never leave!" is a valuable pairing because the lyrics appear in that order in the song.

In some embodiments, owning a digital asset tied to a line/bar in a song would also entitle the owner to receive partial royalties for that song. For example, when the NFT/digital asset series was designed, the artist agreed to share 10% of the song's royalties with the NFT owners. A user owns digital tokens/NFTs representing 2 bars in a song with 50 bars total bars. The user would be entitled to 4% of the streaming royalties owed to the token holders, which represent 10% of the songs overall streaming royalties.

Figure 22:
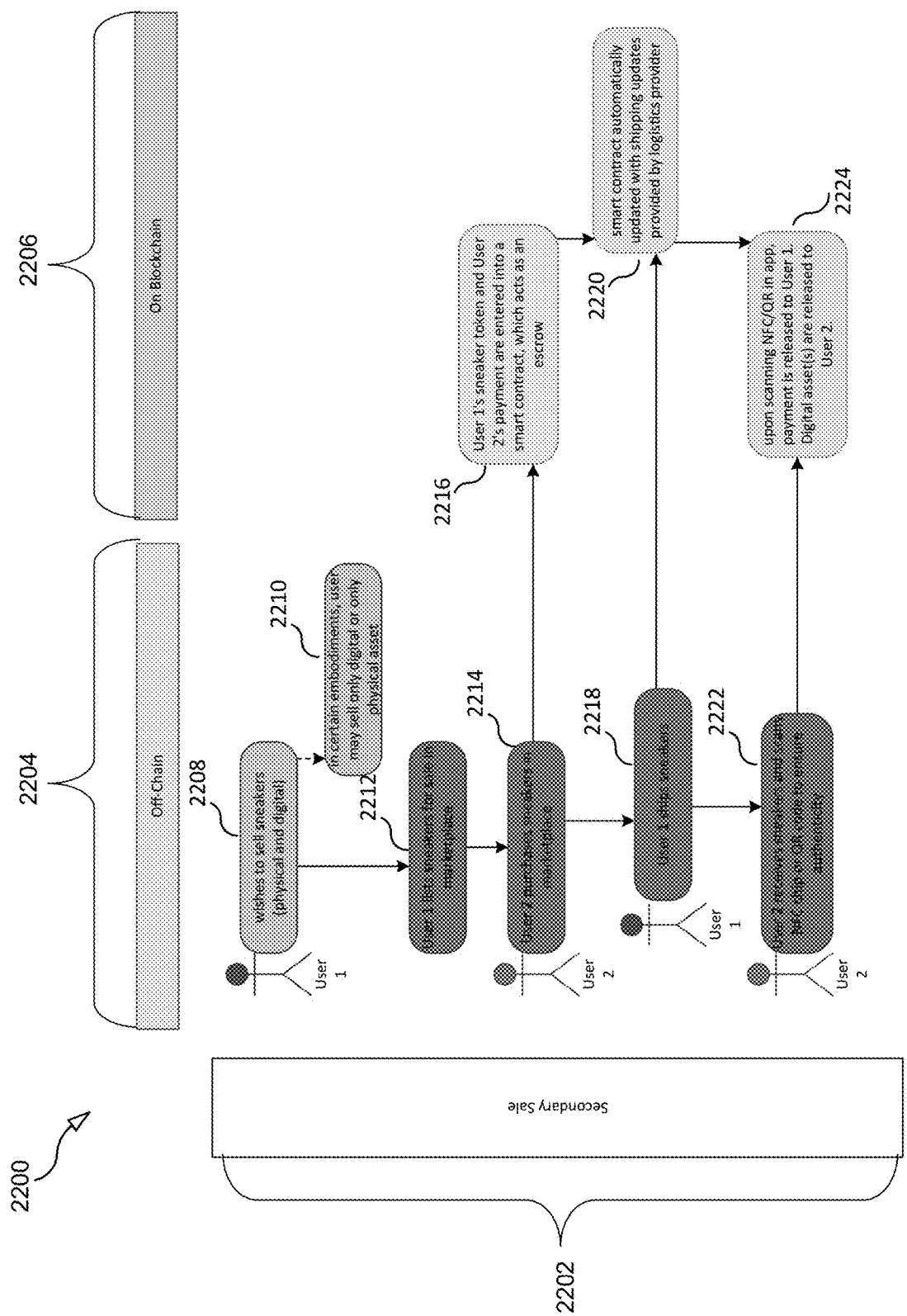
FIG. 22 is a block diagram illustrating a method for a secondary sale of a digital and physical asset according to some embodiments.

FIG. 22 is a block diagram 2200 illustrating a method for a secondary sale 2202 of digital and physical assets according to some embodiments. Some steps or transactions that are part of the method illustrated are performed "Off-Chain" 2204—that is, outside of a distributed ledger itself, such as the blockchain ledger—and other steps or transactions that are part of the method illustrated are performed "On Blockchain" 2206—that is, on a distributed ledger, such as the blockchain ledger, and which may be reflected on the distributed, public ledger.

At 2208, which is off-chain, a user 1 wishes to sell physical and digital assets—e.g., sneakers. In some embodiments, optionally, at 2210, the user may sell only a digital asset or only a physical asset. At 2212, the user lists the physical and digital assets—e.g., sneakers—for sale in a marketplace. At 2214, a user 2 purchases the physical and digital assets—e.g., sneakers—in the marketplace.

At 2216, which is on blockchain, user 1's sneaker token—e.g., for the physical and digital assets—e.g., sneakers—and user 2's payment are entered into a smart contract, which acts as an escrow. At 2218, which is off-chain, user 1 ships the sneakers, and at 2220, which is on blockchain, a smart contract is automatically updated with shipping updates provided by a logistics provider.

At 2222, which is off-chain, user 2 received the sneakers and scans the NFC chip or QR code to ensure authenticity. At 2224, which is on blockchain, upon scanning the NFC chip or QR code and an indication of authenticity by the application, payment is released to user 1, and the digital asset ("tethered" to the physical asset sold—i.e., the sneakers) is released to user 2.

Figure 23:
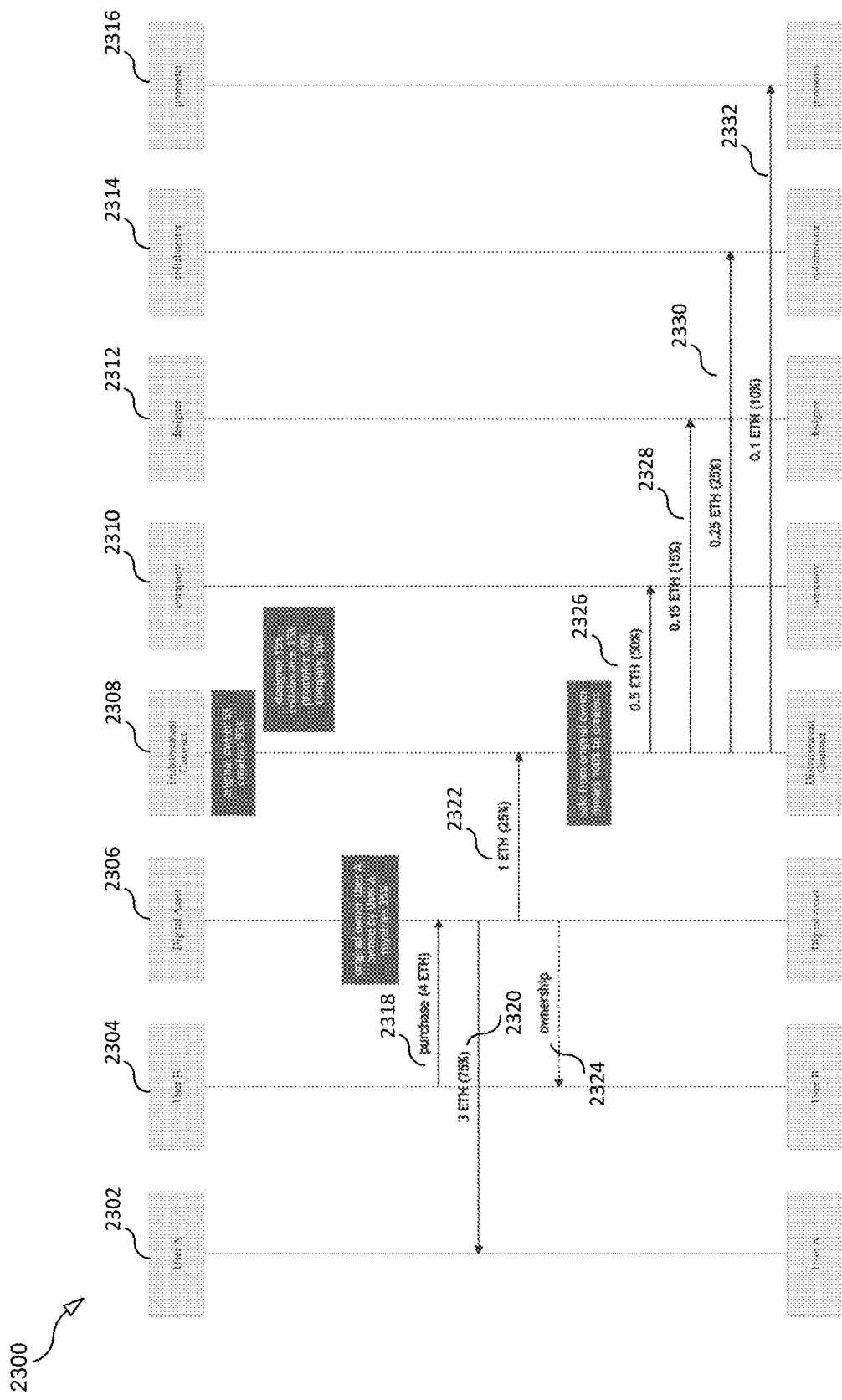
FIG. 23 is a sequence diagram illustrating a method for a secondary sale of a digital asset according to some embodiments.

FIG. 23 is a sequence diagram 2300 illustrating a method for a secondary sale of a digital asset according to some embodiments. Referring now to FIGS. 23, at 2318 and 2324, User A 2302 sells the digital/physical sneaker combination to User B 2304 for 4.0 ETH. When the NFT is purchased:
75% (3.0 ETH) is kept by User A—2320
25% (1.0 ETH) divided amongst the original creators of the assets—2322
0.15 ETH to designer—2328
0.25 ETH to collaborator—2330
0.1 ETH to promoter—2332
0.5 ETH to company—2326

This pattern would continue for each and every subsequent sale of the assets.

In some embodiments, the first owner of the asset would also participate in the upside of a resale.

Expanding on the example above, in this embodiment: The digital/physical sneaker combination is purchased by User A for 1.0 ETH. When the NFT is purchased, the division of the proceeds is unchanged from the above example:
0.15 ETH would go to the designer
0.25 ETH to the collaborator
0.10 ETH to the promoter
0.50 ETH to company However, in this embodiment when User A sells the digital/physical sneaker combination to User B, the smart contract is updated to include User A as a recipient of funds for future sales (in some embodiments, it may be necessary to "burn" the prior NFT token and mint a new token with the new payout schema in its place). If User A sells to User B for 4.0 ETH, the ratios for the division of the proceeds remain unchanged from the original example in the prior section:
- 3.0 ETH is kept by User A
- 1.0 ETH divided amongst the original creators of the assets
- 0.15 ETH to designer
- 0.25 ETH to collaborator
- 0.1 ETH to promoter
- 0.5 ETH to company During the transaction, User A added to the smart contract library representing the digital asset as a future beneficiary of resale (or the original token is burned and a new token is minted, which includes User A as a beneficiary of future sales) granting them 5% of future sales.

Then, were User B to sell the digital/physical asset to User C for 4.0 ETH, the proceeds of the sale would be divided as follows:
- (i) 75% (3.0 ETH) is kept by User B
- (ii) 25% (1.0 ETH) divided amongst the original creators of the assets and the original owner
- (iii) 0.1425 ETH to designer (14.25%)
- (iv) 0.2375 ETH to collaborator (23.75%)
- (v) 0.095 ETH to promoter (9.5%)
- (vi) 0.475 ETH to company (47.5%)
- (vii) 0.05 ETH to User A (5%)

Figure 24:
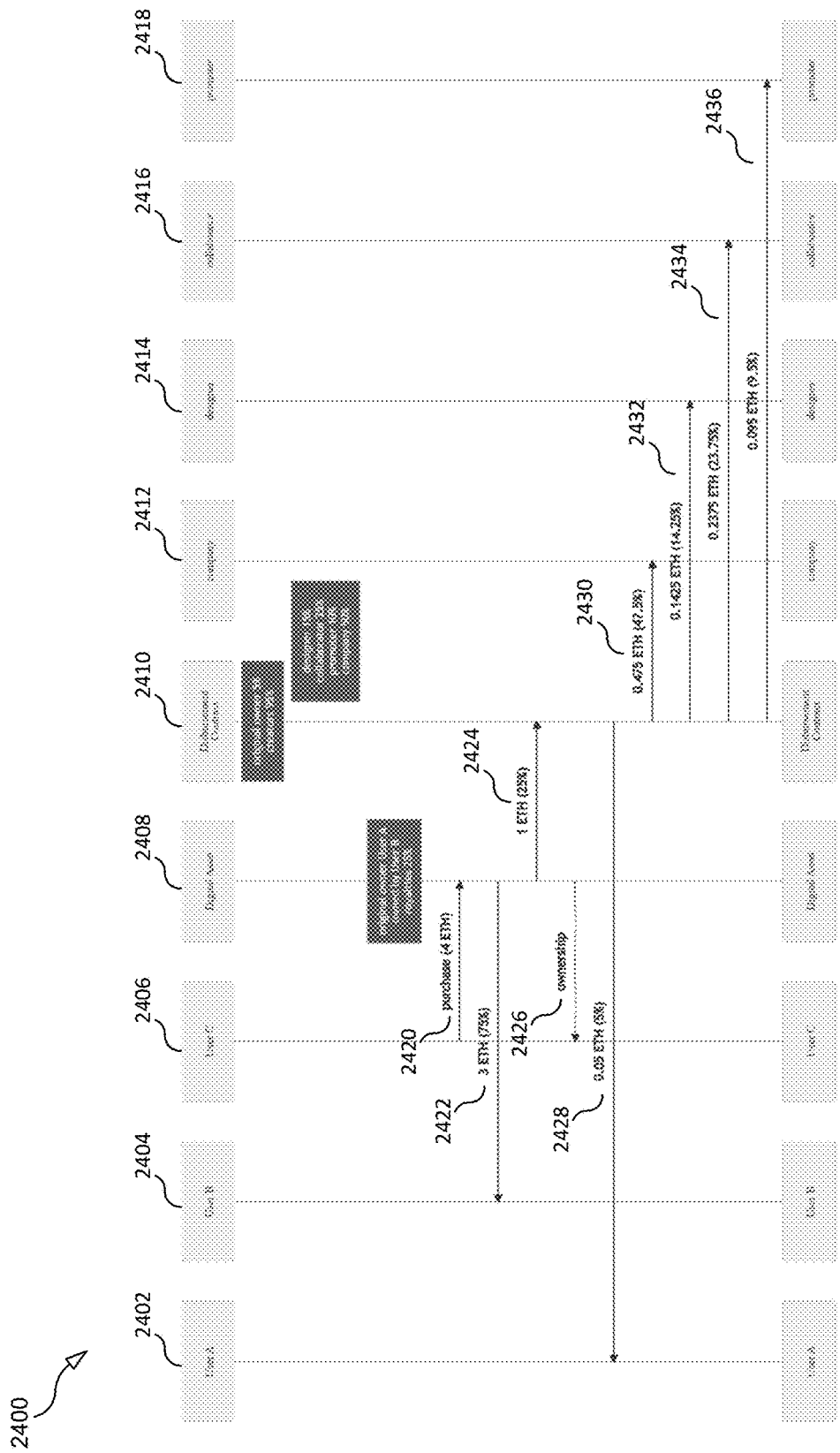
FIG. 24 is a sequence diagram illustrating a method for a subsequent sale of a digital asset according to some embodiments.

FIG. 24 is a sequence diagram illustrating a method for a subsequent sale of a digital asset according to some embodiments.

In some embodiments, each subsequent owner may be added to the list of beneficiaries recorded in the ledger (i.e. each prior owner in the asset's history benefits from each subsequent sale of the asset). In other embodiments, each new owner may replace the prior owner in retaining revenue rights for prior sales. (ex: if User C were to sell to a new user D, user B would replace User A in receiving a commission). In this way, users would be more willing to sell the asset since doing so wouldn't prevent them from participating in the upside of future sales.

In some embodiments, the first buyer of the asset ("User A" in the example above) would retain royalty rights in perpetuity. Subsequent users would only benefit from the direct sale to a new user (i.e. User B wouldn't receive royalties when User C sells to User D). In this way users are encouraged to be the first to own the asset, since this would allow them to passively profit from future sales of the asset.

In some embodiments, each collaboration with a collaborator (for example, an artist, designer, or athlete) could be structured under a new LLC, using the "series LLC" structure. In this embodiment, there would be a master LLC, with each new collaboration being a new LLC as a subset under the master LLC. This would allow all proceeds from sales and royalties to accrue to the same entity, and can be divided among the collaborator and the company (e.g., Endstate).

This structure would also allow for the collaborator to take a more active role in the direction of the art, design, and business functions associated with the assets created in collaboration with the company (e.g., Endstate).

In some embodiments, the company (e.g., Endstate) will collaborate with up-and-coming designers. Under this design fellowship program, partner designers will design sneakers or other digital and/or physical assets. Endstate's technology will turn each asset into a digital collectible. By virtue of being a NFT, each asset will be certified and authenticated using the blockchain architecture. Due to their authenticity and scarcity, these assets will accrue value as the artist's popularity increases. This will allow and encourage consumers to speculate on up-and-coming artists. The company (e.g., Endstate) will create a design fellowship program whereby it works with up-and-coming artists and designers to create their digital and physical assets. There are several benefits for designers: (i) get to collaborate with a sneaker/design company and promote their own work; (ii) get compensated for a portion of original sales; (iii) still get to participate in the upside of any potential future appreciate of their work; (iv) create more opportunities for up-and-coming artists to achieve career and commercial success; and/or (v) get to work with/be mentored by a famous/successful footwear designer.

In some embodiments, digital and/or physical assets are "aged" by being held for a certain period of time before being released. "Aged" assets/sneakers would be more valuable. For example, sneakers could be held in any of the following vintages: 1 year, 2 years, 3 years, 5 years, 10 years, 12 years, 14 year, 18 years, etc.

In some embodiments, the company may "purchase" its own unsold stock of a certain line/series of digital and/or physical asset, "age" them, and release different vintages over time.

In some embodiments, users may be rewarded for "aging" the sneakers by holding them for a certain period of time.

In order to allow users to speculate on the price of the assets without taking physical ownership of them, the company may hold the physical sneakers on behalf of the user. The user would receive the digital asset and be able to use it in whichever digital environments are applicable, while not worrying about damaging/losing the physical goods.

This would make trading/selling the digital asset/NFT much easier.

As shown in FIG. 24, User C 2406 purchases the digital asset from User B 2404 for 4 ETH. At 2422, 3 ETH (75%) goes to User B. At 2424, 1 ETH is distributed as follows: 47.5% or 0.475 ETH is sent to the company at 2430; at 2432 14.2% or 0.1425 ETH is sent to the designer; at 2434 23.75% or 0.2375 ETH is sent to a collaborator; and at 2436 9.5% or 0.095 ETH or sent to the promoter. At 2426, ownership of the digital asset is transferred to User C. At 2428, 5% or 0.05 ETH is transferred to User A.

The "unredeemed" physical sneaker may be represented by a corresponding ERC-20 or ERC-721 token. This token could be owned by the principal token NFT contract and redeemed (i.e. burned) to have the physical pair shipped to the user. In this way, there is no uncertainty as to whether or not the physical pair of sneakers has been redeemed by the original owner, or any subsequent owner of the asset.

In some embodiments, the NFT/digital sneaker gets separated ("severed") from the physical sneaker. For example, a user could retain token to own physical sneakers while selling the digital asset/NFT and/or a user could retain the digital asset/NFT while selling the physical good.

Figure 25:
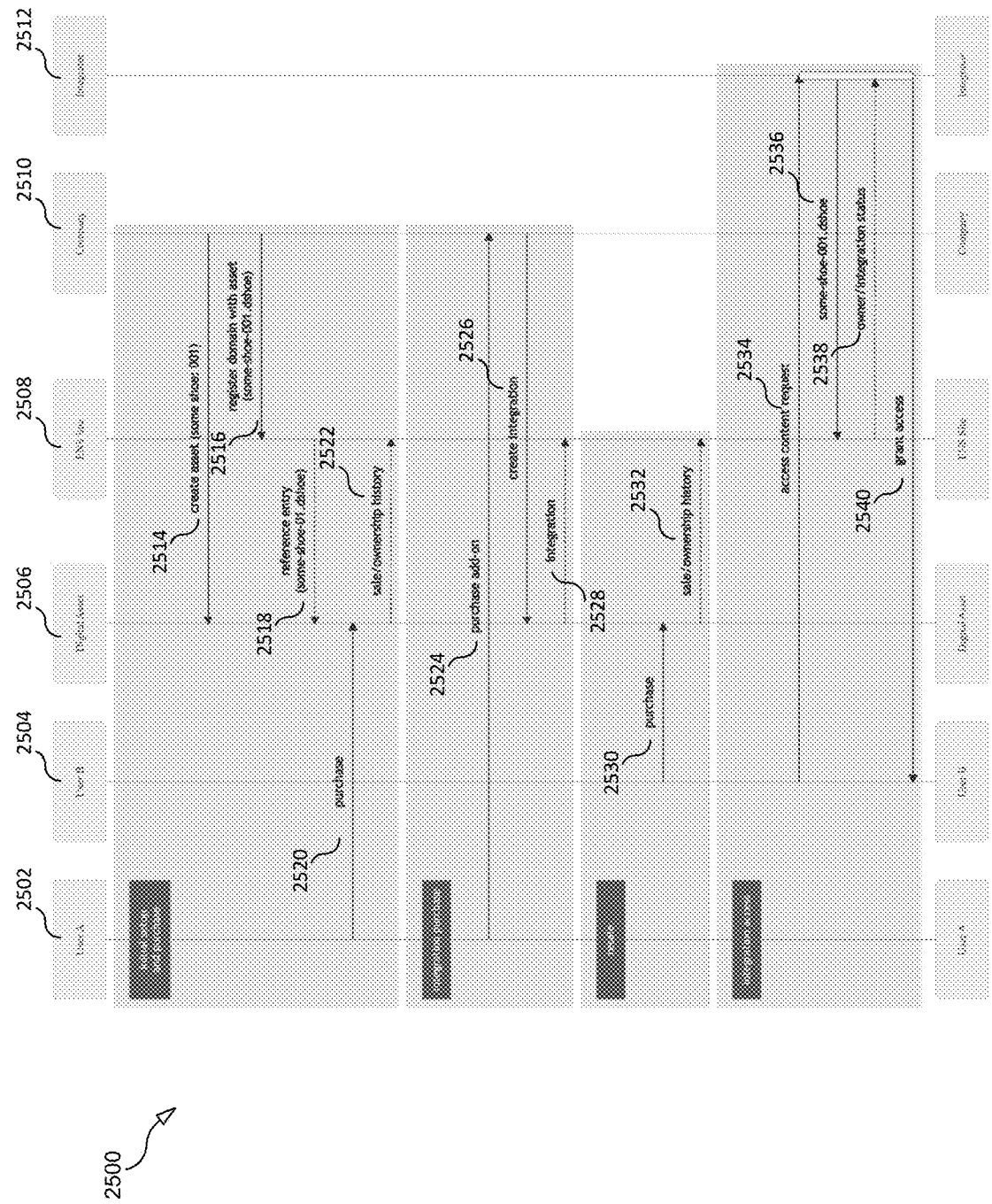
FIG. 25 is a sequence diagram illustrating a method for generating a digital asset for purchase and integration according to some embodiments.

FIG. 25 is a sequence diagram illustrating a method for generating a digital asset for purchase and integration according to some embodiments.

In some embodiments, owning a digital asset/NFT would entitle the user to experiences "In Real Life" (IRL). For example, owners of a particular NFT or series of NFT may receive concert tickets, or tickets to sporting event.

In some embodiments, a particular series of digital asset/NFT would entitle the user to unique experiences such as backstage passes for a concert or field passes for a sporting event.

In some embodiments, these experiences would be tied to the collaborator who designed, sponsored, or otherwise inspired the creation of the digital asset/NFT or physical asset.

In some embodiments, the digital assets/NFTs will be usable in digital environments such as video games, virtual worlds, online conferencing, virtual reality, and augmented reality.

In some embodiments, digital token/as set/NFT represents a digital design for a piece of apparel, equipment, or other functional asset. This digital design could be incorporated into existing digital/virtual environments. A user would "redeem" their NFT within the native environment of the virtual world/game. In some embodiments, the company would provide the user with a design file that would properly render in third party digital environments. Each digital environment integration would be represented in the digital token/asset. The NFT would contain a list of integrations for that design file, and each listed integration would mean the user can use/redeem their digital asset within that environment.

For example: a user purchases a digital sneaker, the digital sneaker is represented by a non-fungible blockchain token, and this token contains a list of available integrations for the digital asset. In this example, the user is able to use the asset in Fortnite, The Sims, Decentraland, and Roblox, etc. Because of the particularities of each digital environment, each digital design file would have to be unique for each integration. Some digital environments may share a common graphical rendering protocol (such as Unity or Unreal Engine). Using known and common file formats for various environments will allow the digital asset (sneaker, in this example) to be used in any environment where said file type is supported.

For example, a file in .FBX format may be used in any digital environment where .FBX files are supported to be rendered.

Such files may include metadata about where and how the file should be "rigged" or used (i.e. a sneaker is affixed to an avatar's foot).

Digital design files would be stored in a decentralized file storage network such as Arweave. The digital environment would query the metadata of the NFT to locate the file in the correct format for rendering.

In some embodiments, this file format would be tagged for easy identification by the digital environment.

In other embodiments, files would be stored on a traditional cloud-based server. The digital environment would then call an API to locate the file in the correct format to be rendered in that environment. In some embodiments, each digital design file would be a "sub asset" of the principal NFT/blockchain based asset.

Building on the example above, there would be a sub asset/token for Fortnite, The Sims, Decentraland, and Roblox. Each sub asset would contain its own digital design file, designed in such a way that the respective environments would recognize the asset and be able to render the asset in said environment.

In some embodiments the main NFT would also "own" a physical sneaker.

In some embodiments the sub assets would not be transferrable separately from the main NFT.

In other embodiments, each sub asset would be transferrable separate from the main NFT.

In some embodiments, the digital assets may be combined with augmented reality applications so that the digital assets may be "worn" by the user when looking through the lens of a digital device capable of augmented reality (such as a smartphone combined with a software application). The digital asset would appear to be being worn by the user. For example, a digital sneaker would appear to be on the user's foot.

In some embodiments the user may use augmented reality to "search" for digital assets/sneakers in certain physical locations.

Users may be rewarded in tokens and/or physical assets for visiting certain physical locations (such as a store) and/or completing tasks such as a scavenger hunt.

In some embodiments the user may be able to redeem the tokens/and or digital assets found or earned using augmented reality for physical sneakers.

At 2514, the company 2510 creates a digital asset 2506, such as a shoe. At 2516, the Company registers a domain with the asset at an ENS site 2508. At 2518, the ENS site references an entry corresponding to the digital asset. At 2520, User A purchases the digital asset. At 2522, sale and ownership history is sent to the ENS site 2508.

At 2524, User A may include a purchase add on. At 2526, the Company 2510 creates an integration with the Digital Asset 2506. At 2528, the Digital Asset 2506 is integrated with the ENS site 2508.

At 2530, User B 2504 purchases the Digital asset 2506. At 2532, sale/ownership history is sent to the ENS site 2508.

At 2534, User B submits an access content request to the integrator 2512. At 2536, the Integrator references the asset entry on the ENS site. At 2538, owner/integration status is sent to the Integrator. At 2540, the integrator grants User B access.

Figure 26:
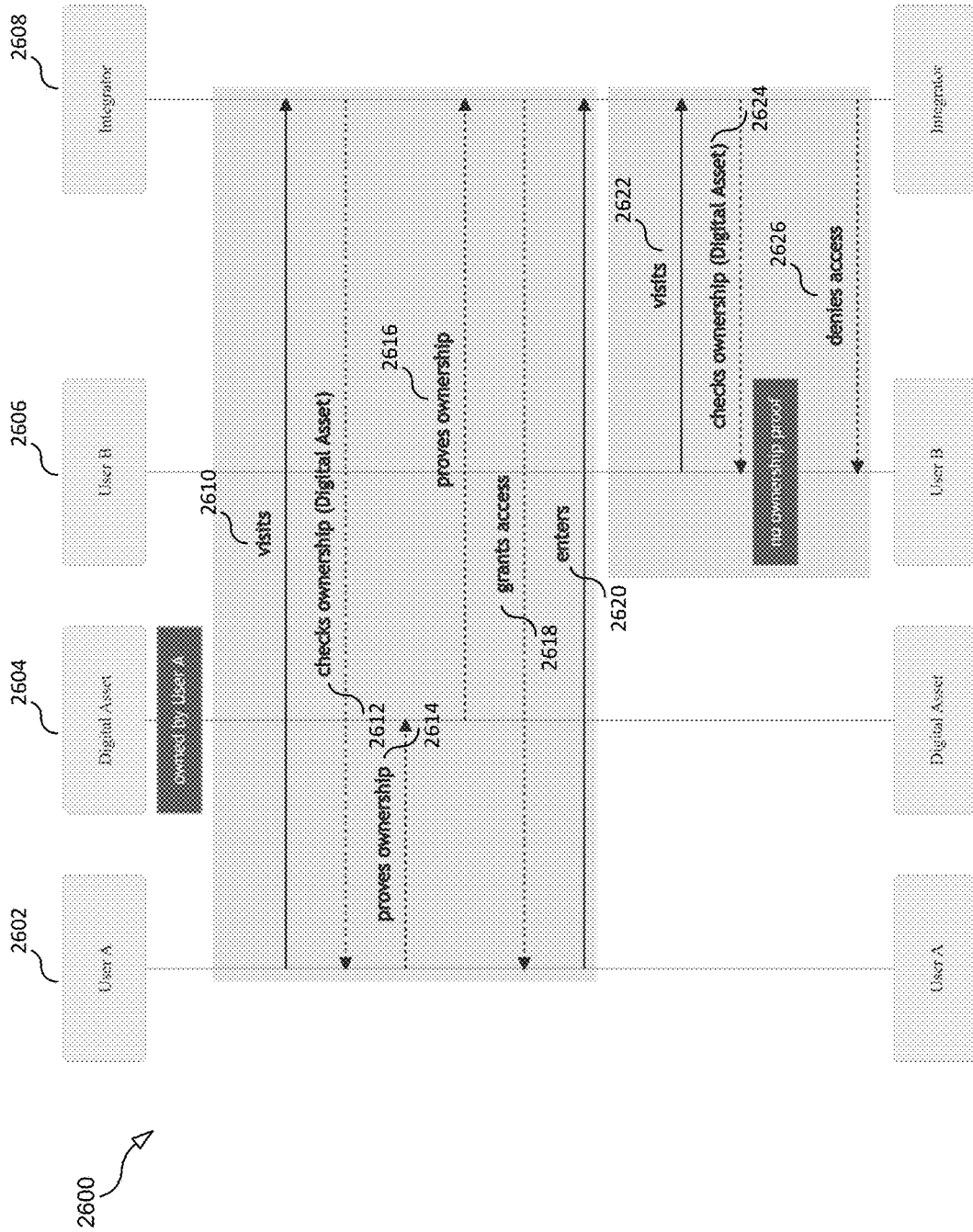
FIG. 26 is a sequence diagram illustrating a method for generating a digital asset for purchase and integration according to some embodiments.

FIG. 26 is a sequence diagram illustrating a method for generating a digital asset for purchase and integration according to some embodiments.

In some embodiments, the state of the digital assets or their attributes would change based on certain actions taken by the user. The user would be able to "unlock" certain experiences or characteristics of the digital asset based on any of the following examples:

(i) utilizing the digital asset in a video game or other virtual environment;

(ii) taking certain actions within the video game, or reaching milestones for length of time played or achievements within the virtual environment;

(iii) referring other users to purchase a digital and/or physical asset;

(iv) owning a certain number of digital/physical assets created by the company; and/or (v) participating in a scavenger hunt.

In some embodiments, users may accrue rewards points in the form of an ERC-20 (fungible) token. In other embodiments users may accrue rewards points in the form of a non-fungible token or a digital token not associated with a blockchain. Reward points may be earned for taking certain actions on the platform; bought, sold, or traded; used to get preference ("cut the line") in purchasing new assets/NFTs and/or sneakers; and/or used towards purchase price for new assets/NFTs and/or sneakers.

In some embodiments, there may be a limited quantity of digital assets/NFTs and/or physical sneakers available in a certain series. Not all users who wish to purchase the asset will be able to do so. In these instances, users may accrue points/tokens as a consolation for not being selected to purchase one of the limited edition assets. These tokens may then be used to give the user a better chance to purchase a future limited edition release (akin to getting another entry in a random lottery). In some instances if the user accrues enough of these consolation tokens, they could redeem them to be guaranteed the right to purchase a future asset.

In some embodiments, a digital token (ERC-20 or ERC-721) may be utilized as a "governance token". In this embodiment ownership of the governance token would give the user the ability to vote on and/or participate in certain actions that take place within the company (e.g., Endstate) ecosystem. The governance token may be used to vote on which artists/designers/athletes to collaborate with; earn rewards and/or dividends for sales of certain goods within the ecosystem; vote on the nature of rewards/dividends given to holders of the governance token; and/or receive guaranteed rights to purchase a particular asset.

At 2610, User A 2602 visits Integrator 2608. At 2612, ownership of the digital asset is checked. At 2614 and 2616, User A proves ownership of digital asset 2604. At 2618, the integrator grants User A access. At 2620, User A enters the integrator.

At 2622, User B 2606 visits the Integrator 2608. At 2624, the Integrator checks ownership of the digital asset. If the User B cannot show ownership proof, at 2626 the Integrator denies user B access.

Figure 27:
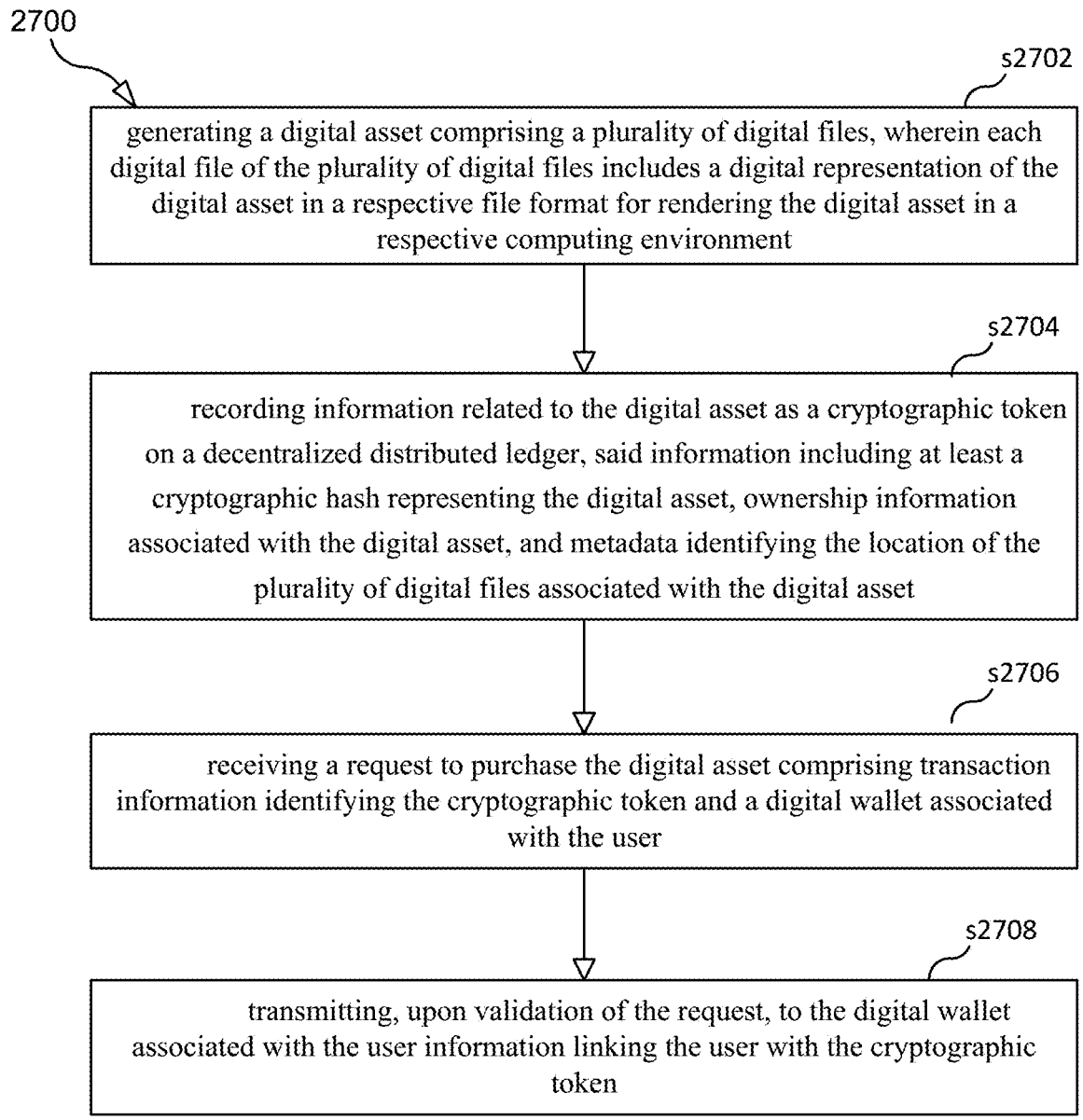
FIG. 27 is a block diagram illustrating a method for generating a digital asset for purchase by a user according to some embodiments.

FIG. 27 is a block diagram illustrating a method 2700 for generating a digital asset for purchase by a user according to some embodiments. Method 2700 may begin with step s2702.

Step s2702 comprises generating a digital asset comprising a plurality of digital files, wherein each digital file of the plurality of digital files includes a digital representation of the digital asset in a respective file format for rendering the digital asset in a respective computing environment.

Step s2704 comprises recording information related to the digital asset as a cryptographic token on a decentralized distributed ledger, said information including at least a cryptographic hash representing the digital asset, ownership information associated with the digital asset, and metadata identifying the location of the plurality of digital files associated with the digital asset.

Step s2706 comprises receiving a request to purchase the digital asset comprising transaction information identifying the cryptographic token and a digital wallet associated with the user. Step s2708 comprises transmitting, upon validation of the request, to the digital wallet associated with the user information linking the user with the cryptographic token.

In some embodiments, the method includes storing one or more of the plurality of digital files on a decentralized file storage system, and obtaining, for each of the stored one or more digital files, a unique cryptographic hash. In some embodiments, the cryptographic token further includes information referencing the unique cryptographic hash obtained. In some embodiments, the method further includes storing one or more of the plurality of digital files to a remote server.

In some embodiments, at least one of the plurality of digital files includes information relating to at least one of compatibility or use of the at least one digital file in the respective computing environment. In some embodiments, the respective computing environment is an extended reality (XR) environment including one or more of virtual reality (VR), augmented reality (AR), or mixed reality (MR) applications. In some embodiments, the respective computing environment is an augmented reality (AR) overlay over a physical environment.

In some embodiments, the distributed ledger is a blockchain ledger. In some embodiments, the digital wallet is a blockchain-based wallet. In some embodiments, the cryptographic token is a non-fungible token (NFT).

Figure 28:
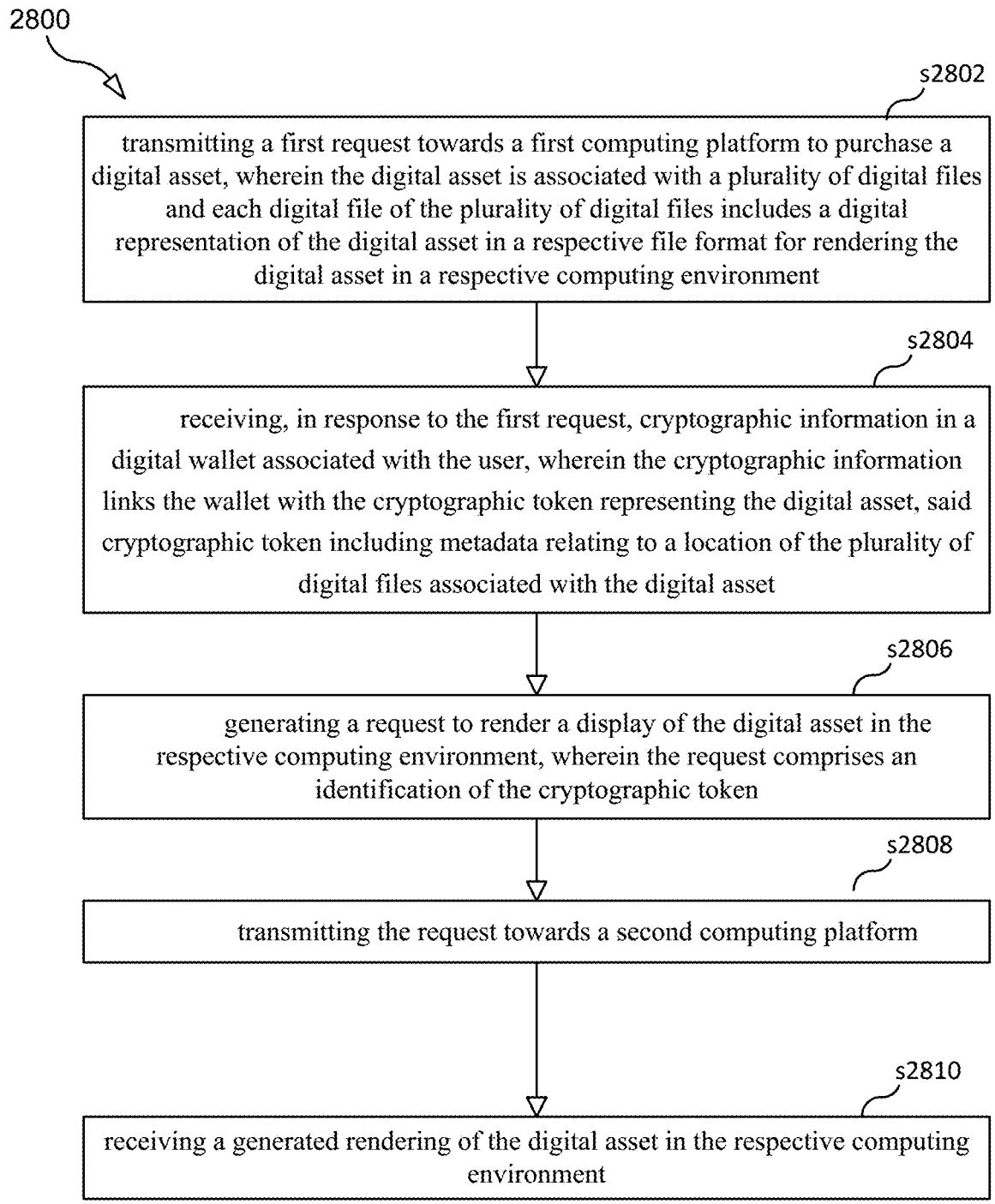
FIG. 28 is a block diagram illustrating a method for purchasing a digital asset in a digital environment by a user according to some embodiments.

FIG. 28 is a block diagram illustrating a method 2800 for purchasing a digital asset in a digital environment by a user according to some embodiments. Method 2800 may begin with step s2802.

Step s2802 comprises transmitting a first request towards a first computing platform to purchase a digital asset, wherein the digital asset is associated with a plurality of digital files and each digital file of the plurality of digital files includes a digital representation of the digital asset in a respective file format for rendering the digital asset in a respective computing environment.

Step s2804 comprises receiving, in response to the first request, cryptographic information in a digital wallet associated with the user, wherein the cryptographic information links the wallet with the cryptographic token representing the digital asset, said cryptographic token including metadata relating to a location of the plurality of digital files associated with the digital asset.

Step s2806 comprises generating a request to render a display of the digital asset in the respective computing environment, wherein the request comprises an identification of the cryptographic token. Step s2808 comprises transmitting the request towards a second computing platform, and step s2810 comprises receiving a generated rendering of the digital asset in the respective computing environment.

In some embodiments, the respective computing environment is an extended reality (XR) environment including one or more of virtual reality (VR), augmented reality (AR), or mixed reality (MR) applications. In some embodiments, the respective computing environment is an augmented reality (AR) overlay over a physical environment. In some embodiments, at least one of the plurality of digital files includes information relating to at least one of compatibility or use of the digital file in the respective computing environment.

In some embodiments, the first request is generated in response to the achievement of a gameplay milestone. In some embodiments, the digital wallet is a blockchain-based wallet. In some embodiments, the cryptographic token is a non-fungible token (NFT).

Figure 29:
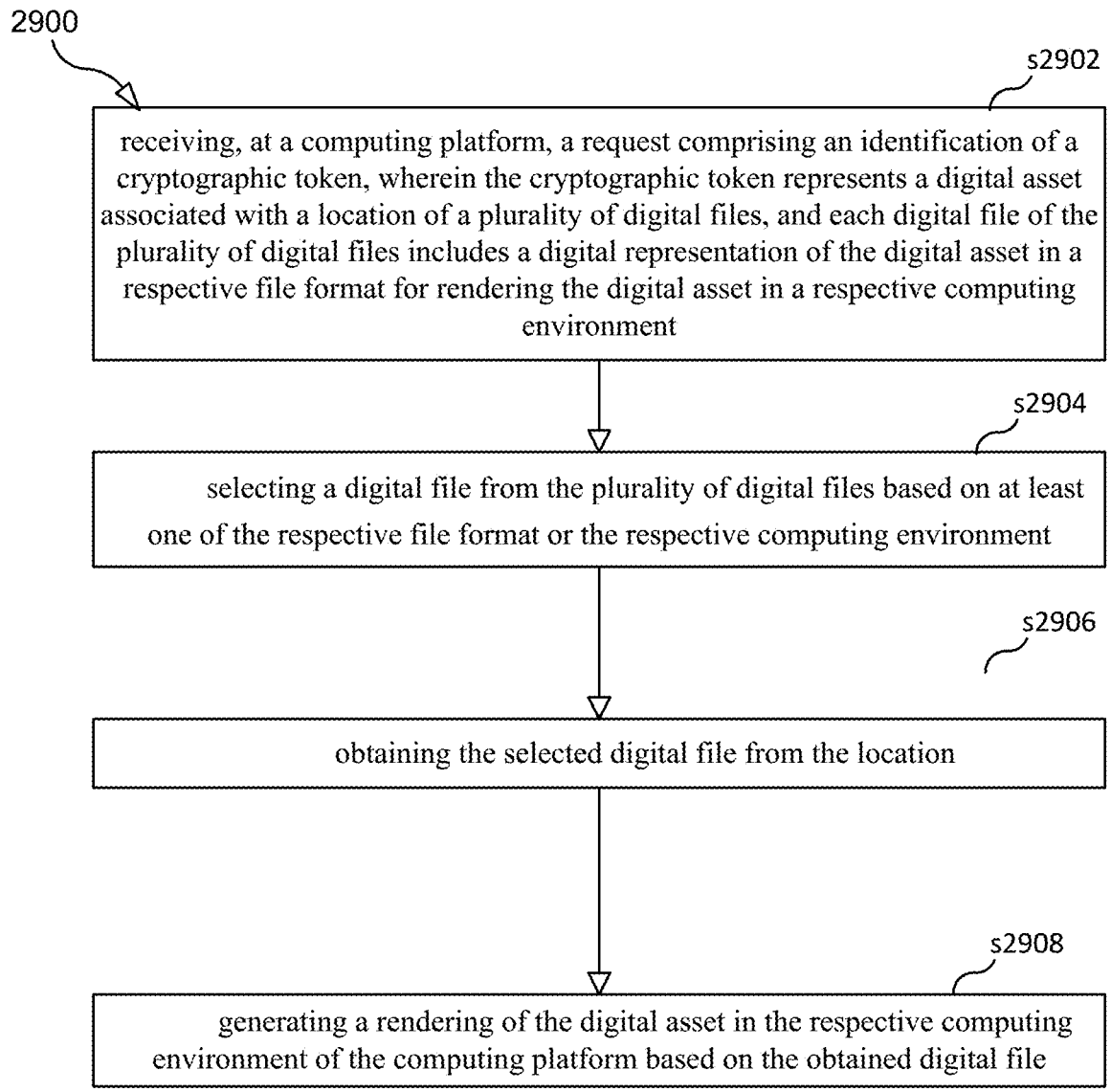
FIG. 29 is a block diagram illustrating a method for rendering a digital asset according to some embodiments.

FIG. 29 is a block diagram illustrating a method 2900 for rendering a digital asset according to some embodiments. Method 2900 may begin with step s2902.

Step s2902 comprises receiving, at a computing platform, a request comprising an identification of a cryptographic token, wherein the cryptographic token represents a digital asset associated with a location of a plurality of digital files, and each digital file of the plurality of digital files includes a digital representation of the digital asset in a respective file format for rendering the digital asset in a respective computing environment.

Step s2904 comprises selecting a digital file from the plurality of digital files based on at least one of the respective file format or the respective computing environment. Step s2906 comprises obtaining the selected digital file from the location. Step s2908 comprises generating a rendering of the digital asset in the respective computing environment of the computing platform based on the obtained digital file.

In some embodiments, the plurality of digital files is stored on a decentralized file system. In some embodiments, the plurality of digital files is stored on a remote server. In some embodiments, the respective computing environment is an extended reality (XR) environment including one or more of virtual reality (VR), augmented reality (AR), or mixed reality (MR) applications. In some embodiments, the respective computing environment is an augmented reality (AR) overlay over a physical environment. In some embodiments, at least one of the plurality of digital files includes information relating to use of the digital asset in the respective computing environment. In some embodiments, the cryptographic token is a non-fungible token (NFT).

Figure 30:
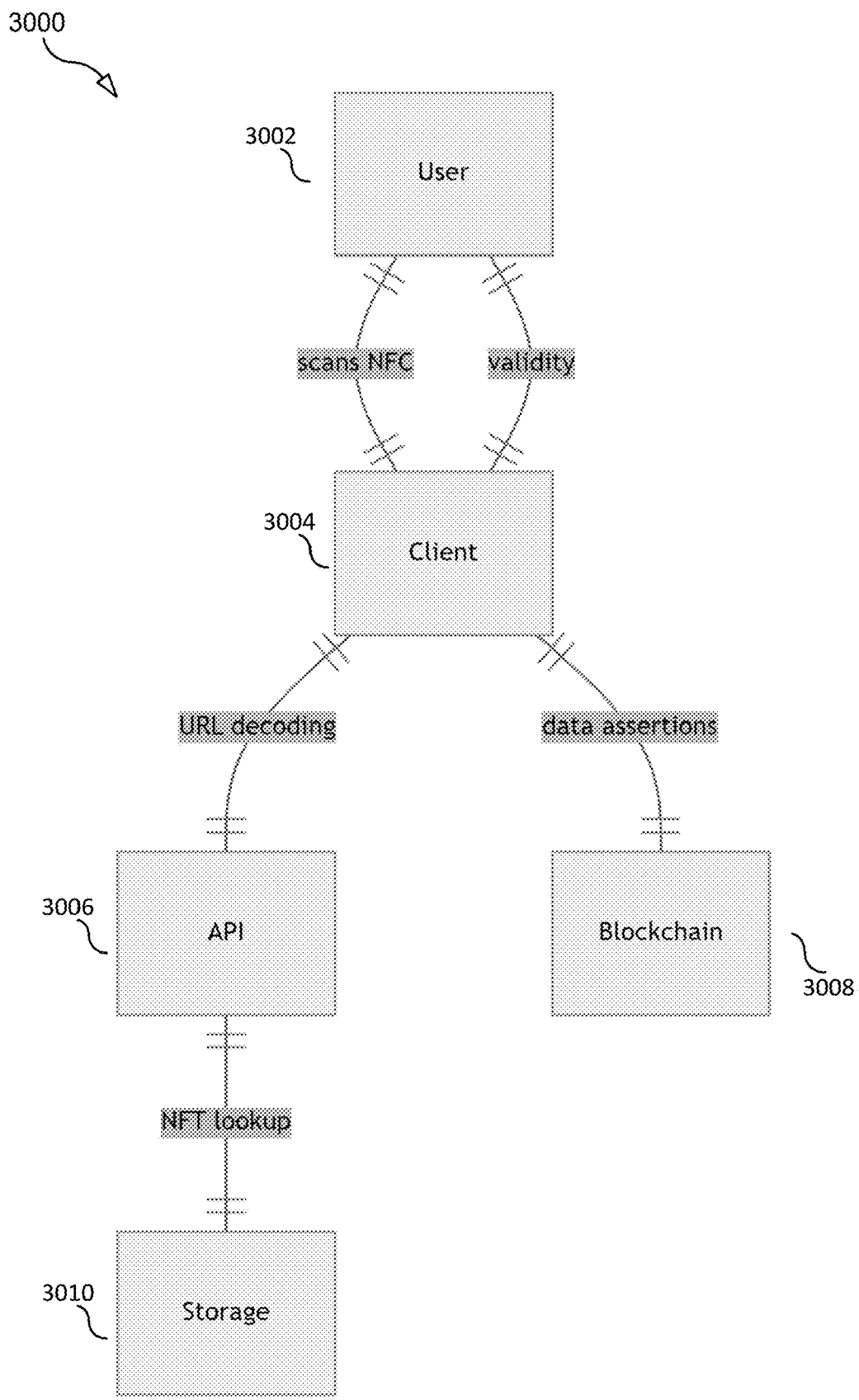
FIG. 30 is a block diagram illustrating a method for authenticating a physical asset according to some embodiments.

FIG. 30 is a block diagram illustrating a method for authenticating a physical asset according to some embodiments.

A user would be able to scan the NFC chip embedded within their physical product. This would pull up the programmed URL. Visiting the site would allow the system to decode the content within. This would be done through an API for security reasons. The API would be able to return the encrypted information (e.g. NFT and shoe size). The site would then be able to use that information to assert the authenticity of the sneaker. It would be able to assert the owner as well as compare metadata on the NFT (shoe size) with that from the encoded payload.

As shown in FIG. 30, a user 3002 may use a client 3004 to scan a NFC chip. The client sends a request to an API 3006 to decode the contents of the URL. The API 3006 looks up the NFT in a storage system 3010 based on the contents. The client 3004 also may send one or more data assertions to look up information on a blockchain 3008 in order to authenticate the physical product containing the NFC.

Figure 31:
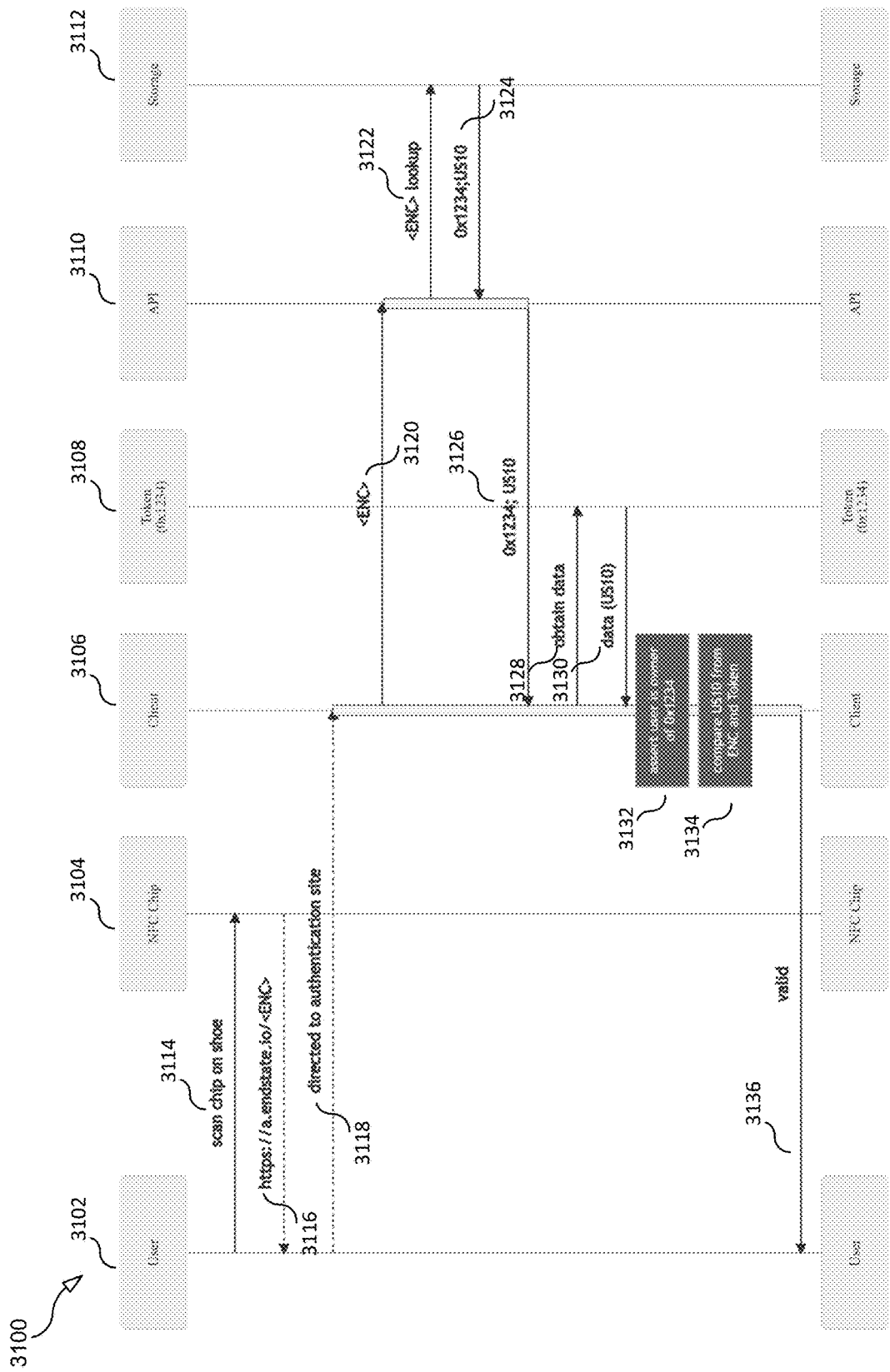
FIG. 31 is a sequence diagram illustrating a method for authenticating a physical asset according to some embodiments.

FIG. 31 is a sequence diagram illustrating a method for authenticating a physical asset according to some embodiments.

In some embodiments, users are able to authenticate the validity of their physical goods by using NFC chips to scan their goods.

In some embodiments, users are able to authenticate the validity of their physical goods by using QR codes to scan their goods.

In both cases, the resulting scan would authenticate the physical goods by referencing the corresponding digital asset in the blockchain.

In some embodiments, scanning the physical good (by NFC, QR, or any other technology) would "tether" the physical asset to the user's digital asset In some embodiments, scanning the physical good would give the user ownership of the asset in their wallet.

In some embodiments, once the user has scanned the goods and taken ownership, they may "lock" the digital scan and/or ownership of the wallet so that the NFC/QR cannot be scanned by a random passerby on the street, or if the shoes are left in a gym locker, etc.

In some embodiments, scanning the NFC/QR would query the blockchain record for that particular physical good, and authenticate that they had received the correct physical goods. The user would be authenticated using their public and/or private key. The digital asset that the user had purchased would already be populated in the user's digital wallet, and querying the blockchain would ensure that the physical pair received was the twin of the digital pair already owned.

In some embodiments, the company may "prime" the NFC/QR and/or the NFT to be ready to pair once it is scanned.

A user would be able to scan the NFC chip embedded within their physical product. This would pull up the programmed URL. Visiting the site would allow the system to decode the content with. This would be done through an API for security reasons. The API would be able to return the encrypted information (e.g. NFT and shoe size). The site would then be able to use that information to assert the authenticity of the sneaker. IT would be able to assert the owner as well compare metadata on the NFT (shoe size) with that from the encoded payload.

FIG. 31 illustrates a method 3100. At 3114, a user 3102 scans a NFC chip 3104 on a physical product, such as a shoe. At 3116 the user obtains a URL with encoded information scanned from the NFC chip. At 3118, the user is directed to an authentication site hosted by client 3106. At 3120, the client sends the encoded information to an API 3110. At 3122, the API looks up the encoded information in a storage system 3112. At 3124, the storage system returns a NFT token address and some information about the physical product, such as a shoe size. At 3126, the API sends the NFT token address and the information about the physical product to the Client. At 3128, the Client obtains data about the NFT token 3108 using the NFT token address. At 3130, information about the physical product is retrieved from the token, such as a shoe size. At 3132 the Client asserts that the user is the owner of the NFT token. At 3134, the Client compares the information about the product retrieved from the NFT and from the storage unit. At 3136, the Client indicates that the product is authentic based on the ownership information and/or the comparison.

Figure 32:
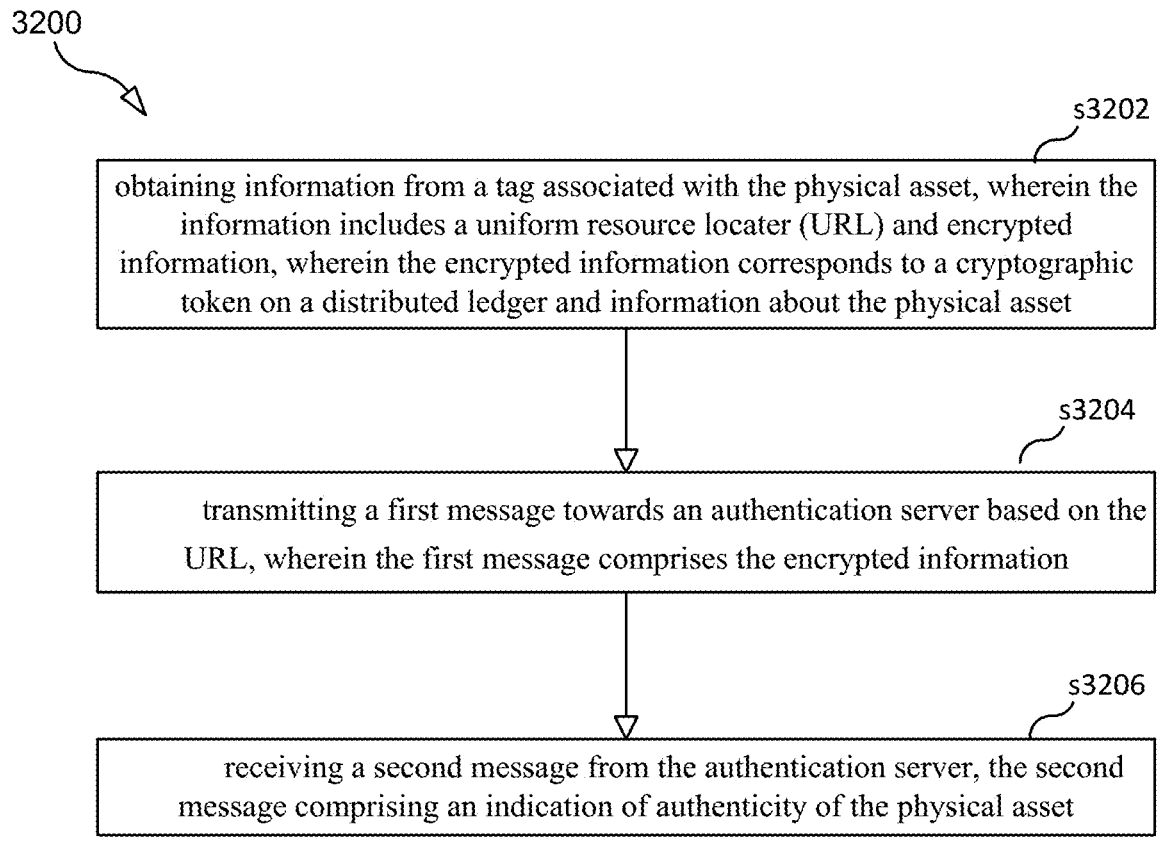
FIG. 32 is a block diagram illustrating a method for authenticating a physical asset according to some embodiments.

FIG. 32 is a block diagram illustrating a method 3200 for authenticating a physical asset according to some embodiments. Method 3200 may begin with step s3202.

Step s3202 comprises obtaining information from a tag associated with the physical asset, wherein the information includes a uniform resource locater (URL) and encrypted information, wherein the encrypted information corresponds to a cryptographic token on a distributed ledger and information about the physical asset.

Step s3204 comprises transmitting a first message towards an authentication server based on the URL, wherein the first message comprises the encrypted information. Step s3206 comprises receiving a second message from the authentication server, the second message comprising an indication of authenticity of the physical asset.

In some embodiments, the tag associated with the physical asset is at least one of:
(i) a near-field communication (NFC) chip;
(ii) a quick response (QR) code;
(iii) a serial number;
(iv) a blockchain address; or
(v) a non-fungible token (NFT) public key.

In some embodiments, the physical asset is footwear including a sole and an upper, and wherein the tag associated with the physical asset is physically linked with the physical asset by at least one of:
(i) embedding the tag in the sole;
(ii) embedding the tag in the upper;
(iii) adhering the tag on to the sole;
(iv) adhering the tag on to the upper; or
(v) adhering the tag on packaging for the footwear.

In some embodiments, the distributed ledger is a blockchain ledger. In some embodiments, the cryptographic token is a non-fungible token (NFT).

Figure 33:
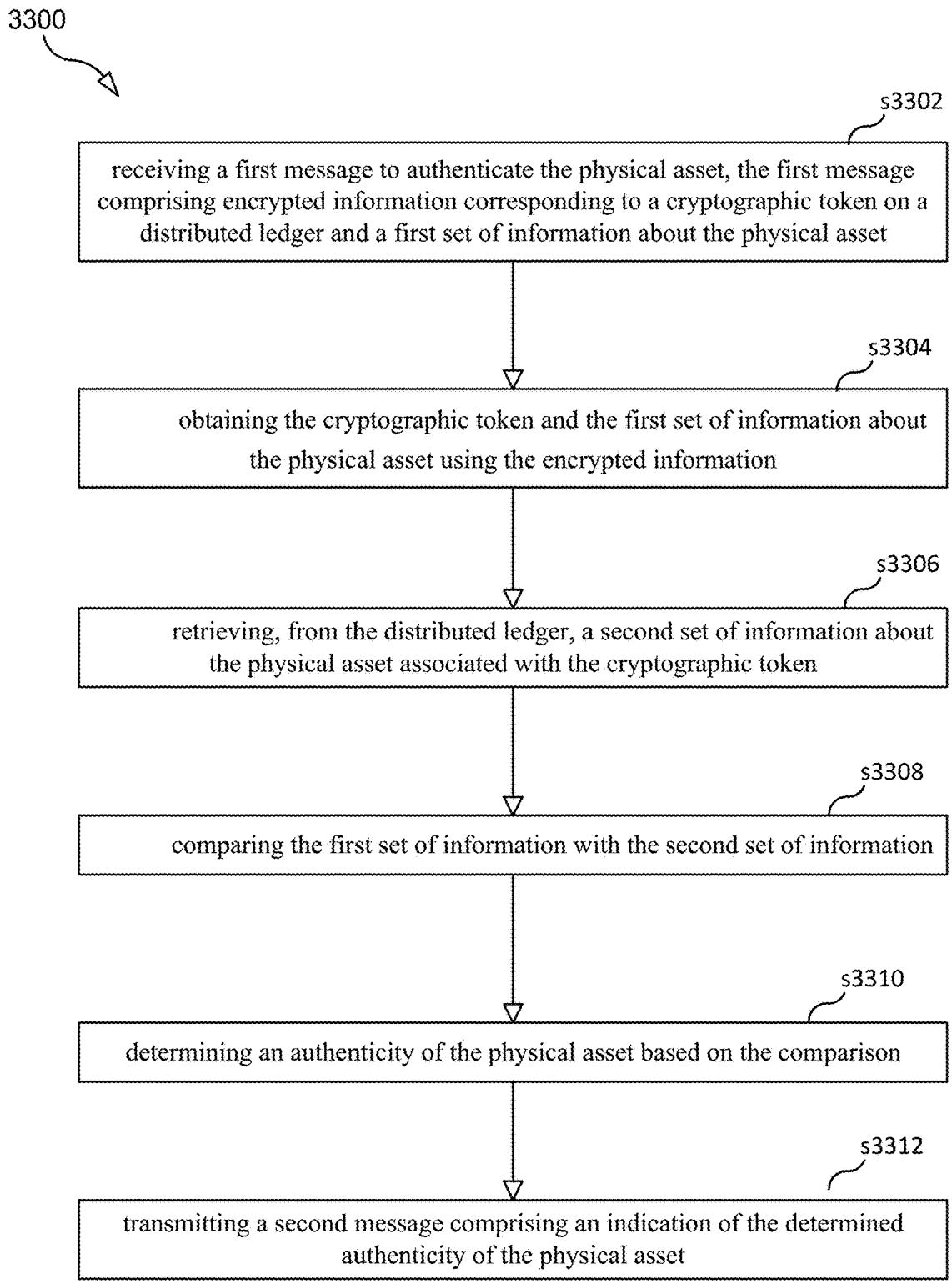
FIG. 33 is a block diagram illustrating a method for authenticating a physical asset according to some embodiments.

FIG. 33 is a block diagram illustrating a method 3300 for authenticating a physical asset according to some embodiments. Method 3300 may begin with step s3302.

Step s3302 comprises receiving a first message to authenticate the physical asset, the first message comprising encrypted information corresponding to a cryptographic token on a distributed ledger and a first set of information about the physical asset.

Step s3304 comprises obtaining the cryptographic token and the first set of information about the physical asset using the encrypted information, and step s3306 comprises retrieving, from the distributed ledger, a second set of information about the physical asset associated with the cryptographic token.

Step s3308 comprises comparing the first set of information with the second set of information, and step s3310 comprises determining an authenticity of the physical asset based on the comparison. Step s3312 comprises transmitting a message comprising an indication of the determined authenticity of the physical asset.

In some embodiments, the method further includes determining that a user is an owner of the cryptographic token. In some embodiments, the distributed ledger is a blockchain ledger. In some embodiments, the cryptographic token is a non-fungible token (NFT).

Figure 34:
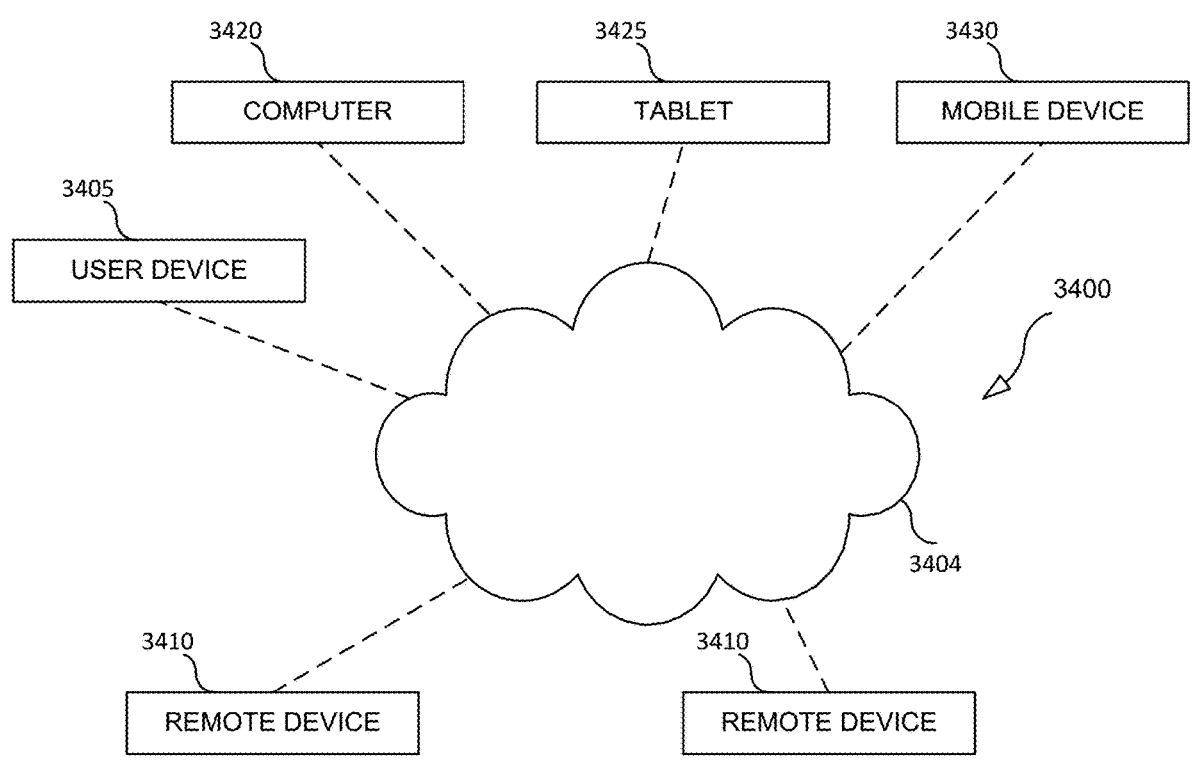
FIG. 34 is a block diagram illustrating an architecture of a communications system according to some embodiments.

Referring now to FIG. 34, an exemplary architecture of a communication system in accordance with some embodiments is illustrated. System 3400 includes at least one remote device 3410 that is configured to communicate with one or more user devices 3405 through a communications network 3404 (e.g., the internet). Examples of user devices include a computer 3420 (e.g., laptop or desktop), a tablet 3425 (e.g., an iPad), and a mobile device 3430 (e.g., a smartphone, such as, for an example, an iPhone). An example of a remote device 3410 includes a server. The methods and apparatus disclosed herein can, for example, be deployed as a user/client-server implementation, as a peer-to-peer implementation, as a decentralized application implementation, as a standalone application running on a user device 3405, etc.

The user device 3405 can be configured to communicate with one or more remote devices 3410 via the network 3404. Remote devices 3410 are configured to generate, maintain, and host computer programs that perform the methods disclosed herein . The remote devices 3410 may, for example, generate, maintain and host web pages (e.g., HTML documents) and other applications that embody and/or implement the methods disclosed herein. The remote devices 3410 include services associated with rendering dynamic web pages, such as data storage services, security services, etc. Accordingly, remote devices 3410 can include a conventional hardware arrangement and can be outfitted with software and/or firmware for performing web server functions for performing the methods disclosed herein, such as, for example, javascript/jquery, HTML5, CSS2/3, and facilities for SSL, MySQL, PHP, SOAP, etc.

Remote devices 3410 may be coupled with a data storage facility, which may include one or more local or remote memory systems or units, and can include one or more databases and/or file systems for storing data, media, graphics, HTML documents, XML documents, etc.

Figure 35:
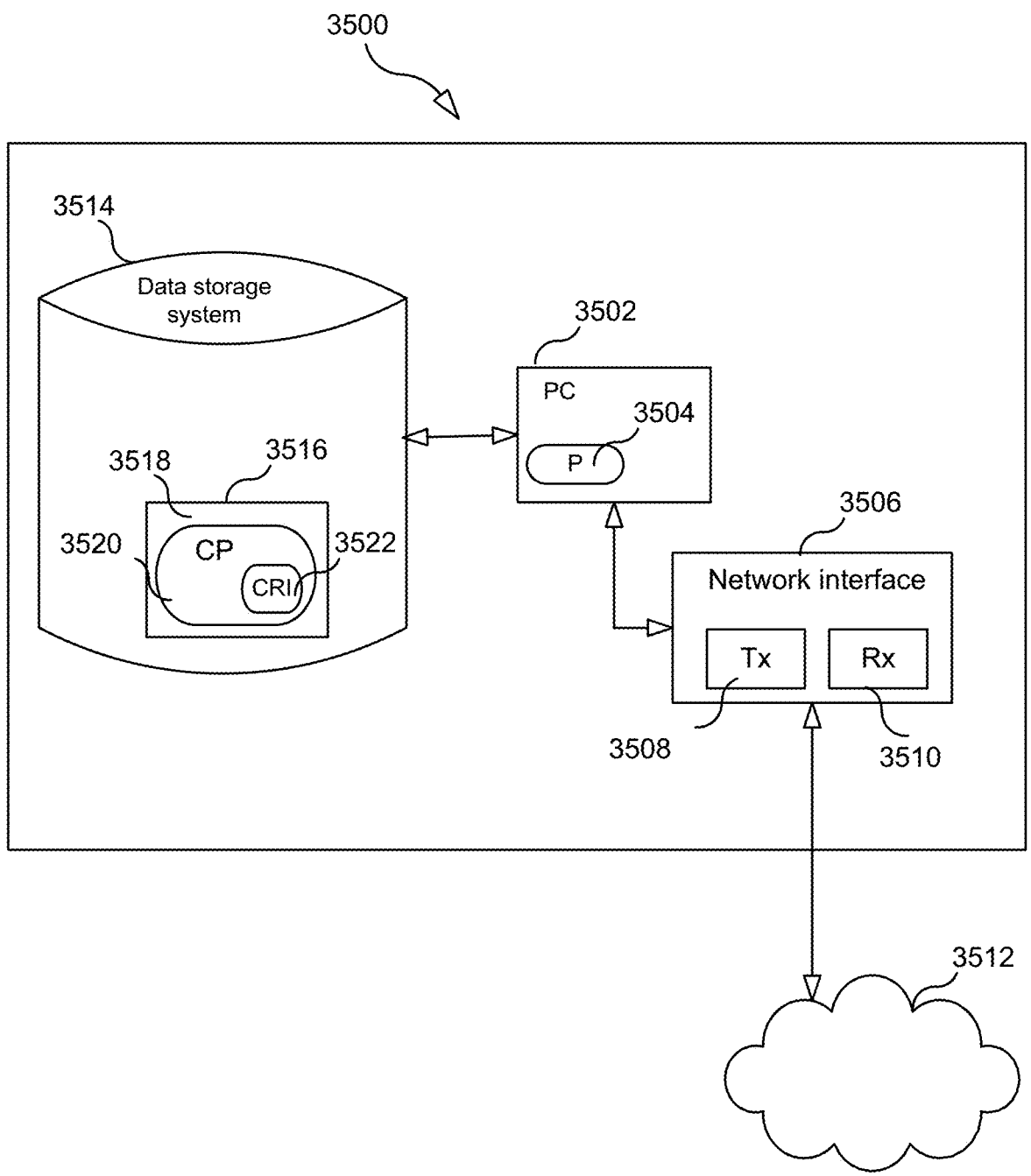
FIG. 35 is a block diagram illustrating an apparatus according to some embodiments.

FIG. 35 is a block diagram of an apparatus 3500 (e.g., a network node, connected device, and the like), according to some embodiments. As shown in FIG. 35, the apparatus may comprise: processing circuitry (PC) 3502, which may include one or more processors (P) 3504 (e.g., a general purpose microprocessor and/or one or more other processors, such as an application specific integrated circuit (ASIC), field-programmable gate arrays (FPGAs), and the like); a network interface 3506 comprising a transmitter (Tx) 3508 and a receiver (Rx) 3510 for enabling the apparatus to transmit data to and receive data from other computing devices connected to a network 3512 (e.g., an Internet Protocol (IP) network) to which network interface 3506 is connected; and a local storage unit (a.k.a., "data storage system") 3514, which may include one or more non-volatile storage devices and/or one or more volatile storage devices. In embodiments where PC 3502 includes a programmable processor, a computer program product (CPP) 3516 may be provided. CPP 3516 includes a computer readable medium (CRM) 3518 storing a computer program (CP) 3520 comprising computer readable instructions (CRI) 3522. CRM 3518 may be a non-transitory computer readable medium, such as, magnetic media (e.g., a hard disk), optical media, memory devices (e.g., random access memory, flash memory), and the like. In some embodiments, the CRI 3522 of CP 3520 is configured such that when executed by PC 3502, the CRI 3522 causes the apparatus 3500 to perform steps described herein (e.g., steps described herein with reference to the block diagrams). In other embodiments, the apparatus may be configured to perform steps described herein without the need for code. That is, for example, PC 3502 may consist merely of one or more ASICs. Hence, the features of the embodiments described herein may be implemented in hardware and/or software.

Figure 36:
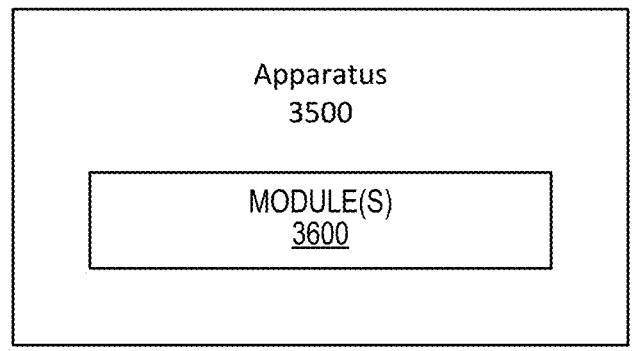
FIG. 36 is a block diagram illustrating an apparatus according to some embodiments.

FIG. 36. is a schematic block diagram of the apparatus 3500 according to some other embodiments. The apparatus 3500 includes one or more modules 3600, each of which is implemented in software. The module(s) 3600 provide the functionality of apparatus 3500 described herein (e.g., steps described herein).

Figure 37:
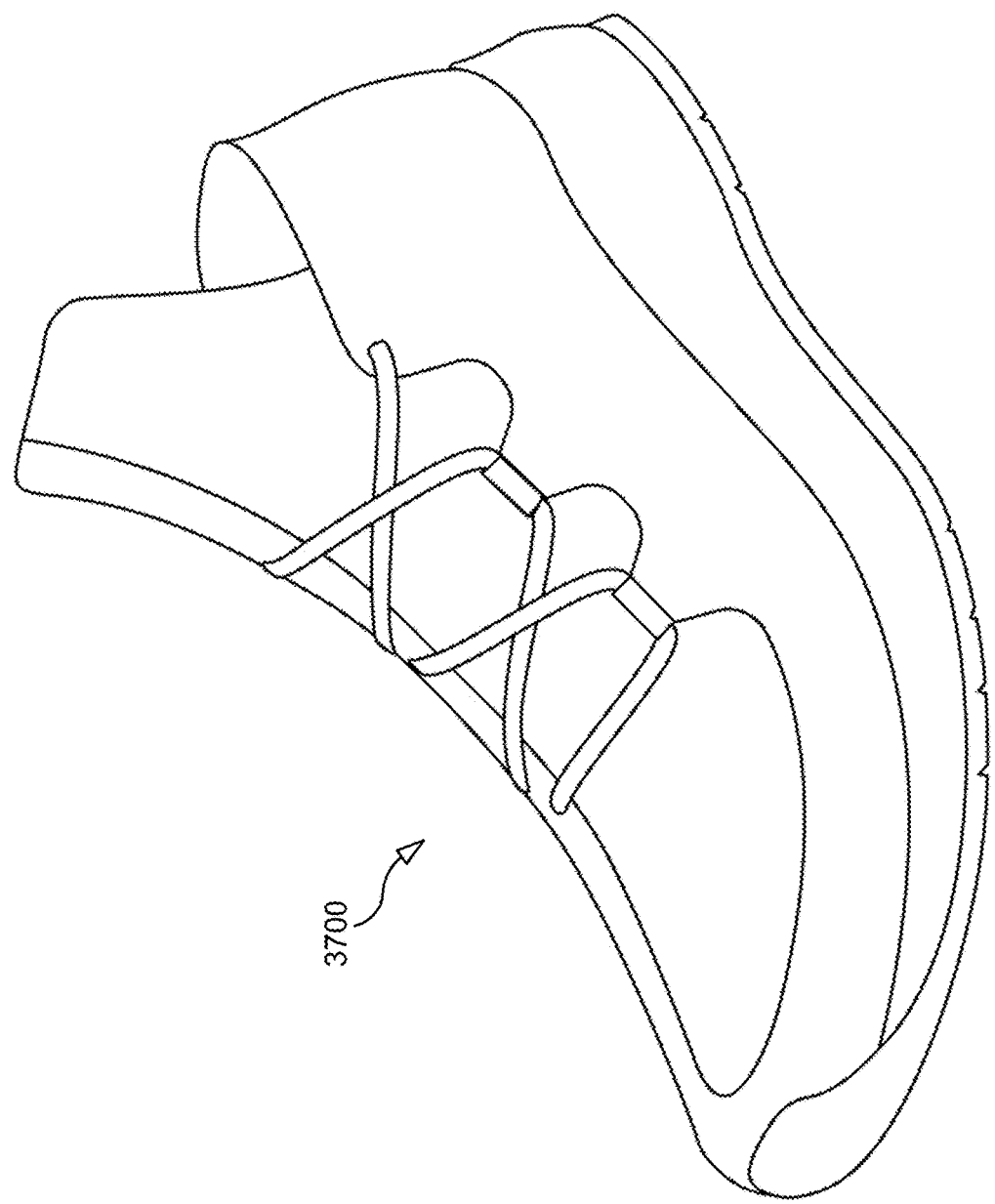
FIG. 37 illustrates a physical asset according to some embodiments.

FIG. 37 illustrates a physical asset 3700 according to some embodiments. In some embodiments, a physical asset 3700 corresponds to a digital asset. In some embodiments, the physical asset 3700 comprises one or more components manufactured in accordance with one or more parameters for customizing the physical asset based on information associated with the digital asset. In some embodiments, the physical asset 3700 comprises a tag associated with the physical asset, wherein the tag includes information comprising a uniform resource locator (URL) and encrypted information, wherein the encrypted information corresponds to a cryptographic token on a distributed ledger and information about the physical asset.

The physical asset 3700 illustrated in FIG. 37 is footwear and, more particularly, a sneaker.

Figure 38:
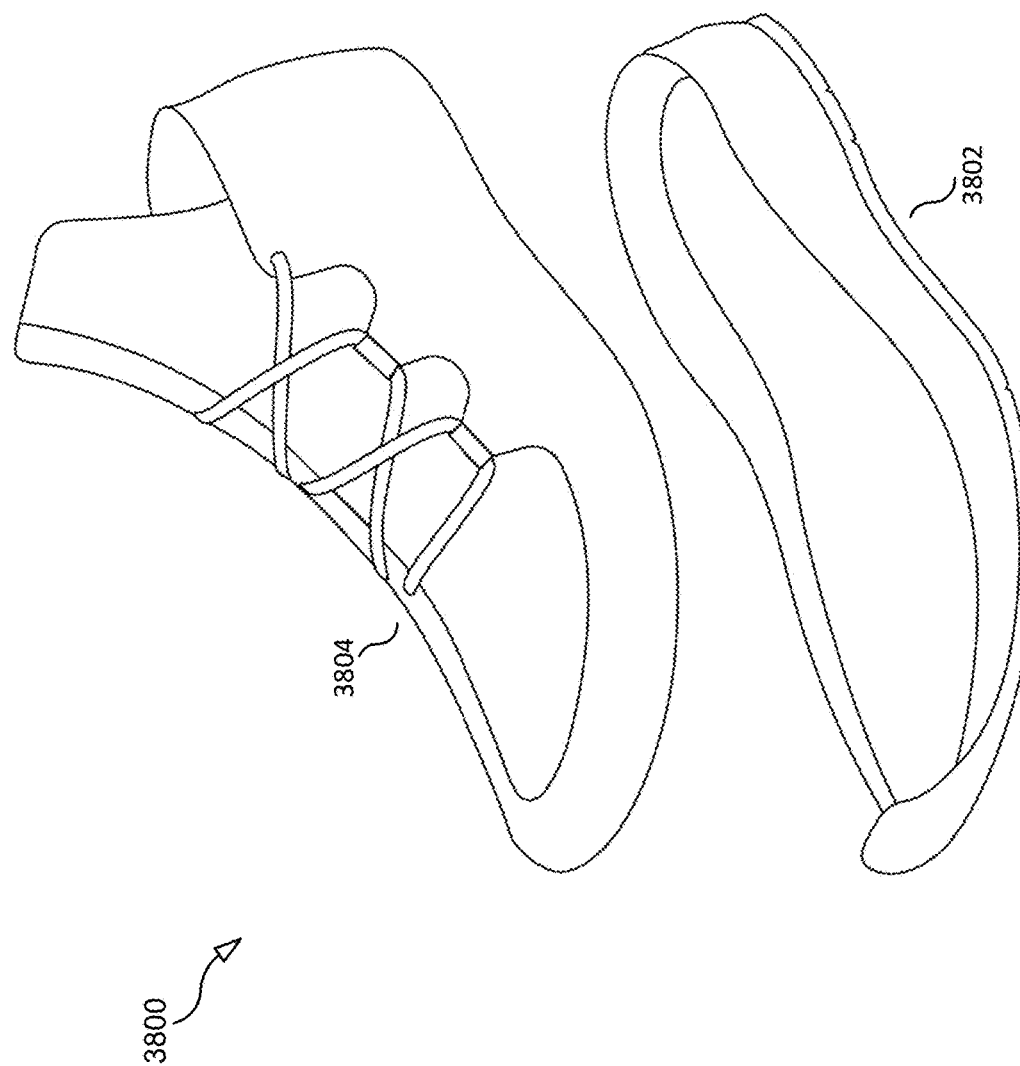
FIG. 38 illustrates a physical asset according to some embodiments.

FIG. 38 illustrates a physical asset 3800 according to some embodiments. The physical asset 3800 illustrated in FIG. 38 is footwear and, more particularly, a sneaker. The sneaker includes a sole 3802 and an upper 3804.

In some embodiments, the sneaker 3800 includes interchangeable soles 3802 and uppers 3804. The upper 3804 is able to be safely detached from the sole 3802 of the shoe without damaging the shoe. The upper 3804 is able to be placed on and reattached to a new sole 3802, or the sole 3802 is able to be placed on and reattached to a new upper 3804. This enables a user to customize their sneakers in many ways.

Advantageously, this interchangeability also enables users to replace worn soles if the uppers are still intact, or replace a worn or dirty upper if the soles are still intact. This functionality saves time, energy and materials, and has a positive impact on the environmental footprint of the user.

In some embodiments, in order to lessen the carbon footprint, recycled materials may be used in the creation of physical assets, such as sneakers. For example, the use of recycled materials in the soles and/or uppers by using old chopped up sneaker soles as the base material to create new soles, joining by melting, melding, or otherwise reforming pieces of recycled materials to one contiguous sole, using recycled yarns and threads as filament in the process of 3D printing soles and/or uppers for the sneakers, physically embedding carbon dioxide gas ($CO_2$) into the sole of the sneaker by, for example, pumping $CO_2$ into an air-tight sac in the sole of the sneaker, locking the carbon away for the duration of the sneaker's life.

Figure 39:
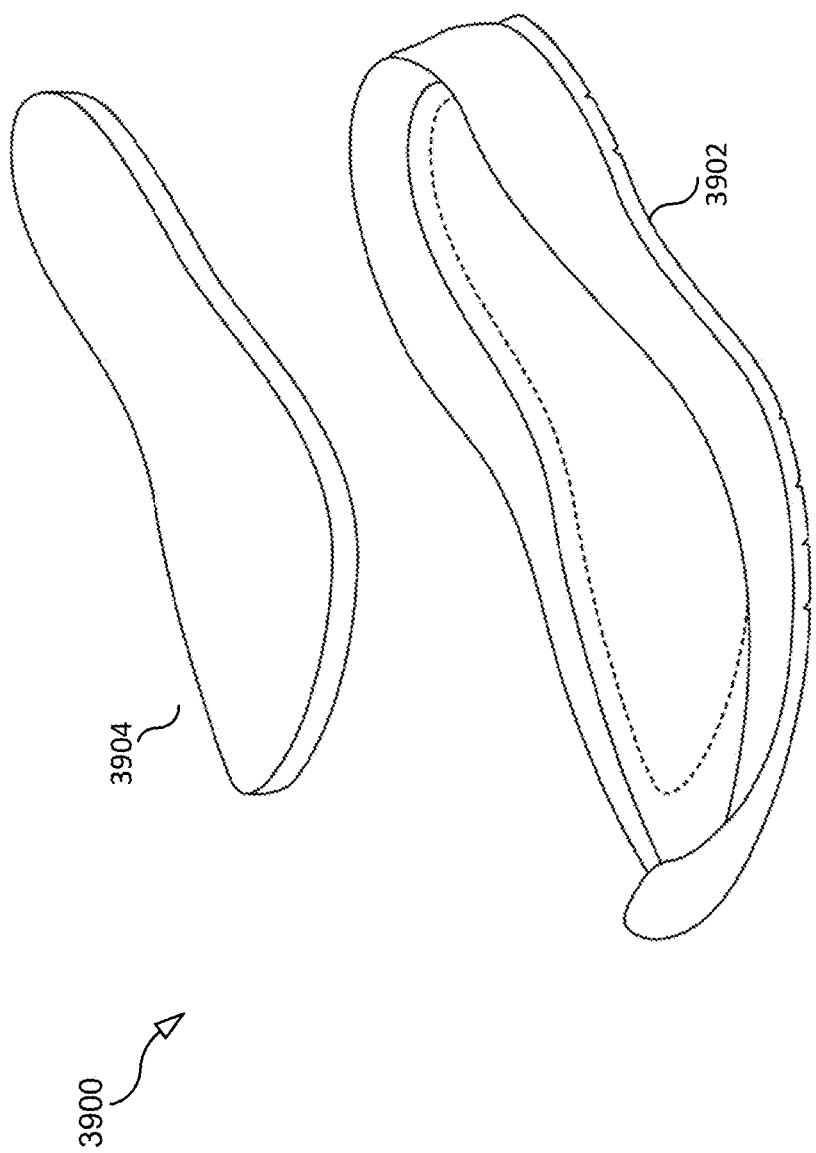
FIG. 39 illustrates a physical asset according to some embodiments.

FIG. 39 illustrates the sole 3900 of a physical asset according to some embodiments. Referring to FIG. 39, a sole 3900 is illustrated. In some embodiments, the sole 3900 includes a cavity or sac 3902 adapted to hold a gas, for example, carbon dioxide ($CO_2$). A cutout portion 3904 from the sole 3900 can be adhered to the sole 3900 to create an air-tight seal for the cavity or sac 3902.

FIG. 40A illustrates a physical asset 4000 according to some embodiments. In some embodiments, as illustrated in FIG. 40A, a tag 4002 may be embedded in or adhered on a sole 4004 of footwear, for example, a sneaker.

In some embodiments, the tag is at least one of:
(i) a near-field communication (NFC) chip;
(ii) a quick response (QR) code;
(iii) a serial number;
(iv) a blockchain address; or
(v) a non-fungible token (NFT) public key.

In some embodiments, the physical asset is footwear including a sole and an upper, and wherein the tag associated with the physical asset is physically linked with the physical asset by at least one of:
(i) embedding the tag in the sole;
(ii) embedding the tag in the upper;
(iii) adhering the tag on to the sole;
(iv) adhering the tag on to the upper; or
(v) adhering the tag on packaging for the footwear.

FIG. 40B illustrates a physical asset 4000 according to some embodiments. In some embodiments, as illustrated in FIG. 40B, a tag 4006 may be embedded in or adhered on an interior of an upper 4008 of footwear, for example, a sneaker.

FIG. 40C illustrates a physical asset 4000 according to some embodiments. In some embodiments, as illustrated in FIG. 40C, a tag 4010 may be embedded in or adhered on an exterior of an upper 4012 of footwear, for example, a sneaker.

In some embodiments, the physical asset is footwear including at least one or more of:
(i) electrical fibers capable of creating a haptic response resulting in a sensation felt by a wearer of the footwear; and
(ii) electrical fibers configured to communicate with an application.

In some embodiments, the upper of the sneaker may be embedded with electrical wiring and/or fibers that are able to process an electrical signal to create a sensible/tactile sensation on the wearer's foot. This would create a "haptic" response which could be tied to certain actions taken by the wearer or external events happening in the vicinity of the user, or completely remotely from the user.

In some embodiments, the electrical fibers may be equipped with Bluetooth or other similar near-field communication technology and are able to communicate with a smartphone app connected to the internet. This allows the sneakers to receive data and respond to it via haptic response. For example, a haptic response could be triggered when the wearer is near someone else also wearing the company (e.g., Endstate) sneakers. Advantageously, this would create a sense of community, or a shared secret between the two wearers. It may also signal to the wearer that there is an opportunity to trade, buy, or sell digital or physical assets with the other party.

In some embodiments, a haptic response may be triggered to indicate that the user is "near" a virtual pair of sneakers that would appear in augmented reality by using an application on a physical device such as a phone. In some embodiments, a haptic response may be triggered in association with an external event, such as a change in score of a sporting event, a text message alert, the sale of a digital and/or physical asset owned by the user, a change in price of a stock, a certain time of day, etc. In some embodiments, a haptic response may be triggered when the user is in danger of some sort (for instance when near someone in a contact tracing protocol for Covid).

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The following terminology is used in this disclosure consistent with the following descriptions, which are provided as exemplary meanings and are non-limiting. The following descriptions are not intended to, and do not, limit the meaning of these terms.

Distributed Ledger—any form of distributed database technology in which peer nodes work together to obtain consensus about the current state of the data, such as, for example, blockchain, hashgraph, etc. See, e.g., https://en.wikipedia.org/wiki/Distributed_ledger.

Blockchain—general distributed blockchain with smart contact support, file system based blockchain—a form of distributed ledger in which the blocks of data are linked together by referencing hashes of the prior state of data. This makes the data resistant to tampering. Some blockchains, such as Ethereum or Solana, are intended to support an ecosystem of users, data and applications. Other blockchains, such as Arweave or IPFS, act as a distributed file system focusing more on file data and assets. See, e.g., https://en.wikipedia.org/wiki/Blockchain; and https://ethereum.org/en/whitepaper/.

Smart contract—program, code deployed to blockchain—a smart contract is program code that is deployed to and run on a supporting blockchain. This will define certain input and outputs be that in the form of data or currency. See, e.g., https://en.wikipedia.org/wiki/Smart_contract.

Wallet—user identity, digital currency and asset holder - the wallet is the digital identity of a user. The wallet will typically store funds and digital assets. Any write action taken on the blockchain would require the user to sign a transaction using the public key of their wallet. This transaction would typically incur a fee of which would be removed from the wallet as well.

Blockchain (Generic)—Ethereum, Solana

Blockchain (File Storage)—Arweave, IPFS

Cryptocurrency—BTC, ETH, SOL, AR—the backing currency of a given blockchain. Used to pay for services and, through fees, sign transactions and modify the blockchain.

Digital Asset—NFT, non-fungible token, token—any unit of data that can be sold or transferred. Typically associated with images or videos.

Physical Asset—shoe, physical goods, asset

Entangled Products—digital asset+physical asset, product entanglement, asset entanglement, entangled assets—the idea of pairing a physical asset with a digital asset on a one to one basis.

NFC—chip,—short range programmable chip capable of storing a small amount of information. See, e.g., https://en.wikipedia.org/wiki/Near-field_communication#Identity_and_access_tokens.

QR Code—an algorithmic image that represents a piece of data, typically a URL. This makes it easier for a user to scan the image vs entering or remembering a url. See, e.g., https://en.wikipedia.org/wiki/QR_code.

Extended reality (XR) uses computing technology to create simulated environments (a.k.a., XR environments or XR scenes). XR is an umbrella term encompassing virtual reality (VR) and real-and-virtual combined realities, such as augmented reality (AR) and mixed reality (MR). Accordingly, an XR system can provide a wide variety and vast number of levels in the reality-virtuality continuum of the perceived environment, bringing AR, VR, MR and other types of environments (e.g., mediated reality) under one term.

Augmented Reality (AR)

AR systems augment the real world and its physical objects by overlaying virtual content. This virtual content is often produced digitally and incorporates sound, graphics, and video. For instance, a shopper wearing AR glasses while shopping in a supermarket might see nutritional information for each object as they place the object in their shopping carpet. The glasses augment reality with additional information.

Virtual Reality (VR)

VR systems use digital technology to create an entirely simulated environment. Unlike AR, which augments reality, VR is intended to immerse users inside an entirely simulated experience. In a fully VR experience, all visuals and sounds are produced digitally and does not have any input from the user's actual physical environment. For instance, VR is increasingly integrated into manufacturing, whereby trainees practice building machinery before starting on the line. A VR system is disclosed in US 20130117377 A1.

Mixed Reality (MR)

MR combines elements of both AR and VR. In the same vein as AR, MR environments overlay digital effects on top of the user's physical environment. However, MR integrates additional, richer information about the user's physical environment such as depth, dimensionality, and surface textures. In MR environments, the user experience therefore more closely resembles the real world. To concretize this, consider two users hitting a MR tennis ball in on a real-world tennis court. MR will incorporate information about the hardness of the surface (grass versus clay), the direction and force the racket struck the ball, and the players' height.

XR User Device

An XR user device is an interface for the user to perceive both virtual and/or real content in the context of extended reality. An XR user device has one or more sensory actuators, where each sensory actuator is operable to produce one or more sensory stimulations. An example of a sensory actuator is a display that produces a visual stimulation for the user. A display of an XR user device may be used to display both the environment (real or virtual) and virtual content together (e.g., video see-through), or overlay virtual content through a semi-transparent display (e.g., optical see-through). The XR user device may also have one or more sensors for acquiring information about the user's environment (e.g., a camera, inertial sensors, etc.). Other examples of a sensory actuator include a haptic feedback device, a speaker that produces an aural stimulation for the user, an olfactory device for producing smells, etc.

The invention claimed is:

1. A physical asset corresponding to a digital asset, the physical asset comprising:
   one or more physical components of the physical asset, wherein
      the one or more physical components are manufactured in accordance with a physical specification, and
      the physical specification comprises one or more parameters for customizing the physical asset based on information associated with the digital asset; and
   a tag associated with the physical asset, wherein the tag includes information comprising a uniform resource locater (URL) and encrypted information, wherein the encrypted information corresponds to a cryptographic token on a distributed ledger and information about the physical asset.

2. The physical asset according to claim 1, wherein the tag is at least one of:
   (i) a near-field communication (NFC) chip;
   (ii) a quick response (QR) code;
   (iii) a serial number;
   (iv) a blockchain address; or
   (v) a non-fungible token (NFT) public key.

3. The physical asset according to claim 1, wherein the physical asset is footwear including a sole and an upper, and wherein the tag associated with the physical asset is physically linked with the physical asset by at least one of:
   (i) embedding the tag in the sole;
   (ii) embedding the tag in the upper;
   (iii) adhering the tag on to the sole;
   (iv) adhering the tag on to the upper; or
   (v) adhering the tag on packaging for the footwear.

4. The physical asset according to claim 1, wherein the physical asset is footwear including at least one or more of:
   (i) an interchangeable sole;
   (ii) an interchangeable upper;
   (iii) electrical fibers capable of creating a haptic response resulting in a sensation felt by a wearer of the footwear; and
   (iv) electrical fibers configured to communicate with an application.

5. The physical asset according to claim 1, wherein the distributed ledger is a blockchain ledger.

6. The physical asset according to claim 1, wherein the cryptographic token is a non-fungible token (NFT).

7. The physical asset according to claim 1, wherein the one or more parameters comprise one or more values associated with a user.

* * * * *